United States Patent
Amitai

(10) Patent No.: US 11,982,812 B2
(45) Date of Patent: May 14, 2024

(54) HIGHLY EFFICIENT COMPACT HEAD-MOUNTED DISPLAY SYSTEM HAVING SMALL INPUT APERTURE

(71) Applicant: OORYM OPTICS LTD., Rehovot (IL)

(72) Inventor: Yaakov Amitai, Rehovot (IL)

(73) Assignee: OORYM OPTICS LTD., Rehovot (IL)

(*) Notice: Subject to any disclaimer, the term of this patent is extended or adjusted under 35 U.S.C. 154(b) by 512 days.

(21) Appl. No.: 17/425,094

(22) PCT Filed: Jan. 27, 2020

(86) PCT No.: PCT/IL2020/050101
§ 371 (c)(1),
(2) Date: Jul. 22, 2021

(87) PCT Pub. No.: WO2020/157747
PCT Pub. Date: Aug. 6, 2020

(65) Prior Publication Data
US 2022/0107499 A1    Apr. 7, 2022

(30) Foreign Application Priority Data
Jan. 29, 2019  (IL) .......................................... 264551

(51) Int. Cl.
*G02B 27/01* (2006.01)
*G02B 27/00* (2006.01)
*F21V 8/00* (2006.01)

(52) U.S. Cl.
CPC ..... *G02B 27/0172* (2013.01); *G02B 27/0081* (2013.01); *G02B 27/017* (2013.01);
(Continued)

(58) Field of Classification Search
CPC .............. G02B 27/017; G02B 27/0172; G02B 2027/0174; G02B 27/0176; G02B 2027/0178; G02B 2027/0081
See application file for complete search history.

(56) References Cited

U.S. PATENT DOCUMENTS 10,386,642 B2 * 8/2019 Piskunov ............ G02B 27/0172
2007/0064310 A1 * 3/2007 Mukawa ............... G02B 17/086
348/E5.145

(Continued)

FOREIGN PATENT DOCUMENTS

WO    WO 2017/141242    8/2017
WO    WO 2019/077601    4/2019

OTHER PUBLICATIONS

European Patent Office, European International Search Report and Written Opinion of the International Searching Authority, PCT/IL2020/050101, dated Apr. 27, 2020, 12 pages.

*Primary Examiner* — Bao-Luan Q Le
(74) *Attorney, Agent, or Firm* — SNELL & WILMER LLP

(57) ABSTRACT

An optical device includes a light-transmitting substrate, input and output apertures, eye-motion box, intermediate element outside of the substrate for coupling light waves into the substrate through the input aperture, a first reflecting surface between two major surfaces of the light-transmitting substrate for reflecting the coupled-in light waves to effect total internal reflection from the major surfaces of the substrate, a second flat reflecting surface parallel to the first reflecting surface located between the major surfaces of the light-transmitting substrate, for coupling light waves out of the substrate, and an optical element for redirecting light waves coupled-out from the substrate through the output aperture, into the eye-motion-box. The input aperture is substantially smaller than the output aperture, active areas of the first and second reflecting surfaces are similar, and each of the coupled light waves covers the entire aperture of the eye-motion-box.

20 Claims, 33 Drawing Sheets

(52) U.S. Cl.
CPC ........ *G02B 27/0176* (2013.01); *G02B 6/0053* (2013.01); *G02B 6/0055* (2013.01); *G02B 2027/0125* (2013.01); *G02B 2027/013* (2013.01); *G02B 2027/0174* (2013.01); *G02B 2027/0178* (2013.01)

(56) References Cited

U.S. PATENT DOCUMENTS

| | | | |
|---|---|---|---|
| 2009/0141324 A1* | 6/2009 | Mukawa | G02B 5/32 359/13 |
| 2015/0241619 A1* | 8/2015 | Richards | G02B 6/0045 29/458 |
| 2016/0154243 A1* | 6/2016 | Aiki | G02B 27/0176 359/633 |
| 2017/0336636 A1* | 11/2017 | Amitai | G02B 27/0172 |
| 2018/0120559 A1 | 5/2018 | Yeoh | |
| 2018/0322845 A1* | 11/2018 | Machida | G02B 27/0172 |
| 2019/0129175 A1* | 5/2019 | Amitai | G02B 6/00 |
| 2019/0155337 A1* | 5/2019 | Ohkawa | G02B 27/0172 |
| 2019/0278086 A1* | 9/2019 | Ofir | G02B 6/122 |

* cited by examiner

HIGHLY EFFICIENT COMPACT HEAD-MOUNTED DISPLAY SYSTEM HAVING SMALL INPUT APERTURE

FIELD OF THE INVENTION

The present invention relates to substrate-based light wave guided optical devices, and particularly to devices which include reflecting surfaces carried by a light-transmissive substrate and an array of partially reflecting surfaces which is attached the substrate. The invention can be implemented to advantage in a large number of imaging applications, such as, head-mounted and head-up displays, as well as cellular phones, compact displays, and 3-D displays.

BACKGROUND OF THE INVENTION

One of the important applications for compact optical elements is in head-mounted displays (HMDs), wherein an optical module serves both as an imaging lens and a combiner, in which a two-dimensional display is imaged to infinity and reflected into the eye of an observer. The display can be obtained directly from either a spatial light modulator (SLM), such as a cathode ray tube (CRT), a liquid crystal display (LCD), an organic light emitting diode array (OLED), a scanning source and similar devices, indirectly, by means of a relay lens, or an optical fiber bundle. The display comprises an array of elements (pixels) imaged to infinity by a collimating lens and transmitted into the eye of the observer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier and bulkier, and therefore, even for a moderate performance device, is impractical. This is a major drawback for all kinds of displays but especially in HMDs, wherein the system should be as light and compact as possible.

The need for compactness has led to several different complex optical solutions, all of which, on the one hand, are still not sufficiently compact for most practical applications, and on the other hand, suffer major drawbacks in terms of manufacturability, price and performance.

The teachings included in Publication Numbers WO2017/141239, WO2017/141240, WO2017/141242, and PCT/IL2018/051105 are herein incorporated by reference.

SUMMARY OF THE INVENTION

The present invention facilitates the provision of compact substrates for, amongst other applications, HMDs. The invention allows relatively wide FOVs together with relatively large eye-motion box (EMB) values. The resulting optical system offers a large, high-quality image, which also accommodates large movements of the eye. The optical system according to the present invention is particularly advantageous because it is substantially more compact than state-of-the-art implementations, and yet it can be readily incorporated, even into optical systems having specialized configurations.

A broad object of the present invention is, therefore, to alleviate the drawbacks of state-of-the-art compact optical display devices and to provide other optical components and systems having improved performance, according to specific requirements.

In accordance with the present invention there is therefore provided an optical device comprising an optical device, including a first light-transmitting substrate having at least two parallel major surfaces and two opposite edges; an input aperture; an output aperture positioned next to one of the major surfaces of the substrate; an eye-motion box having an aperture; a first intermediate element having at least two surfaces positioned outside of the substrate for coupling light waves, having a field-of view, into the substrate through the input aperture; a first flat reflecting surface, having an active area located between the two major surfaces of the light-transmitting substrate, for reflecting the coupled-in light waves to effect total internal reflection from the major surfaces of the substrate; a second flat reflecting surface parallel to the first flat reflecting surface, having an active area and being located between the two major surfaces of the light-transmitting substrate, for coupling light waves out of the substrate, and a redirecting optical element having at least two surfaces positioned outside of the substrate for redirecting light waves coupled-out from the substrate through the output aperture, into the eye-motion-box, wherein the input aperture is substantially smaller than the output aperture, the active area of the first reflecting surface is similar to the active area of the second reflecting surface, and each of the coupled light waves covers the entire aperture of the eye-motion-box.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for the purpose of illustrative discussion of the preferred embodiments of the present invention only, and are presented to provide what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a prior art exemplary light-transmitting substrate;

FIG. 2 is a side view of another prior art exemplary light-transmitting substrate;

FIGS. 3A and 3B illustrate desired reflectance and transmittance characteristics of selectively reflecting surfaces, used in a prior art exemplary light-transmitting substrate, for two ranges of incident angles;

FIG. 4 illustrates a reflectance curve as a function of the incident angle for an exemplary dielectric coating;

FIG. 5 is a schematic sectional view of a prior-art light-transmitting substrate, wherein the coupling-in, as well as the coupling-out elements, are diffractive optical elements;

FIGS. 6A, 6B and 6C illustrate sectional views of a prior-art transparent substrate having coupling-in and coupling-out surfaces, and a partially reflecting redirecting element;

Figure 7:
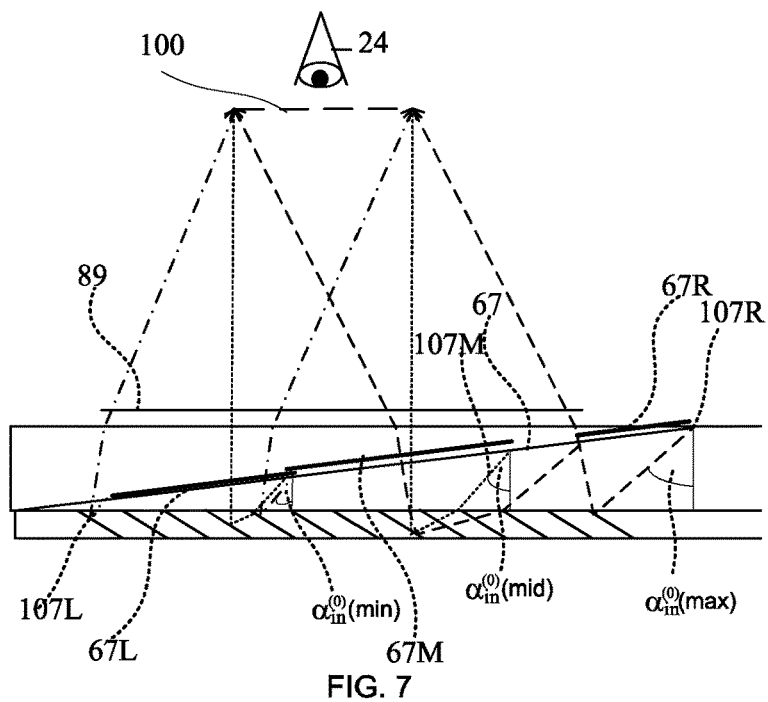
Figure 10:
Figure 11:
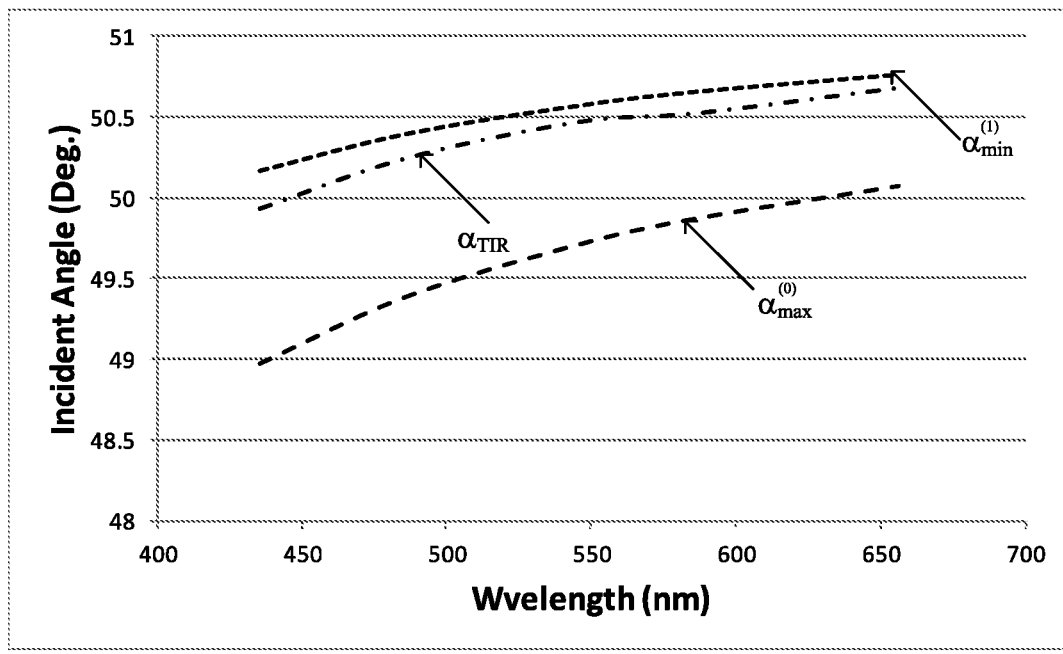
Figure 12A:
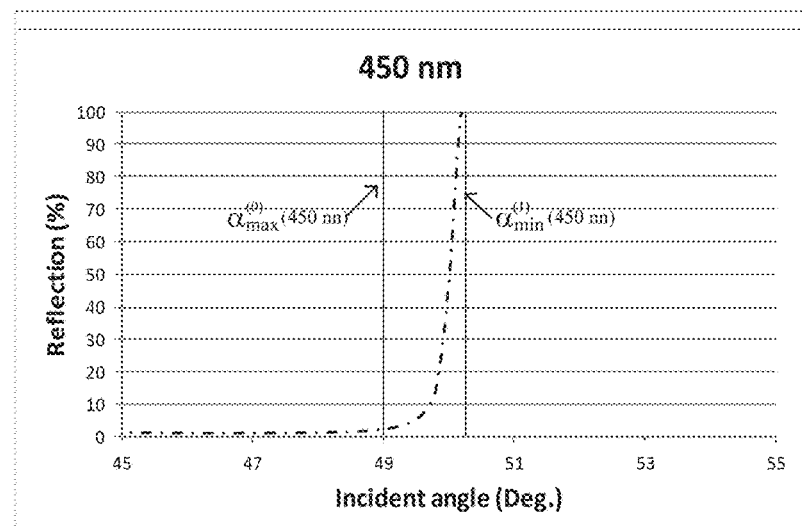
Figure 12B:
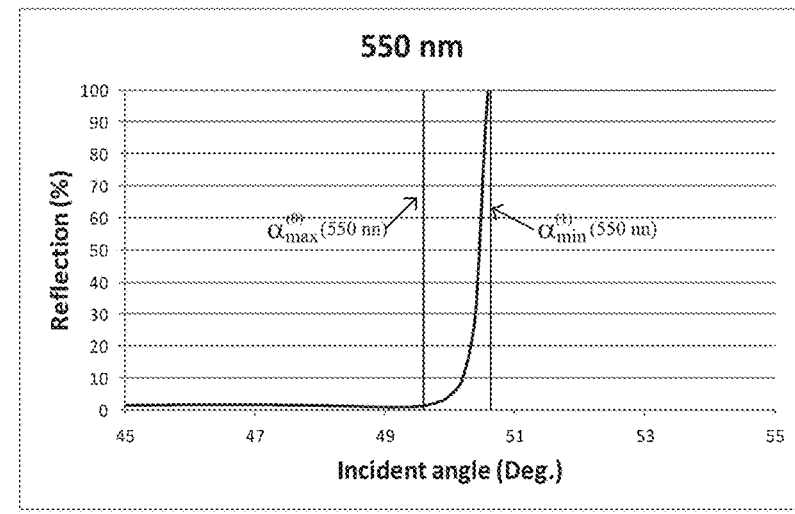
Figure 12C:
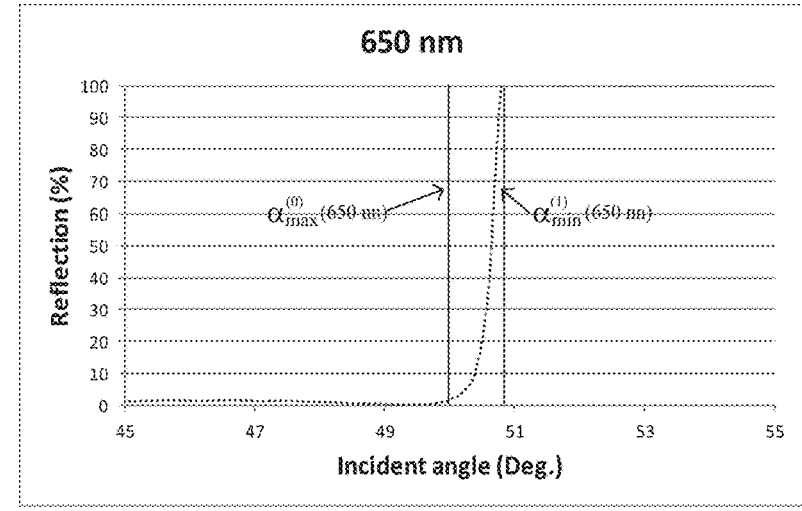
Figure 15:
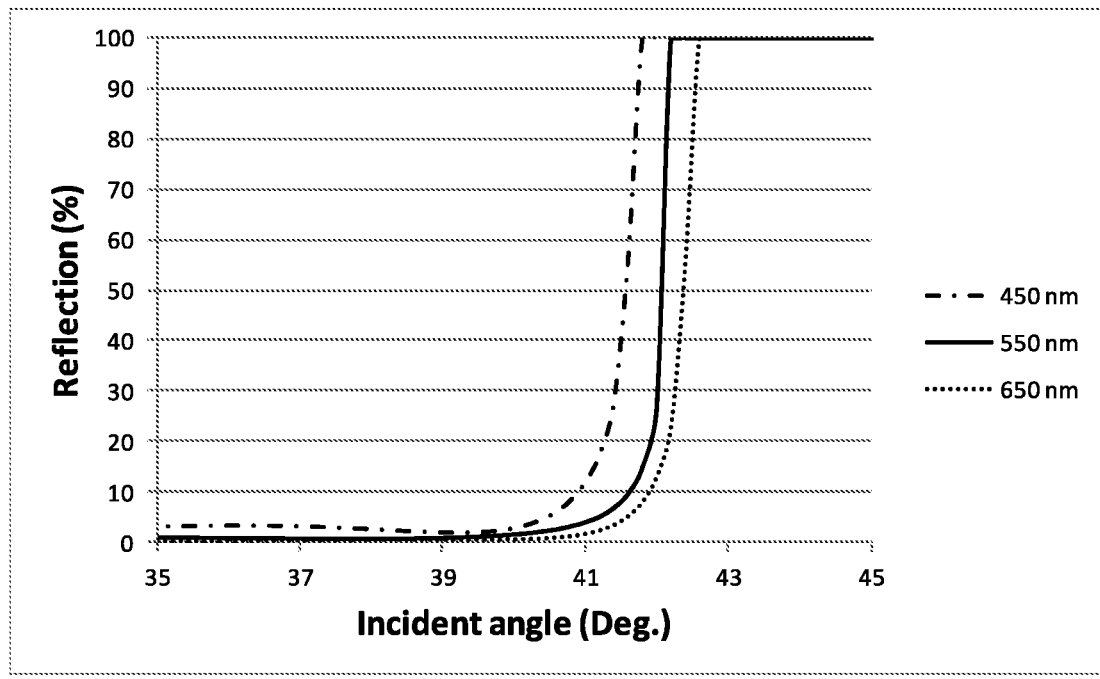
Figure 16:
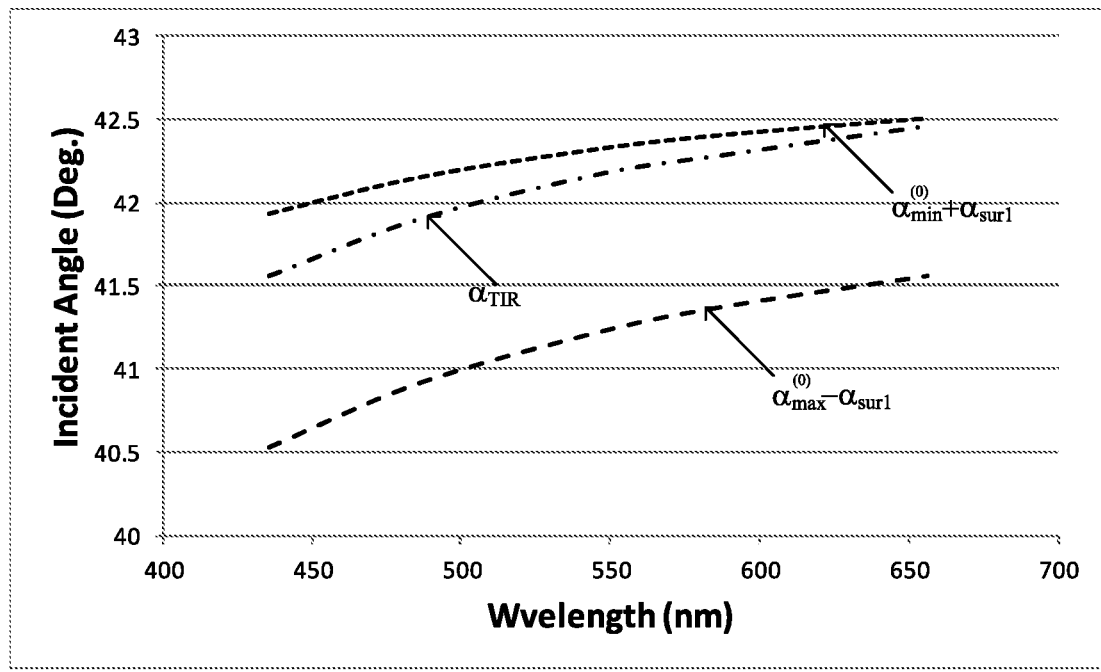
Figure 17A:
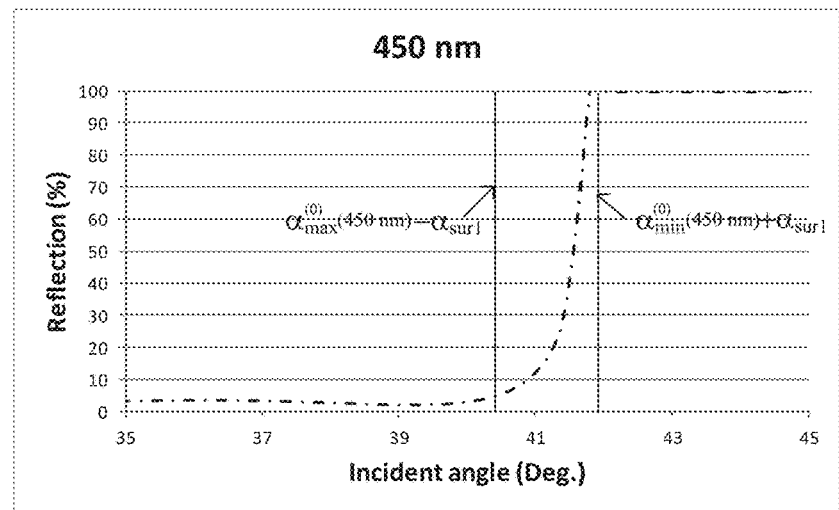
Figure 17B:
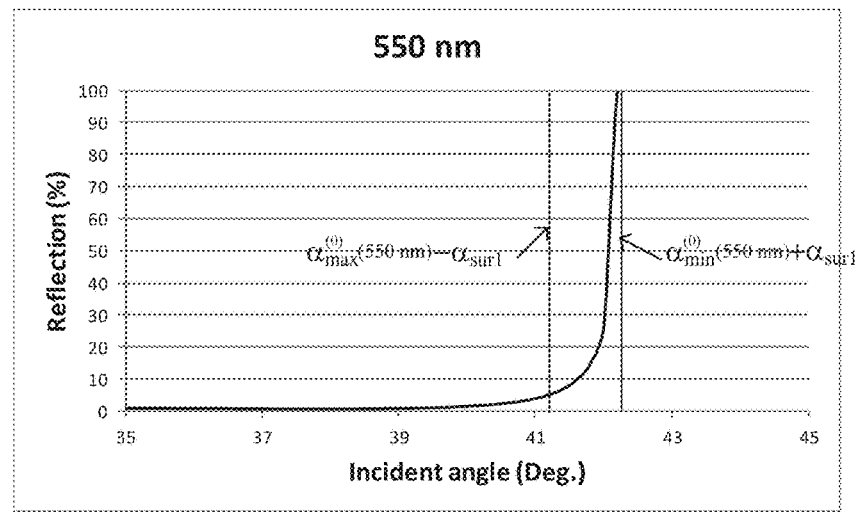
Figure 17C:
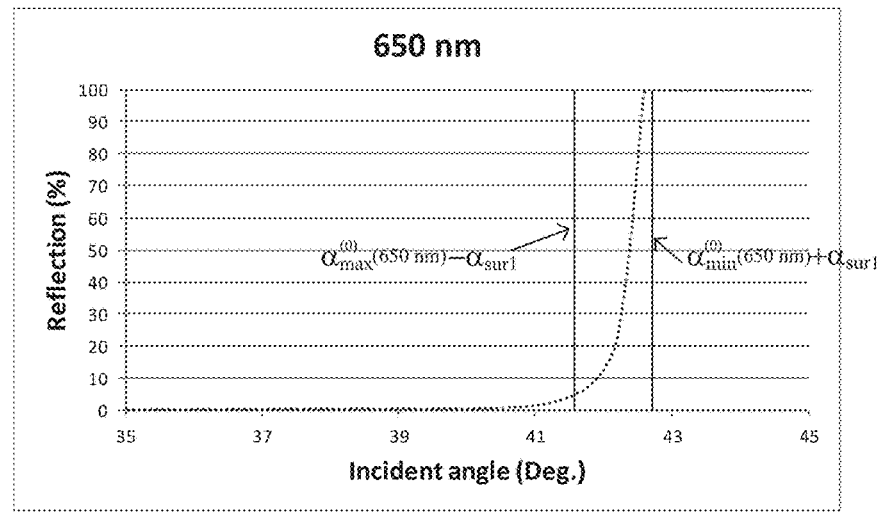
Figure 18A:
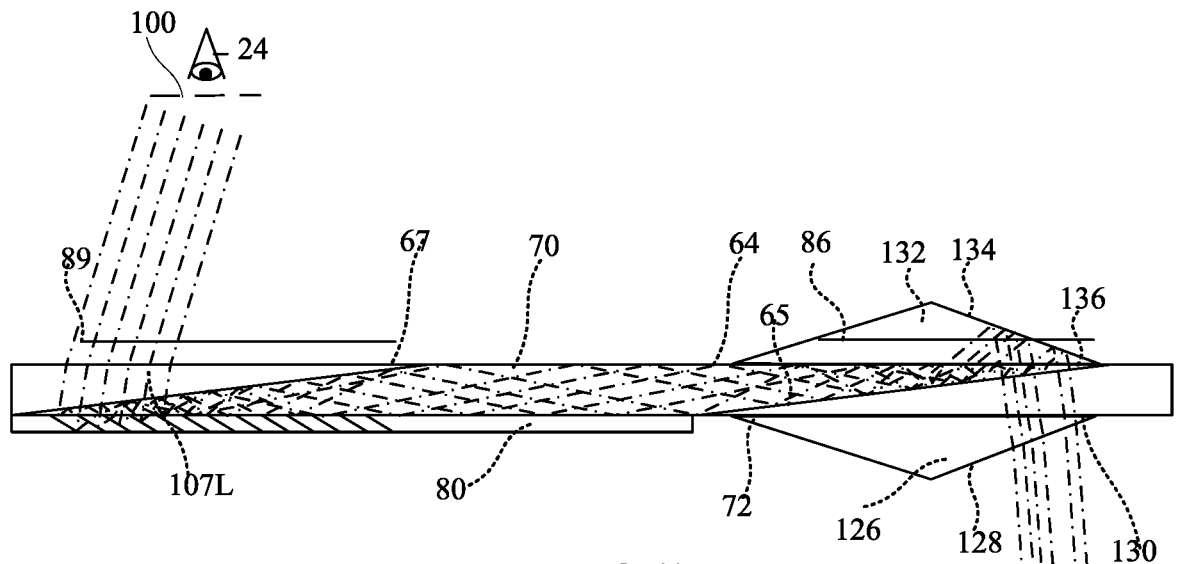
Figure 18B:
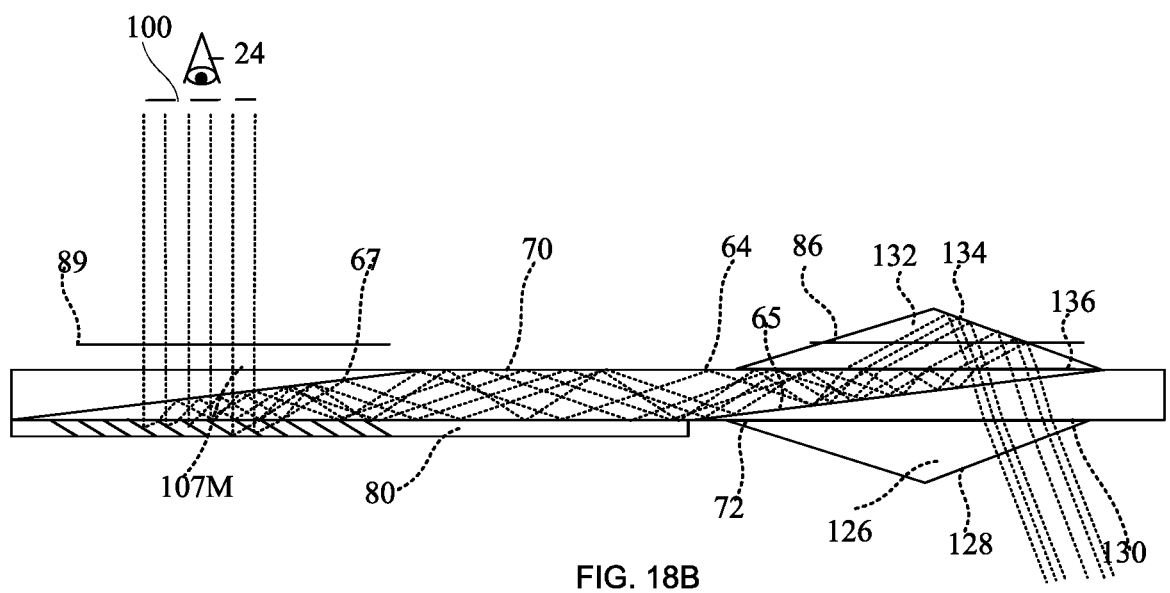
Figure 18C:
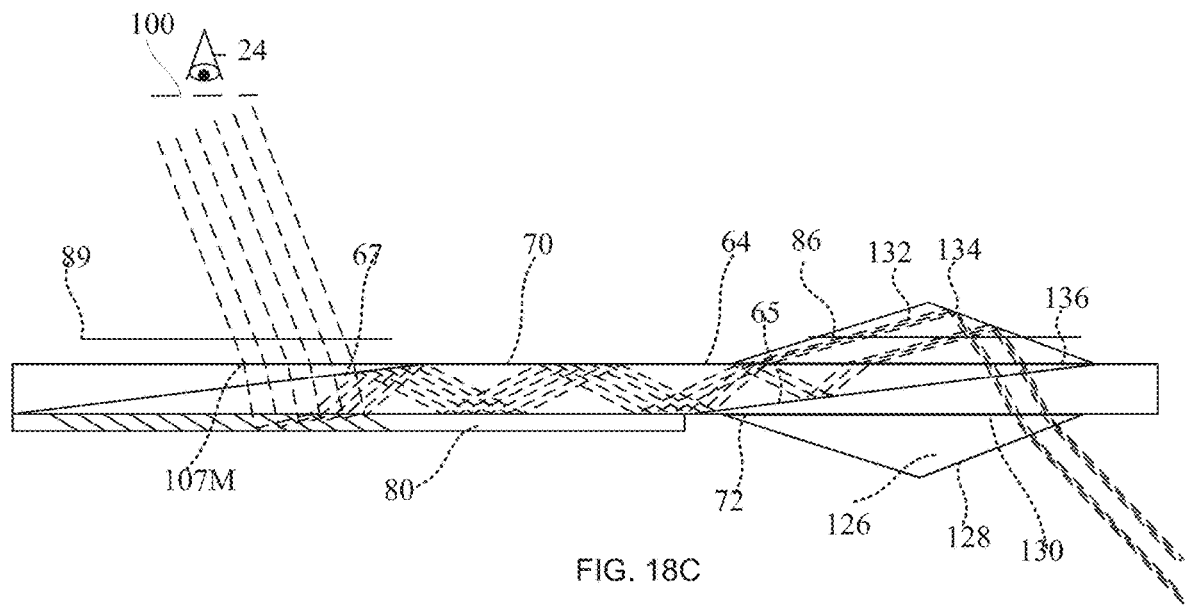
Figure 18D:
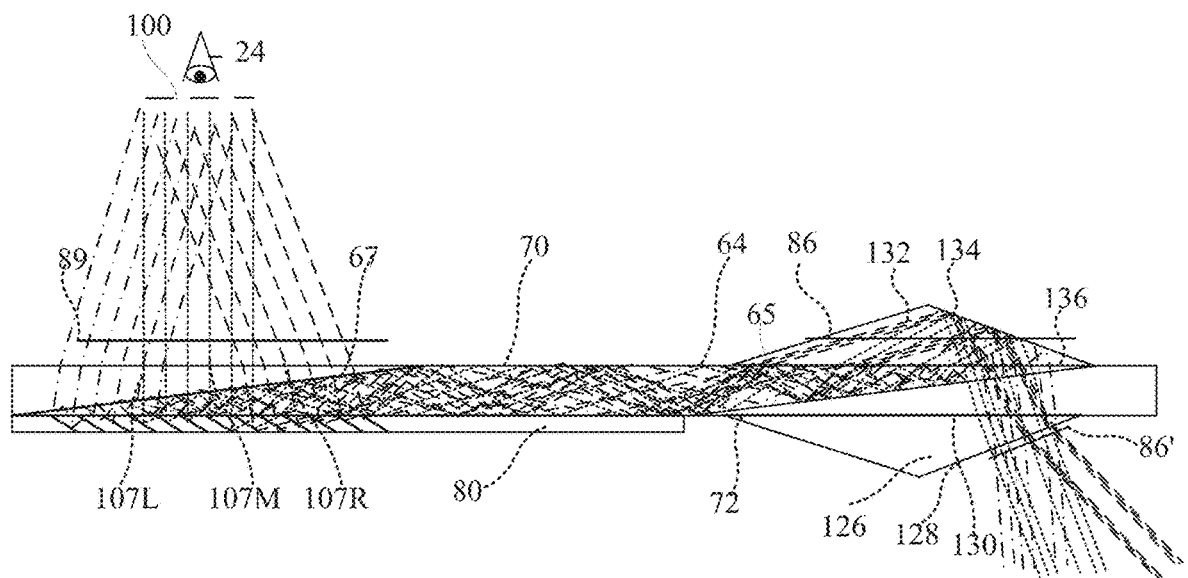
Figure 19A:
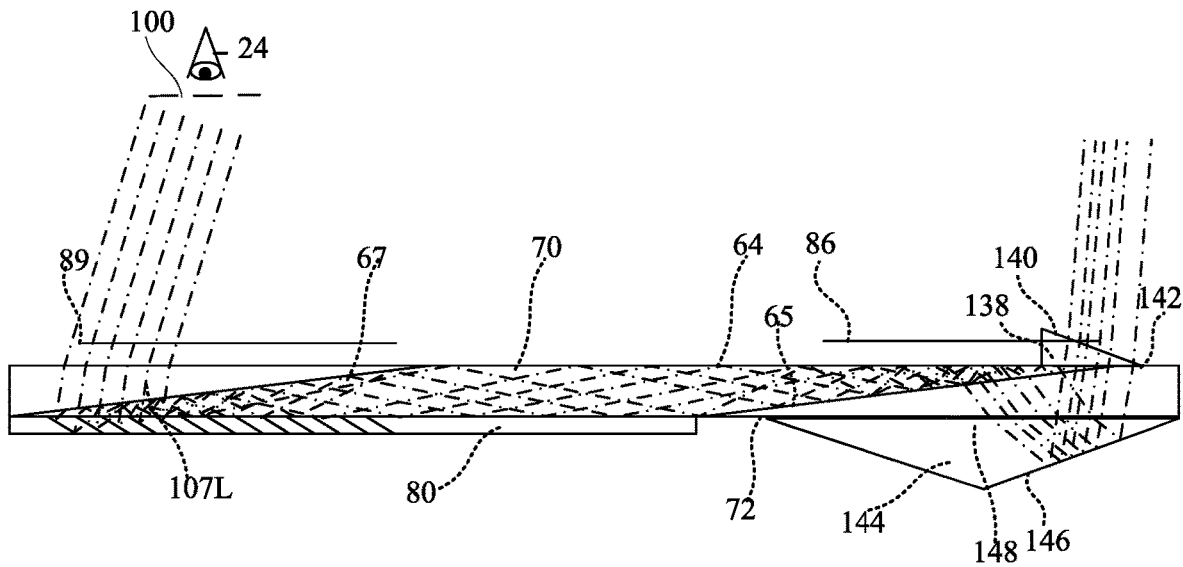
Figure 19B:
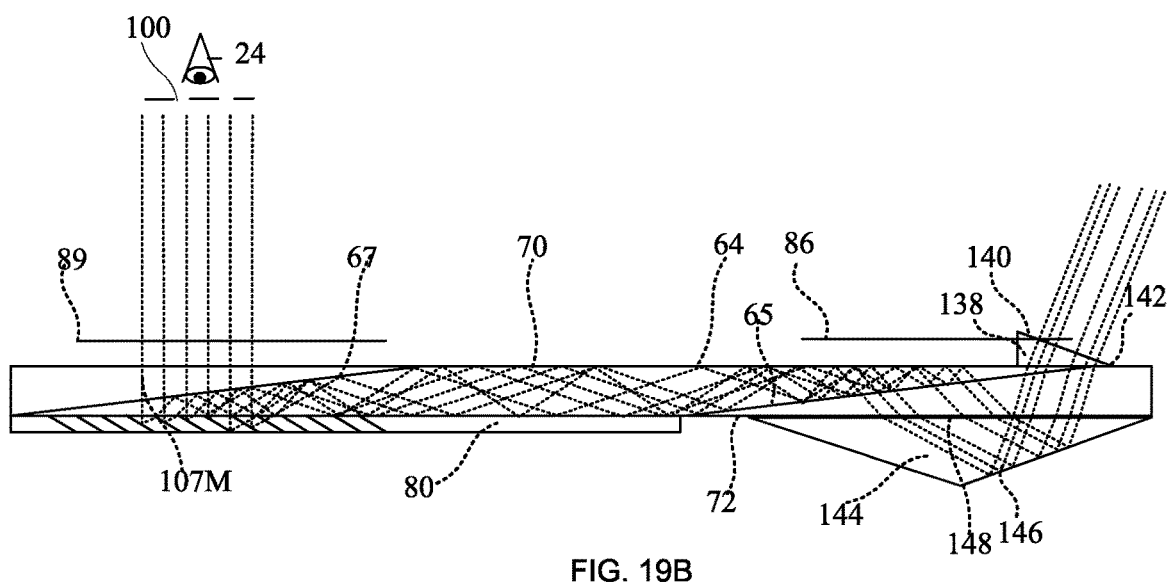
Figure 19C:
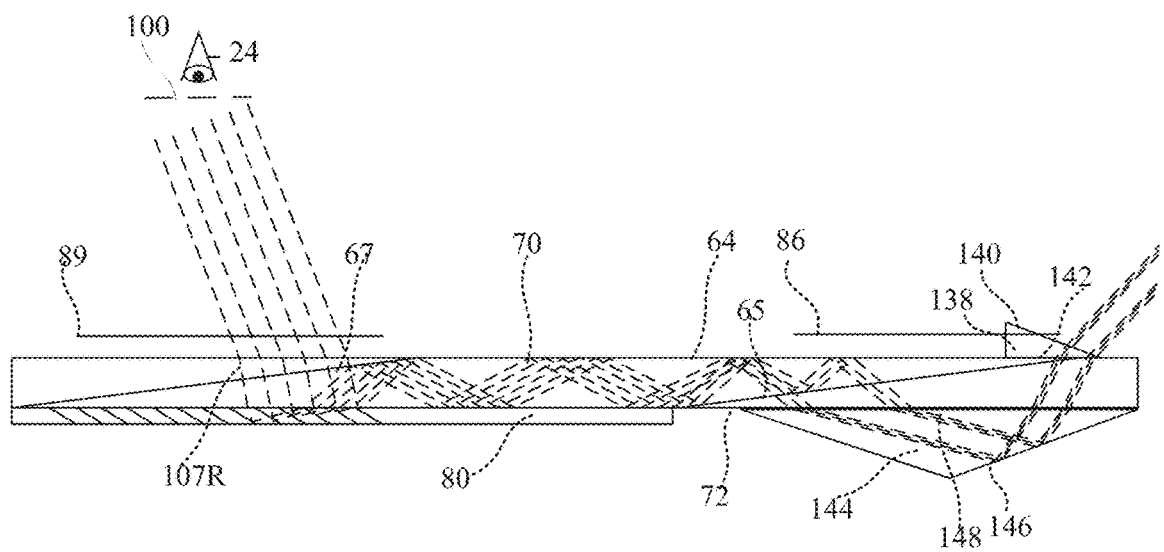
Figure 19D:
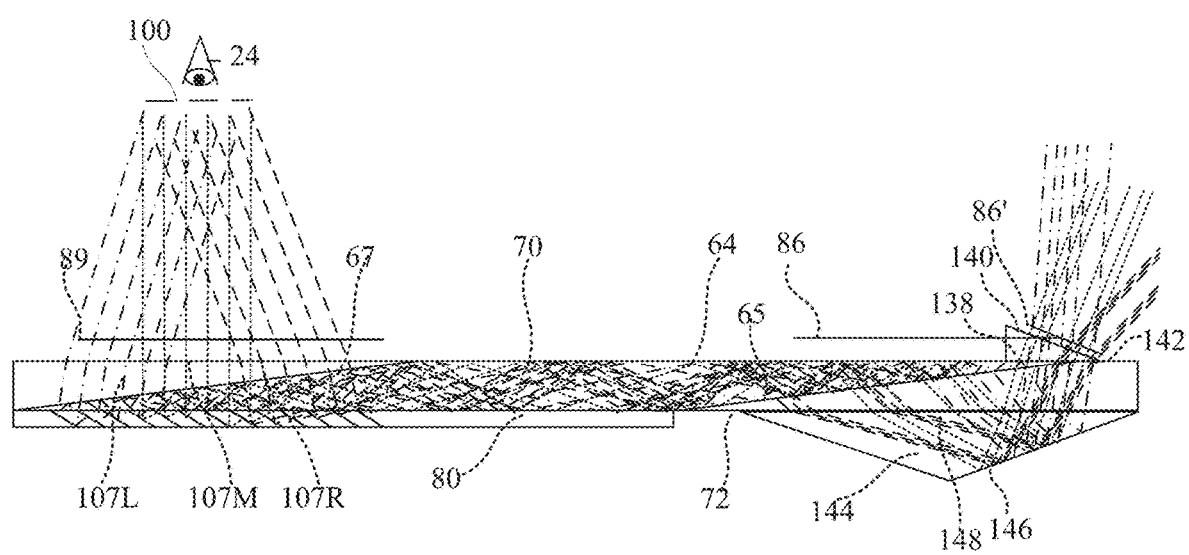
Figure 20A:
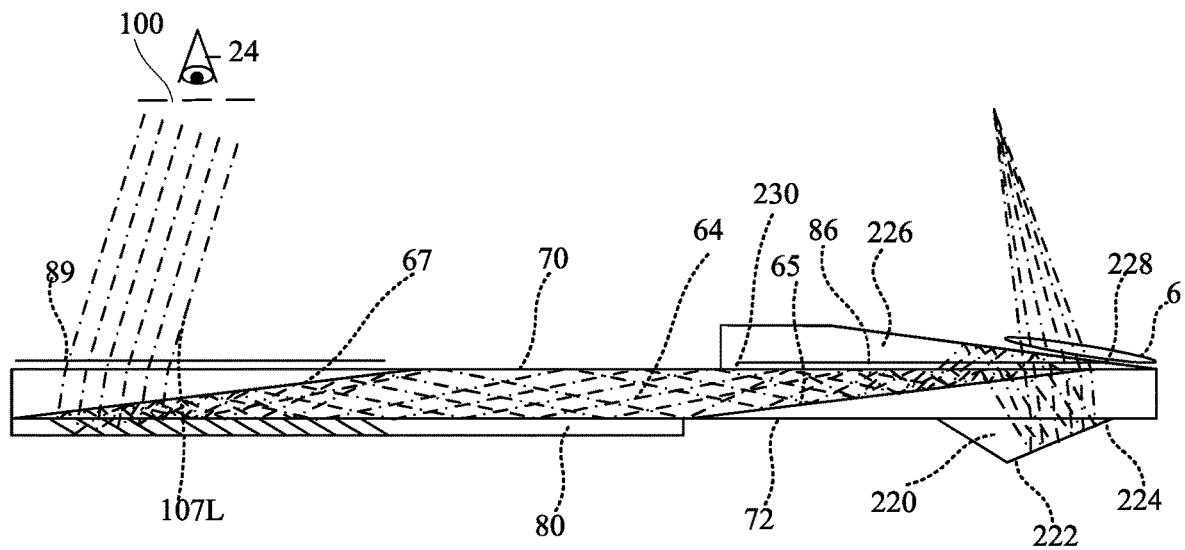
Figure 20B:
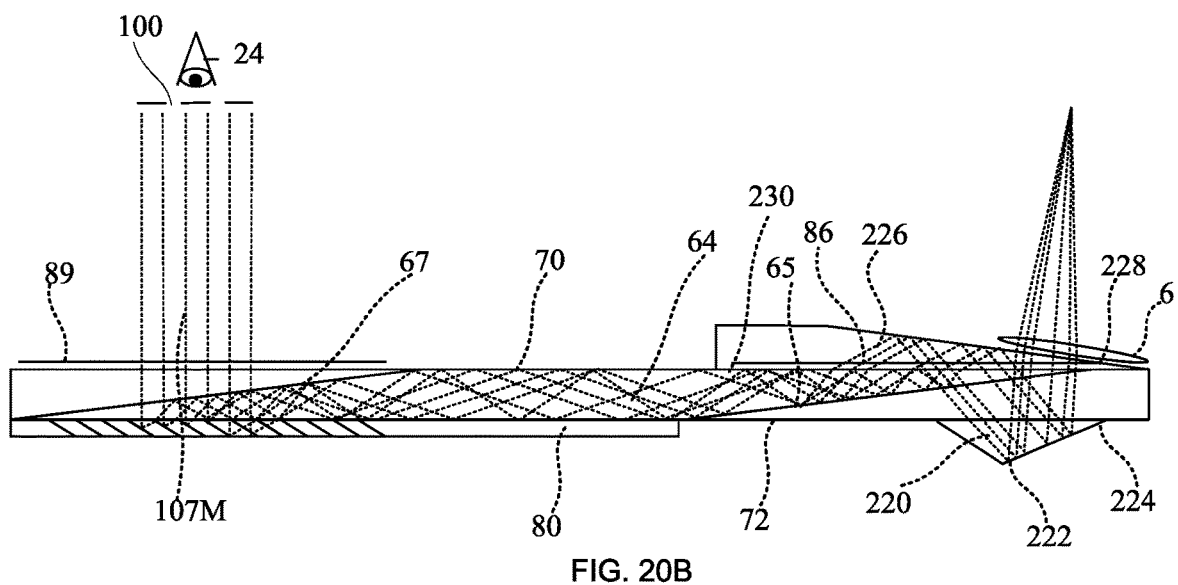
Figure 20C:
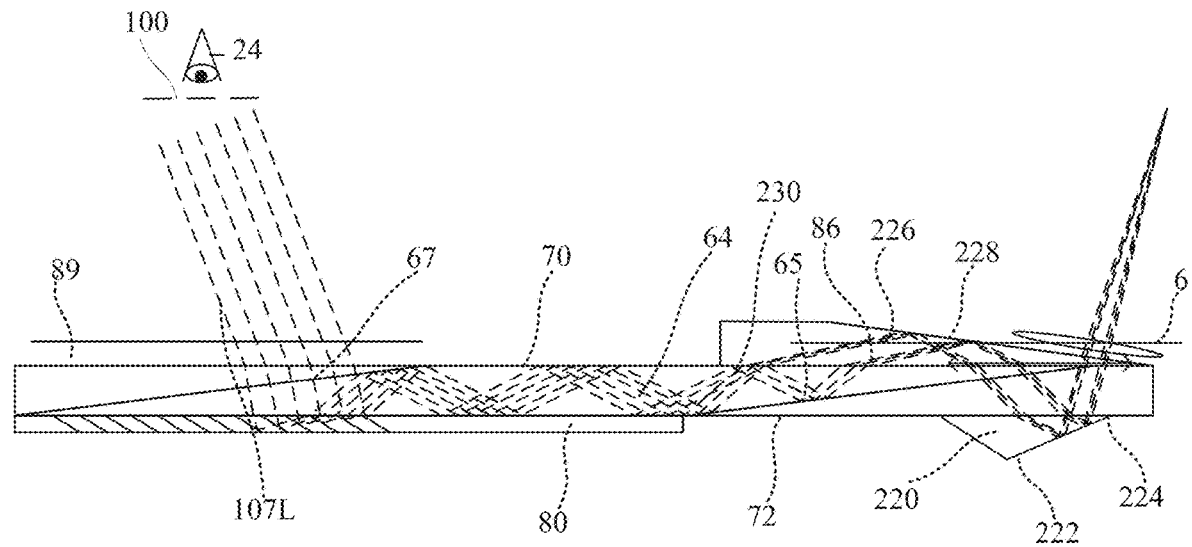
Figure 20D:
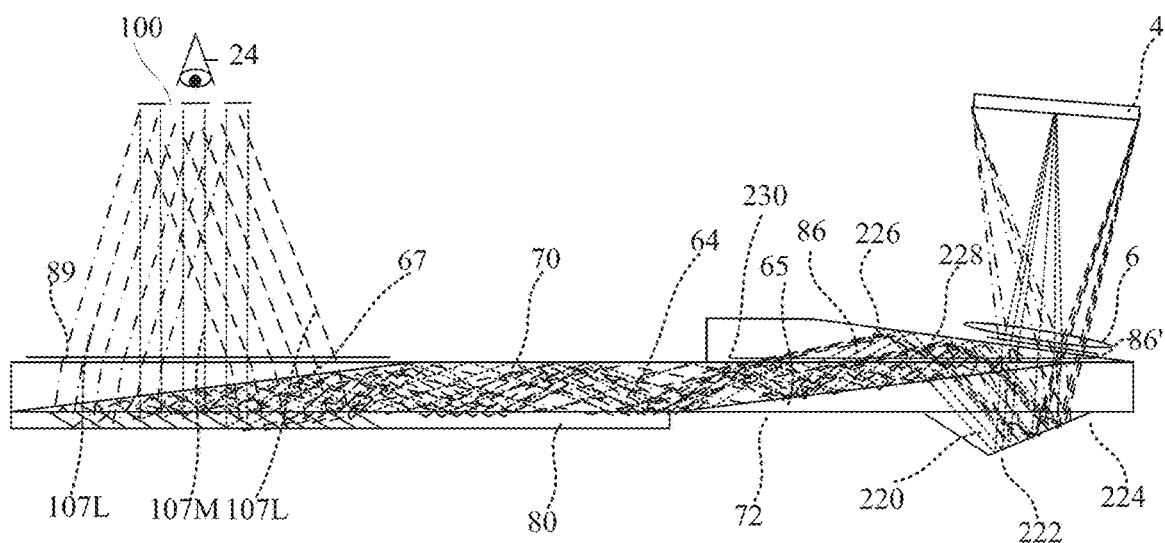
Figure 21:
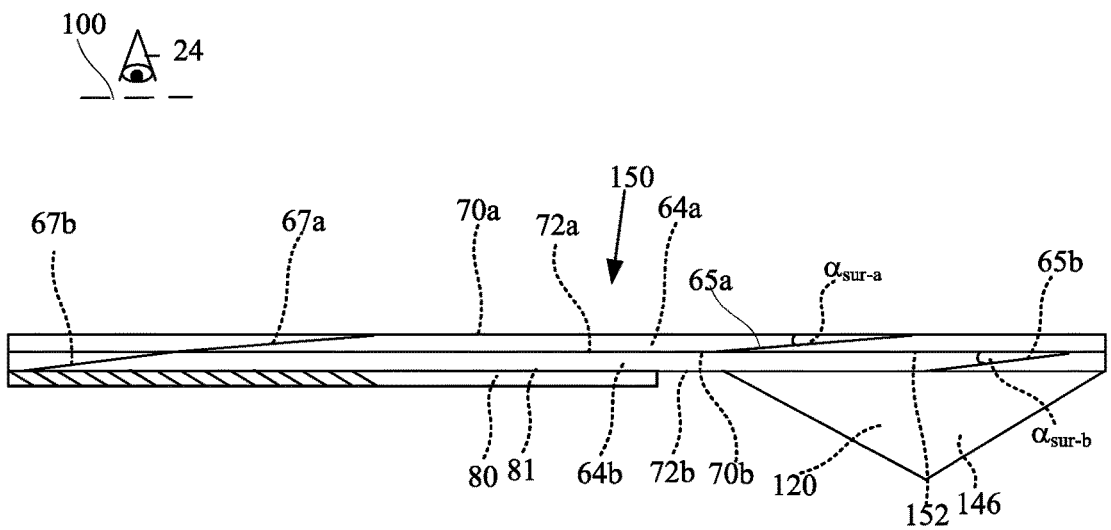
Figure 24A:
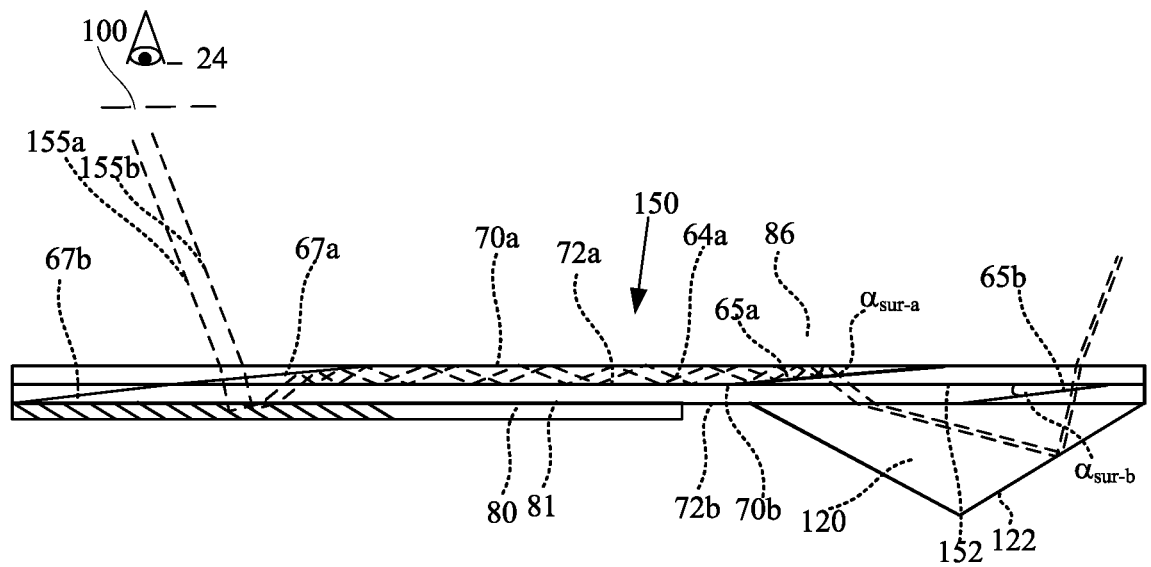
Figure 24B:
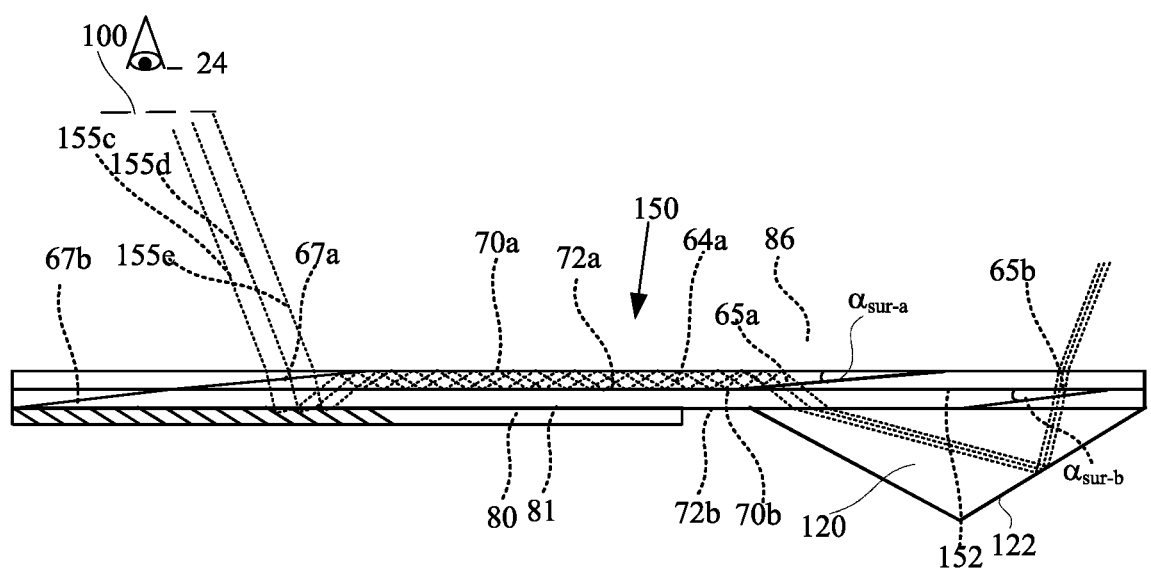
Figure 24C:
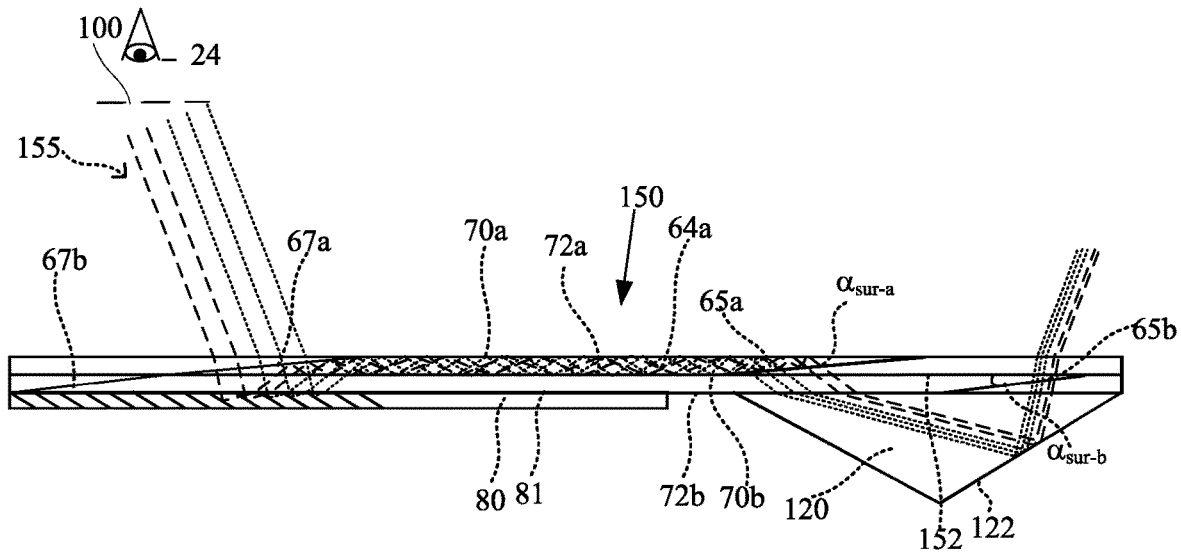
Figure 25:
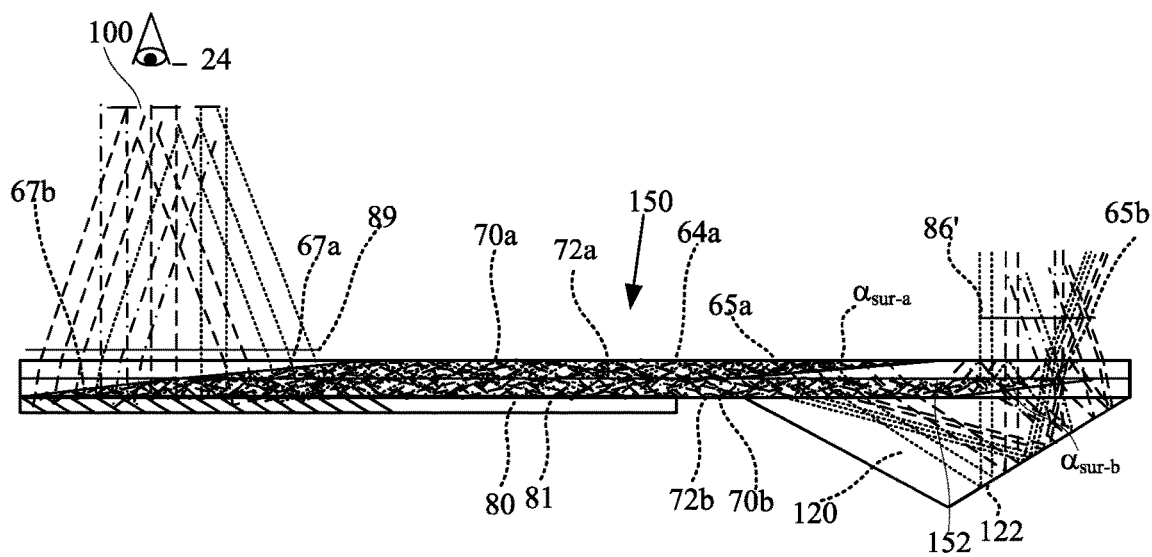
Figure 26A:
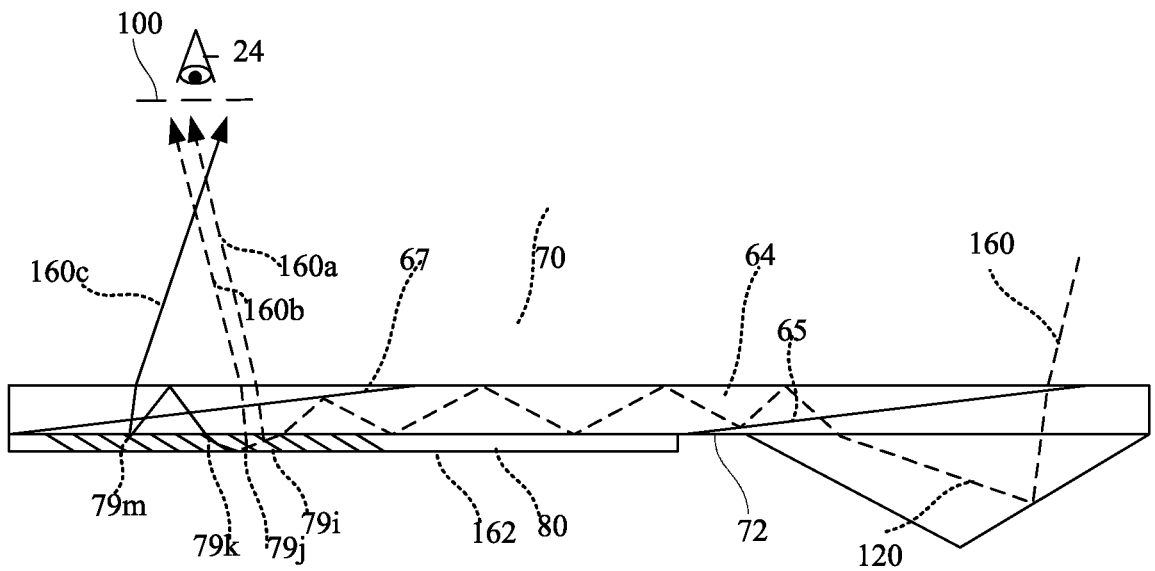
Figure 26B:
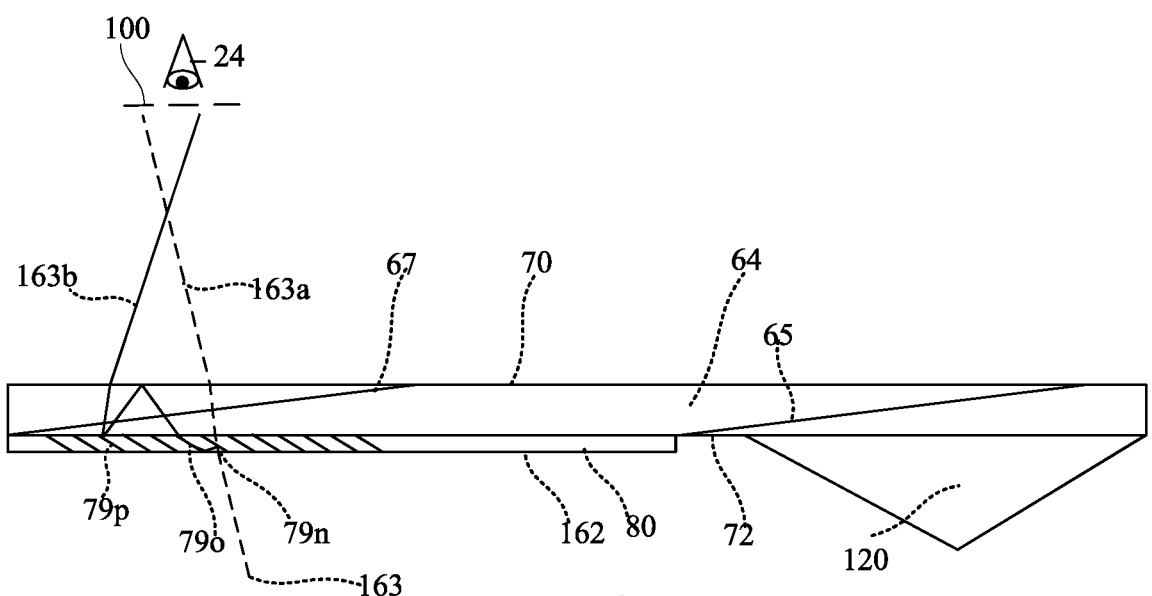
Figure 27:
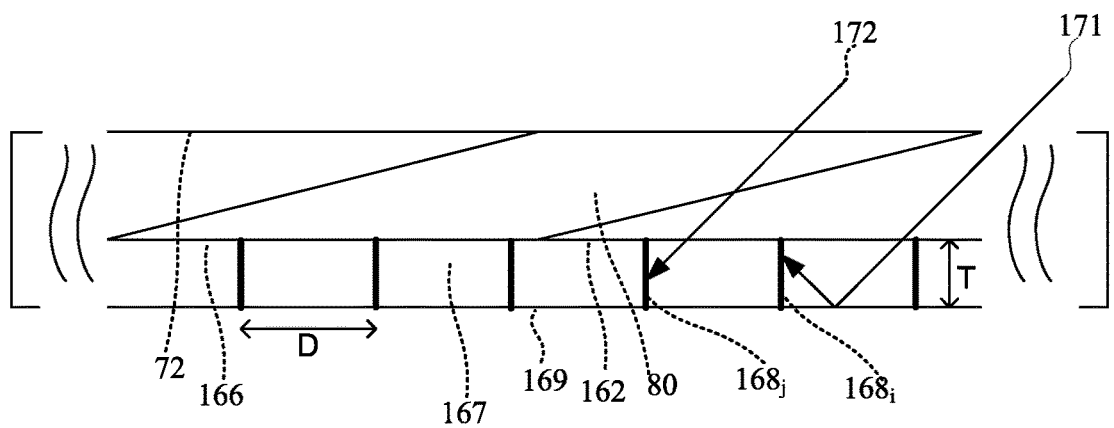
Figure 29A:
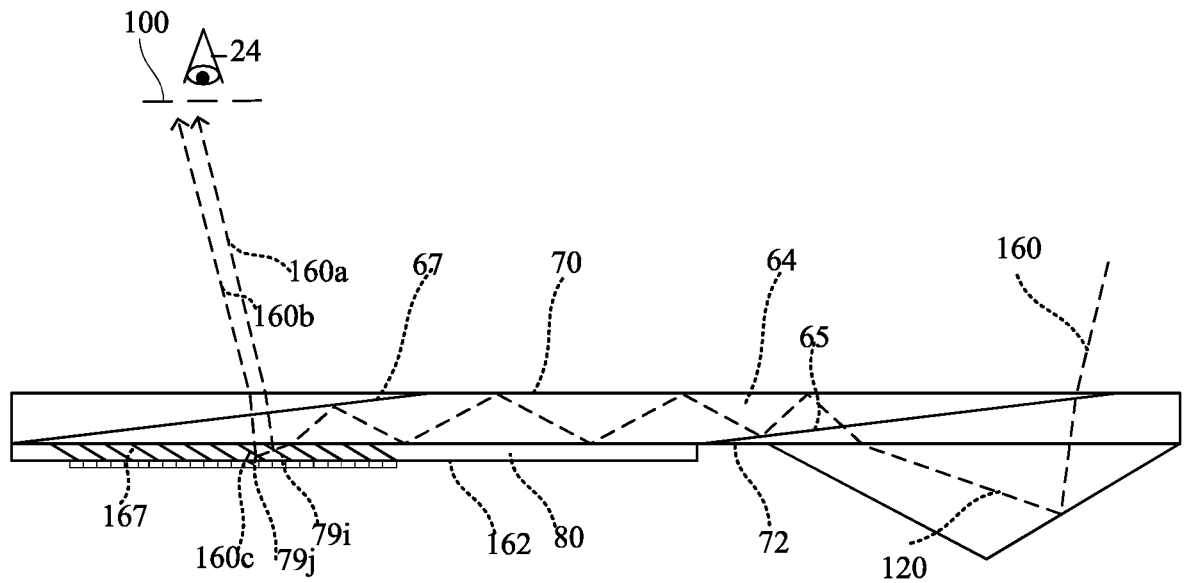
Figure 29B:
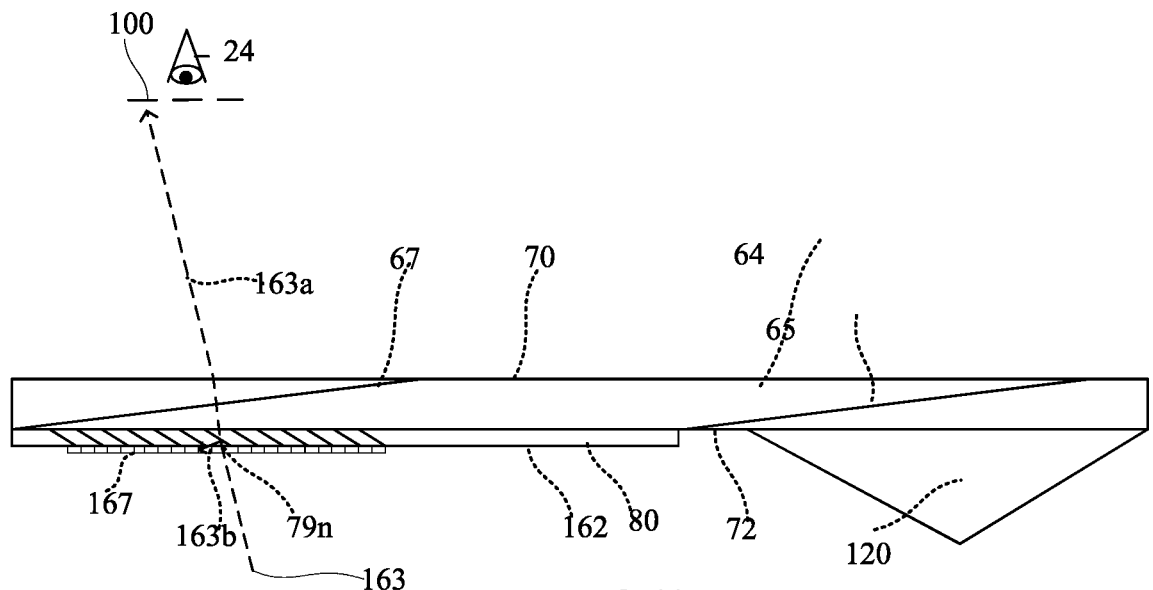
Figure 30:
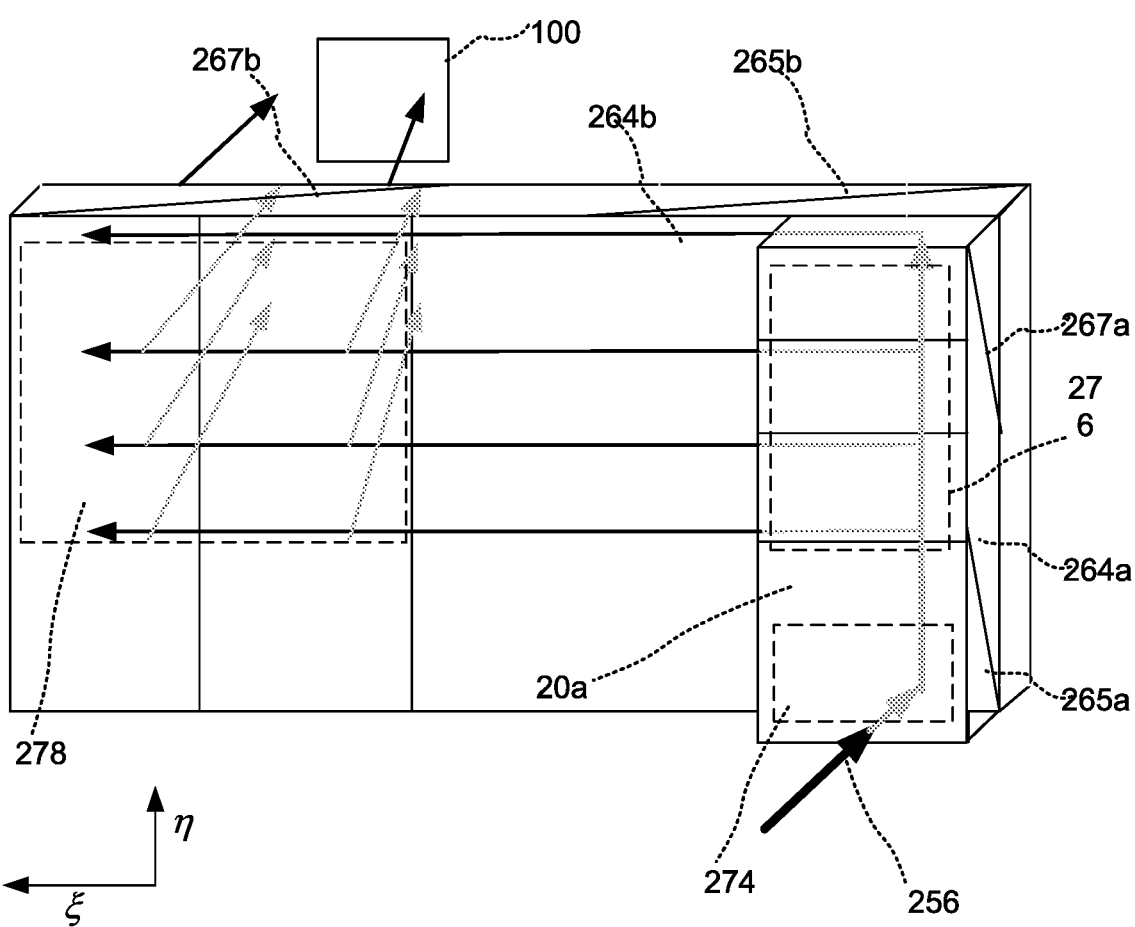
Figure 31A:
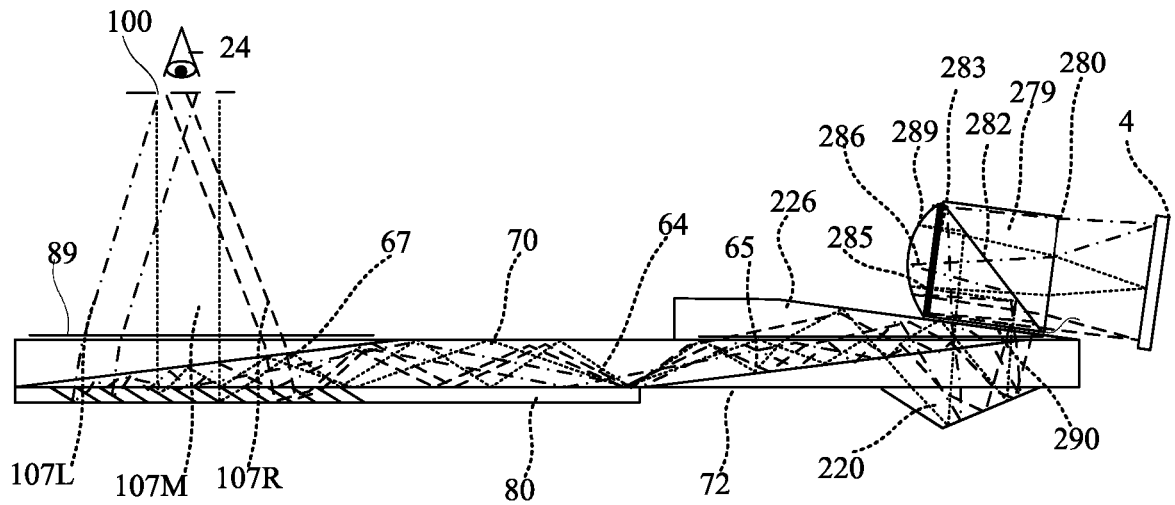
Figure 31B:
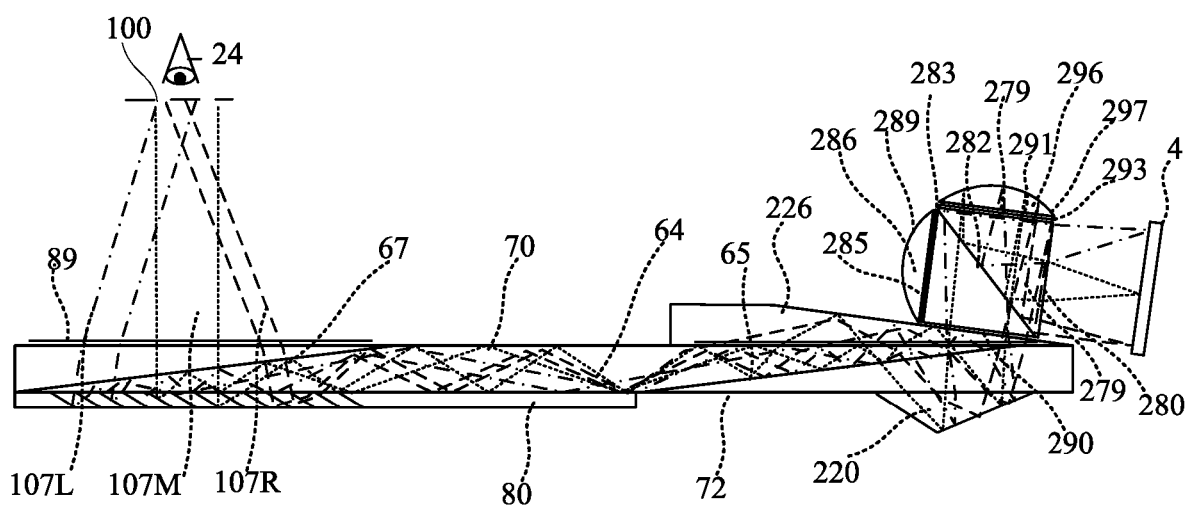

FIG. 7 schematically illustrates the active parts of the coupling-out surface, according to the viewing angle and the EMB of the system;

FIGS. 8A, 8B, 8C and 8D schematically illustrate the active parts of the coupling-in surface, according to the viewing angle and the EMB of the system;

FIGS. 9A, 9B, 9C and 9D are schematic sectional views of substrate-guided embodiments having a single coupling-out element, an intermediate prism, and an input aperture substantially smaller than the output aperture, according to the present invention;

FIG. 10 is a graph illustrating the reflection of incident light waves on an interface plane, for three different wavelengths, as a function of the incident angle, according to the present invention;

FIG. 11 is a graph illustrating the incident angle on an interface plane of two different light waves, and the critical angle of the interface plane, as a function of the wavelength, according to the present invention;

FIGS. 12A, 12B and 12C are graphs illustrating the reflection of the incident light waves on an interface plane for three different wavelengths, as a function of the incident angle, and the incident angles of two specific light waves, according to the present invention;

FIGS. 13A, 13B, 13C and 13D are schematic sectional views of other substrate-guided embodiments having a single coupling-out element, an intermediate prism, and an input aperture substantially smaller than the output aperture, according to the present invention;

FIGS. 14A, 14B, 14C and 14D are schematic sectional views of yet other substrate-guided embodiments having a single coupling-out element, an intermediate prism, and an input aperture substantially smaller than the output aperture, according to the present invention;

FIG. 15 is a graph illustrating the reflection of incident light waves on the coupling-in surface, for three different wavelengths, as a function of the incident angle, according to the present invention;

FIG. 16 is a graph illustrating the incident angle on the coupling-in surface of two different light waves, and the critical angle of the coupling-in surface, as a function of the wavelength, according to the present invention;

FIGS. 17A, 17B and 17C are graphs illustrating the reflection of the incident light waves on the coupling-in surface for three different wavelengths, as a function of the incident angle, and the incident angles of two specific light waves, according to the present invention;

FIGS. 18A, 18B, 18C and 18D are schematic sectional views of substrate-guided embodiments having a single coupling-out element, two intermediate prisms, and an input aperture substantially smaller than the output aperture, according to the present invention;

FIGS. 19A, 19B, 19C and 19D are other schematic sectional views of substrate-guided embodiments having a single coupling-out element, two intermediate prisms, and an input aperture substantially smaller than the output aperture, according to the present invention;

FIGS. 20A, 20B, 20C and 20D are yet other schematic sectional views of substrate-guided embodiments having a single coupling-out element, two intermediate prisms, and an input aperture substantially smaller than the output aperture, according to the present invention;

FIG. 21 is a schematic sectional view of substrate-guided embodiment having two adjacent substrates with different inclination angles of the coupling-in surfaces, according to the present invention;

FIGS. 22A, 22B, 22C and 22D are schematic sectional views of a single light wave coupled inside a substrate-guided embodiment having two adjacent substrates, according to the present invention;

FIGS. 23A, 23B, 23C and 23D are schematic sectional views of another light wave coupled inside a substrate-guided embodiment having two adjacent substrates, according to the present invention;

FIGS. 24A, 24B, and 24C are schematic sectional views of yet another light wave coupled inside a substrate-guided embodiment having two adjacent substrates, according to the present invention;

FIG. 25 is a schematic sectional view of three different light waves coupled inside a substrate-guided embodiment having two adjacent substrates, an intermediate prism, and an input aperture substantially smaller than the output aperture, according to the present invention;

FIGS. 26A and 26B are schematic sectional views of substrate-guided embodiments wherein undesired light waves reach the EMB of the system;

FIG. 27 is a schematic sectional view of substrate-guided embodiment having an array of absorptive surfaces for eliminating the total internal reflection from an external surface, according to the present invention;

FIGS. 28A, 28B, 28C, 28D, 28E and 28F are diagrams illustrating a method for fabricating a plate having an array of absorptive surfaces, according to the present invention;

FIGS. 29A and 29B are schematic sectional views of substrate-guided embodiments, wherein the undesired stray rays are absorbed inside a thin plate, according to the present invention;

FIG. 30 is a diagram illustrating a method to expand the output aperture along two axes utilizing a double substrate configuration, according to the present invention, and FIGS. 31A and 31B are other schematic sectional views of substrate-guided embodiments using a reflective lens as a collimating element for polarized and unpolarized display sources.

DETAILED DESCRIPTION OF EMBODIMENTS

Figure 1:
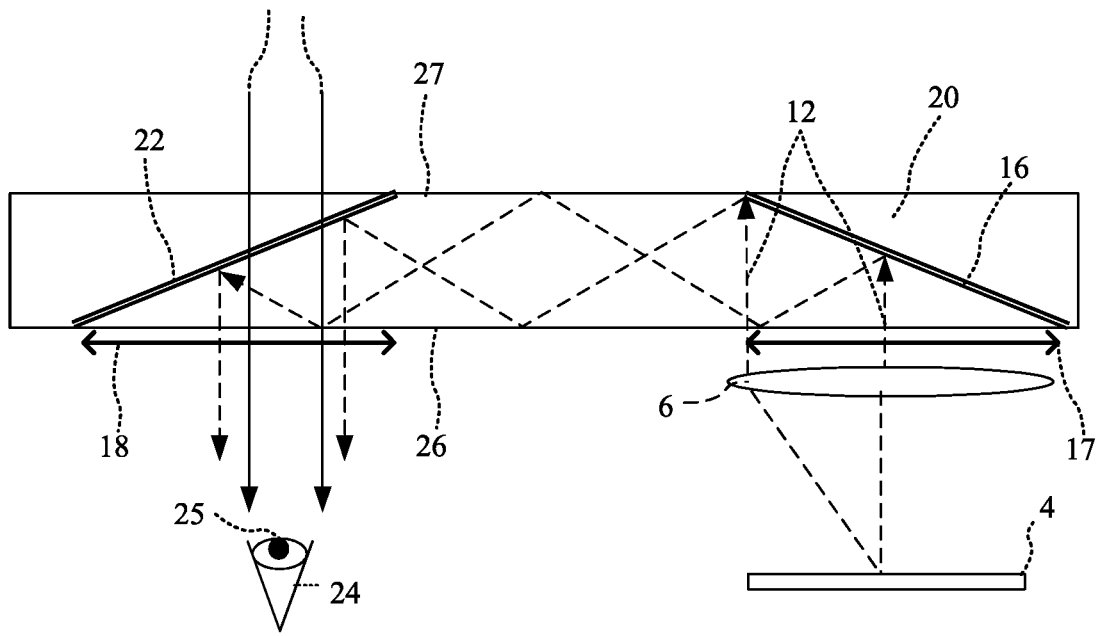

FIG. 1 illustrates a sectional view of a prior art light-transmitting substrate, wherein a first reflecting surface 16 is illuminated by a collimated light wave 12 emanating from a display source 4 and collimated by a lens 6 located between the source 4 and a substrate 20 of the device. The reflecting surface 16 reflects the incident light from the source 4 such that the light wave is trapped inside the planar substrate 20, by total internal reflection. After several reflections off the major surfaces 26, 27 of the substrate 20, the trapped light waves reach a partially reflective element 22, which couple the light out of the substrate into the eye 24, having a pupil 25, of a viewer. Herein, the input aperture 17 of the substrate 20 is defined as the aperture through which the input light waves enter the substrate, and the output aperture 18 of the substrate is defined as the aperture through which the trapped light waves exit the substrate. In the case of the substrate illustrated in FIG. 1, both the input and the output apertures coincide with the lower surface 26. Other configurations are envisioned, however, in which the input and the image light waves from the displace source 4 are located on opposite sides of the substrate, or on one of the edges of the substrate. As illustrated, the active areas of the input and the output apertures, which are approximately the projections of the coupling-in 16 and the coupling-out 22 elements on the major surface 26, respectively, are similar to each other.

In HMD systems it is required that the entire area of the EMB is illuminated by all the light waves emerging from the display source, to enable the viewer's eye looking at the entire FOV of the projected image simultaneously. As a result, the output aperture of the system should be extended accordingly. On the other hand, it is required that the optical module should be light and compact. Since the lateral extent of the collimating lens 6 is determined by the lateral dimension of the input aperture of the substrate, it is desired that the input aperture should be as small as possible. In systems such as those illustrated in FIG. 1, wherein the lateral dimensions of the input aperture are similar to that of the output aperture, there is an inherent contradiction between these two requirements. Most of the systems based on this optical architecture suffer from small EMB and small achievable FOV, as well as from a large and cumbersome imaging module.

Figure 2:
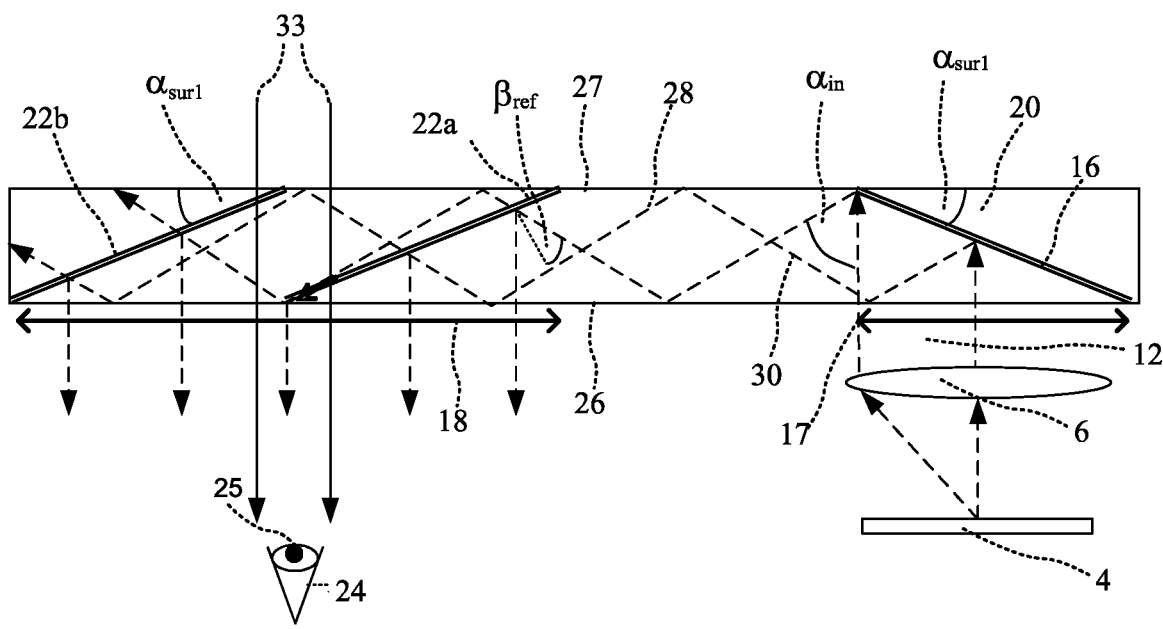

An embodiment which solves this problem, at least partially, is illustrated in FIG. 2, wherein the element which couples-out the light waves from the substrate is an array of partially reflecting surfaces 22a, 22b etc. The output aperture of this configuration can be extended by increasing the number of partially reflecting surfaces embedded inside the substrate 20. It is thus possible to design and construct an optical module having a small input aperture, as well as a large output aperture. As can be seen, the trapped rays arrive at the reflecting surfaces from two distinct directions 28, 30. In this particular embodiment, the trapped rays arrive at the partially reflecting surface 22a from one of these directions 28 after an even number of reflections from the substrate major surfaces 26 and 27, wherein the incident angle between the trapped ray and the normal to the reflecting surface is $\beta_{ref}$.

The trapped rays arrive at the partially reflecting surface 22b from the second direction 30 after an odd number of reflections from the substrate surfaces 26 and 27, wherein the incident angle between the trapped ray and the normal to the reflecting surface is $\beta_{ref}$.

As further illustrated in FIG. 2, for each reflecting surface, each ray first arrives at the surface from the direction 30, wherein some of the rays again impinge on the surface from direction 28. In order to prevent undesired reflections and ghost images, it is important that the reflectance be negligible for the rays that impinge on the surface having the second direction 28.

A solution for this requirement that exploits the angular sensitivity of thin film coatings, was previously proposed in the Publications referred to hereinabove. The desired discrimination between the two incident directions can be achieved if one angle is significantly smaller than the other one. It is possible to provide a coating with very low reflectance at high incident angles, and a high reflectance for low incident angles. This property can be exploited to prevent undesired reflections and ghost images by eliminating the reflectance in one of the two directions.

Figure 3A:
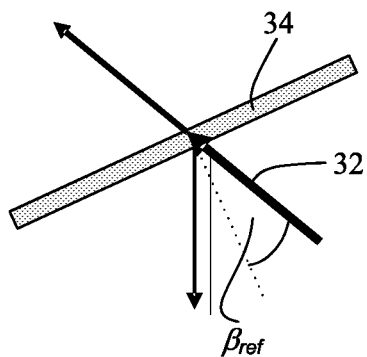
Figure 3B:
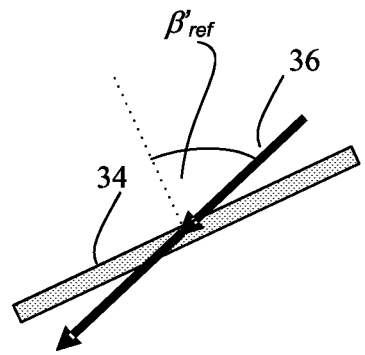

Referring now specifically to FIGS. 3A and 3B, these figures illustrate desired reflectance behavior of partially reflecting surfaces 34. While the ray 32 (FIG. 3A), having an off-axis angle of $\beta_{ref}$, is partially reflected and coupled out of the substrate 20, the ray 36 (FIG. 3B), which arrives at an off-axis angle of $\beta'_{ref}$ to the reflecting surfaces 34, is transmitted through the reflecting surfaces 34, without any notable reflection.

Figure 4:
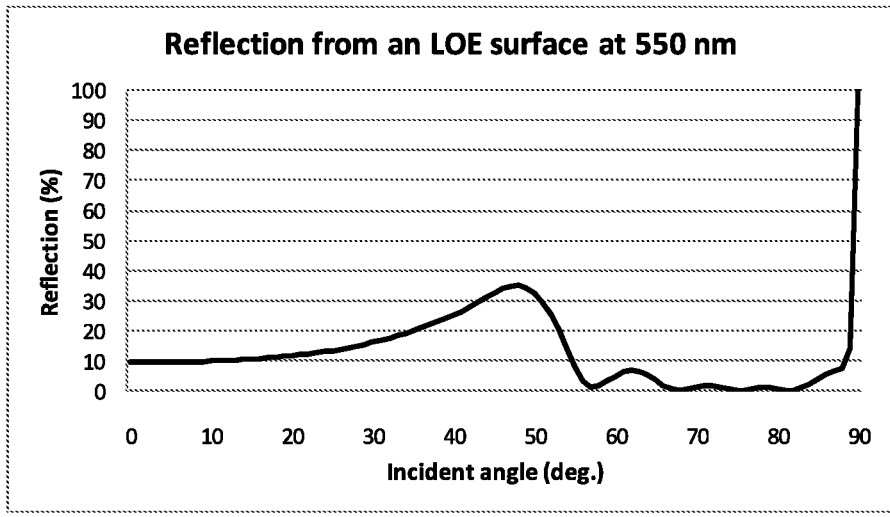

FIG. 4 illustrates the reflectance curve of a typical partially reflecting surface of this specific system, as a function of the incident angle for S-polarized light with the wavelength $\lambda$=550 nm. For a full-color display, similar reflectance curves should be achieved for all the other wavelengths in the relevant visible spectrum, which is usually, for most display sources, between 430 nm and 660 nm. There are two significant regions in this graph: between 65° and 85°, where the reflectance is very low, and between 10° and 40°, where the reflectance increases monotonically with increasing incident angles. As can be seen in FIGS. 3 and 4, the requested reflectance behavior of the partially reflective surfaces 22 of the embodiment illustrated in FIG. 2, is not conventional. Furthermore, to keep the low reflectance at the higher angular region, the reflectance at the lower angular region cannot be higher than 20%-30%. Furthermore, to achieve a uniform brightness over the entire FOV, it is required that the reflectance of partially reflecting surfaces will be increased gradually toward the edge of the substrate, and hence, the maximum achievable efficiency is comparatively low an and usually cannot be more than 10%.

Figure 5:
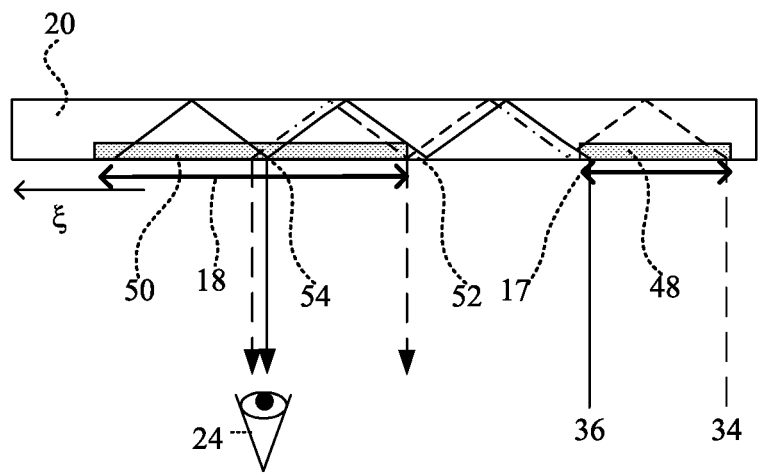

Another approach to couple light waves into and out from a light-guided optical element is by using diffractive elements. As illustrated in FIG. 5, the light rays 34 and 36 are coupled into the transparent substrate 20 by a diffractive element 48, and after several total internal reflections from the external surfaces of the substrate, the light rays are coupled-out from the substrate by a second diffractive element 50. As illustrated, ray 34 is coupled-out at least twice at two different points 52 and 54 on element 54. Consequently, to achieve uniform output light waves, the diffraction efficiency of element 50 should be increased gradually along the 4 axis. As a result, the overall efficiency of the optical system is even lower than that of the system illustrated in FIG. 2, and it is usually not more than a few percent. That is to say, in the embodiments illustrated in FIGS. 2 and 5, the output aperture is extended to be much larger than the input aperture at the cost of significantly reducing the brightness efficiency of the optical module, as well as complicating the fabricating process of the substrate.

Figure 6A:
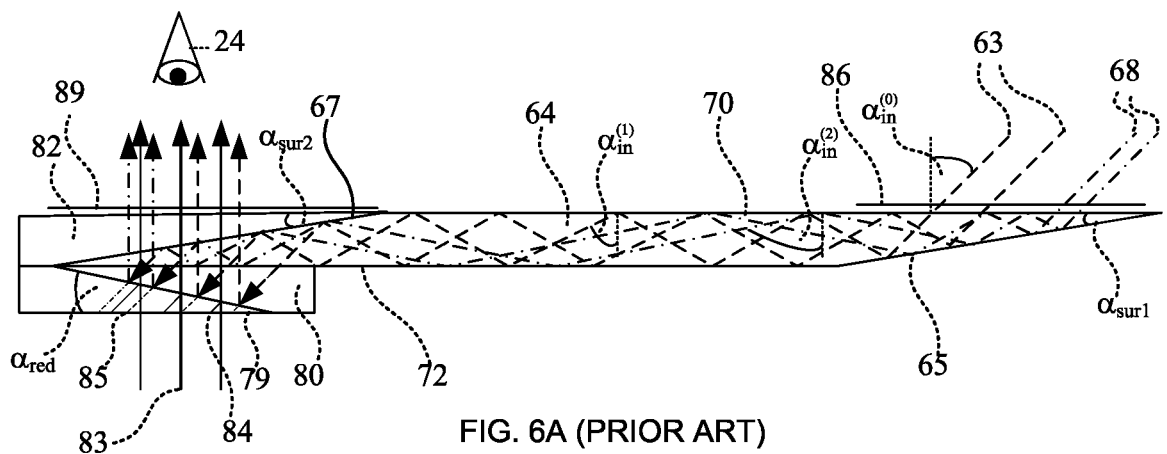
Figure 6B:
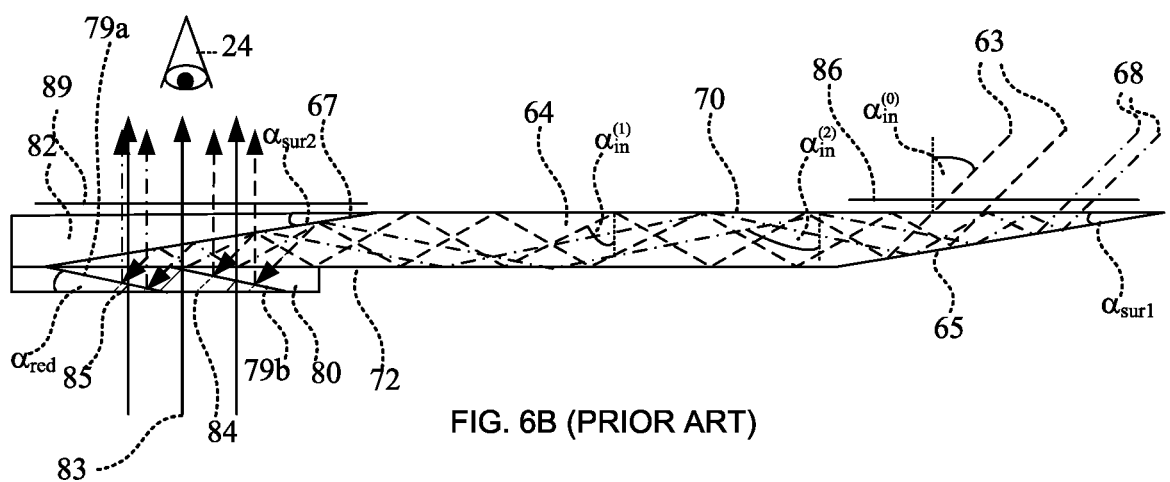

FIGS. 6A and 6B illustrate embodiments for overcoming the above-described problem. Instead of using a single element (22 in FIG. 2, or 50 in FIG. 5), which performs the dual function of coupling the light waves out of the substrate 20, as well as directing the light waves into the user's eye 24, the requested function is divided into two different elements; namely, one element, which is embedded inside the substrate couples the light waves out of the substrate, while a second conventional partially reflecting element, which is located out of the substrate, redirects the light waves into the viewer's eye. As illustrated in FIG. 6A, two rays 63 (dashed lines) from a plane light wave emanating from a display source and collimated by a lens (not shown) enter a light transparent substrate 64, having two parallel major surfaces 70 and 72, through the input aperture 86, at an incident angle of $\alpha_{in}^{(0)}$ with respect to the major surfaces 70, 72 of the substrate. The rays impinge on the reflecting surface 65, which is inclined at an angle $\alpha_{sur1}$ to the major surfaces of the substrate. The reflecting surface 65 reflects the incident light rays such that the light rays are trapped inside a planar substrate 64 by total internal reflection from the major surfaces. In order to differentiate between the various "propagation orders" of the trapped light waves, a superscript (i) will denote the order i. The input light waves which impinge on the substrate in the zero order are denoted by the superscript (0). After each reflection from the coupling-in reflecting surface the order of the trapped ray is increased by one from (i) to (i+1). The off-axis angle $\alpha_{in}^{(1)}$ between the trapped ray of the first order and the normal to the major surfaces 70, 72 is $$\alpha_{in}^{(1)} = \alpha_{in}^{(0)} + 2 \cdot \alpha_{sur1}. \qquad (1)$$

After several reflections off the surfaces of the substrate, the trapped light rays reach a second flat reflecting surface 67, which couples the light rays out of the substrate. Assuming that surface 67 is inclined at the same angle to the major surfaces as the first surface 65, that is to say, surfaces 65 and 67 are parallel and $\alpha_{sur2}=\alpha_{sur1}$, then the angle $\alpha_{out}$ between the coupled-out rays and the normal to the substrate plane is $$\alpha_{out} = \alpha_{in}^{(1)} - 2 \cdot \alpha_{sur2} = \alpha_{in}^{(1)} - 2 \cdot \alpha_{sur1} = \alpha_{in}^{(0)}. \qquad (2)$$

Hence, the coupled-out light rays are inclined to the substrate at the same angle as the incident light rays. So far, the coupled-in light waves behave similarly to the light waves illustrated in FIG. 1. FIG. 6A, however, illustrates a different behavior wherein two light rays 68 (dashed-dotted lines), having the same incident angle of $\alpha_{in}^{(0)}$ as rays 63, impinge on the right side of the reflecting surface 65. After two reflections from surface 65, the light waves are coupled inside the substrate 64 by a total internal reflection, and the off-axis angle of the trapped rays inside the substrate is now $$\alpha_{in}^{(2)} = \alpha_{in}^{(1)} + 2 \cdot \alpha_{sur1} = \alpha_{in}^{(0)} + 4 \cdot \alpha_{sur1}. \qquad (3)$$

After several reflections off the major surfaces of the substrate, the trapped light rays reach the second reflecting surface 67. The light rays 68 are reflected twice from the coupling-out surface 67 and are coupled out from the substrate at the same off-axis angle $\alpha_{out}$ as the other two rays 63 which are reflected only once from surfaces 65 and 67, which is also the same incident input angle of these four rays on the substrate major planes. Although all the four rays impinge and are coupled-out of the substrate at the same off-axis angle, there is a substantial difference between them: the two light rays 68 which incident on the right side of the reflecting surface 65 are closer to the right edge 66 of substrate 64, are reflected twice from surfaces 65 and 67, and are coupled-out from the substrate at the left side of surface 67, which is closer to the opposite left edge 69 of the substrate. On the other hand, the two light rays 63 which incident on the left side of the reflecting surface 65, are closer to the center of substrate 64, and are reflected once from surfaces 65 and 67, and are coupled-out from the substrate at the right side of surface 67, which is closer to the center of the substrate.

As further illustrated in FIGS. 6A and 6B, the inclination angle $\alpha_{out}$ of the image can be adjusted by adding a partially reflecting surface 79 which is inclined at an angle of $\alpha_{red}$ to the surface 72 of the substrate. As shown, the image is reflected and rotated such that it passes again through the substrate substantially normal to the substrate's major surfaces and reaches the viewer's eye 24 through the output aperture 89 of the substrate. To minimize distortion and chromatic aberrations, it is preferred to embed surface 79 in a redirecting prism 80, and to complete the shape of the substrate 64 with a second prism 82, both of them fabricated of the same material which, should not necessarily be similar to that of prism 80. In order to minimize the thickness of the system, it is possible, as illustrated in FIG. 6B, to replace the single reflecting surface 79 with an array of parallel partially reflecting surfaces 79a, 79b, etc., where the number of the partially reflecting surfaces can be determined according to the requirements of the system. Another way to redirect the coupled-out light waves into the viewer's eye is to use a flat meta-surface that is structured with subwavelength-scaled patterns.

Figure 6C:
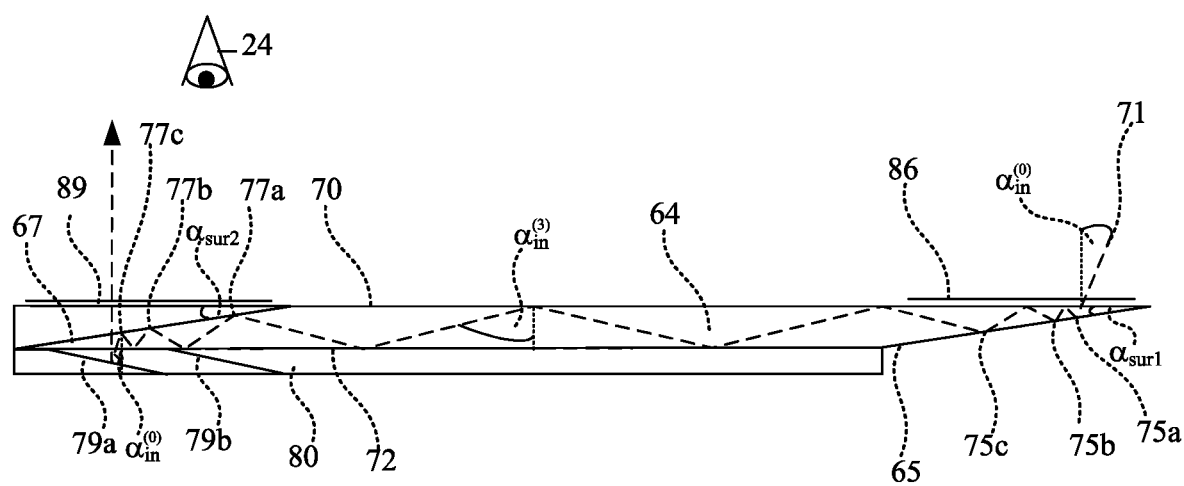

In the illustrated embodiments herein, it is assumed that light waves having only the first and the second orders of axis-axis angles, propagate inside the substrate. There are systems, however, having comparatively small inclination angle $\alpha_{sur1}$ of the coupling-in and the coupling-out surfaces, where even the third and the fourth orders can be utilized. As illustrated in FIG. 6C, an input ray 71 impinges on substrate 64 having an off-axis angle $\alpha_{in}^{(0)}$. After three reflections from surface 65 at points 75a, 75b and 75c, this ray is coupled inside the substrate and propagates inside it having the third order off-axis angle of $\alpha_{in}^{(3)}$. After a few reflections from the major surfaces of the substrate 64, the ray 71 impinges on surface 67. After three reflections from the surface at points 77a, 77b and 77c it is coupled out from the substrate 64 having an off-axis angle $\alpha_{in}^{(0)}$. The light ray 71 is then reflected by surface 79a, substantially normal to the substrate's major surface into the viewer's eye 24. As a rule, for systems having a few coupling-in orders, the lower order will be coupled into and from the substrate at the parts of the reflecting surfaces closer the substrate's edges, the higher order will be coupled at the parts of the reflecting surfaces' closer to the center of the substrate, while the middle order will be coupled from the central parts of the coupling-in and the coupling-out surfaces.

There are two contradicting requirements from the coupling-out surface 67. On the one hand, the first three order images $F^{(1)}$, $F^{(2)}$ and $F^{(3)}$ should be reflected from that plane, while on the second hand, the zero-order image $F^{(0)}$ from the substrate 64 should substantially pass through it, after being reflected from surface 79, with no significant reflections. In addition, for see-through systems, the transparency of the optical system for substantially normal incident light ray 83 from the external scene should be as high as possible. A way to achieve this is to use an air gap in surface 67. For achieving a rigid system, it is preferred, however, to apply an optical adhesive in surface 67, in order to cement the substrate 64 with prism 82 using an optical adhesive having a refractive index, which is substantially smaller than that of the substrate. There are situations, however, wherein the required refractive index of the optical adhesive, which yields the necessary total internal reflection effect for the entire coupled FOV, is very low—in the order of 1.31-1.35. There are optical adhesives that are commercially available and have the required refractive index. Still, usually their adhesion strength is not good enough, and their resistance to extreme environmental conditions is also insufficient for military and professional applications. An alternative solution is to apply a thin film of dielectric material on surface 67, using a spin coating procedure. The refractive index of the applied coating material is substantially smaller than that of the substrate, and should have the appropriate value, which yields the required total internal reflection from surface 67 for the entire FOV. Substrate 64 can be cemented now to prism 82 using an optical adhesive having the required adhesion strength and resistance to environmental conditions while its exact refractive index can have any reasonable value.

In any of the proposed approaches to minimize the Fresnel reflections of the transmitted light waves from the coupling-out surface 67, it is preferred to apply a suitable anti-reflective (AR) coating to this surface. In that case, the overall efficiency of light waves which pass through substrate can be very high, namely, the reflectance of surface 67 when coupling the light waves out of the substrate, is 100% as a result of the total internal reflection from that surface, while the transmission of that surface to the reflected light waves from surface 79, as well as for the light rays from the external scene, is also close to 100% as a result of the AR coating. Similarly, it is preferred to cement prism 80 to the lower surface 72 of substrate 64, defining an interface plane 81, using an optical adhesive having a refractive index, which is substantially smaller than that of the substrate, wherein an appropriate AR coating is applied to this interface plane. Here again, the total internal reflection from surface 72 can be achieved by applying an appropriate material using spin coating on surface 72 and using a conventional optical adhesive to cement prism 80 to surface 72. Consequently, the brightness of light waves, which are coupled out by surface 67 from the substrate, is similar to the brightness of the input light waves before being coupled into the substrate by surface 65, and the only place where their brightness is attenuated is by the partial reflection from surface 79. As a result, the brightness efficiency of the embodiment illustrated in FIGS. 6A-6C can be higher by an order of magnitude than the efficiency of the configurations illustrated in FIGS. 2 and 5.

As explained above with regard to FIG. 6A, in see-through systems such as HMDs for augmented reality (AR) applications, wherein the viewer should see the external scene through the substrate, the partially reflecting surfaces 79 should be at least partially transparent to enable the external light rays 63 and 68 passing through the substrate and reaching the viewer's eye 24. Since surfaces 79 are only partially reflective, only part of the coupled light waves 63 and 68 is reflected by surfaces 79 and reaches the viewer's eye, while another part of the light waves 84 passes through surfaces 79, coupled out from the prism 80 and do not reach the viewer's eye. Similarly, since surfaces 79 are only partially transmissive, only part of the external light rays 83 passes through surfaces 79 and reaches the viewer's eye, while another part of the light rays 85 is reflected from surfaces 79, coupled out from the prism 80 and does not reach the viewer's eye as well. Naturally, the efficiency of the projected image can be increased on account of the external scene, and vice-versa, namely, by increasing the reflectivity of the partially surfaces 79 the brightness of the coupled rays 63 and 68 is increased. Consequently, however, the transmissivity of surfaces 79 is decreased, and hence, the brightness of the external image 83 is reduced accordingly.

In contradiction to the embodiments illustrated in FIGS. 1-5, the surface 79 that reflects the coupled-out light from the substrate to the viewer's eye and, at the same time, transmits the external rays, is a conventional partially reflecting mirror without any special or complicated characteristics as surfaces 22 and 50 of the embodiments illustrated in FIGS. 2 and 5, respectively. As a result, it is possible to dynamically control the reflectivity (and consequently, the transmissivity) of the partially reflective surfaces 79, according to the external lighting conditions and the specific image which is projected to the viewer's eye. One way to control the reflectivity of surfaces 79 is by using an electrically switchable transreflective mirror, which is a solid-state thin film device made from a special liquid crystal material, and which can be rapidly switched between pure reflection, partial-reflection, and total transparent states. Another method to achieve a switchable element 79 is by forming it as a dynamic metasurface. The required state of the switchable mirror can be set either manually by the user, or automatically, by using a photometer which controls the reflectivity of the mirror according to the external brightness. This feature can be useful for conditions in which the projected image is properly combined with the external image, but the brightness of the external scene is comparatively high, and hence, it should be mostly blocked from dazzling the viewer and from interfering with the projected image. On the other hand, the efficiency of the projected image should be high enough to achieve a reasonable contrast. Therefore, the dynamic surface 79 can be switched into a primary reflection state, namely, the reflection of the switchable mirror is much higher than its transmission. As a result, the coupled out light rays 63 and 68 from the substrate are mainly reflected from surface 79 to the viewer's eye, and the overall efficiency of the optical system can be more than 90% while the bright external scene can still be seen properly. Consequently, the potential brightness efficiency of the embodiment illustrated in FIGS. 6A-6C can be higher by more than an order of magnitude than the efficiency of the configurations illustrated in FIGS. 2 and 5.

As seen in FIGS. 6A-6C, the aperture of the coupling-in surface 65 is similar to that of the coupling-out surface 67. Subsequently, the active area of the input aperture 86 is similar to that of the output aperture 89. As a result, although the potential brightness efficiency of the embodiment illustrated in FIGS. 6A-6C can be very high, it still suffers from the problem of similar input and output apertures. Therefore, an appropriate way should be found to reduce the input aperture for a given output aperture, or alternatively, to increase the output aperture for a given input aperture. In order to achieve this, the fact that the light waves coupled out from the substrate do not have to illuminate the entire active area of the coupling-out surface, is utilized.

FIG. 7 demonstrates the rays that should impinge on the output aperture of surface 89, in order to illuminate the EMB 100, including the two marginal and the central light waves of the image which are coupled out from the substrate and re-directed into the viewer's eye 24. As shown, the light waves 107R, 107M, and 107L, having the zero order off-axis angles $\alpha_{in}^{(0)}$(max), $\alpha_{in}^{(0)}$(mid) and $\alpha_{in}^{(0)}$(min), which are the minimal, central and maximal angles in the FOV respectively, illuminate only the parts 67R, 67M and 67L of the coupling-out reflecting surface 67, respectively, and are reflected by surface 89 into to EMB 100. A method can thus be determined, wherein the input aperture of the substrate will be significantly reduced, so that the coupled-in light waves will illuminate only the required respective part of surface 67, and hence, the original brightness will be preserved.

Figure 8A:
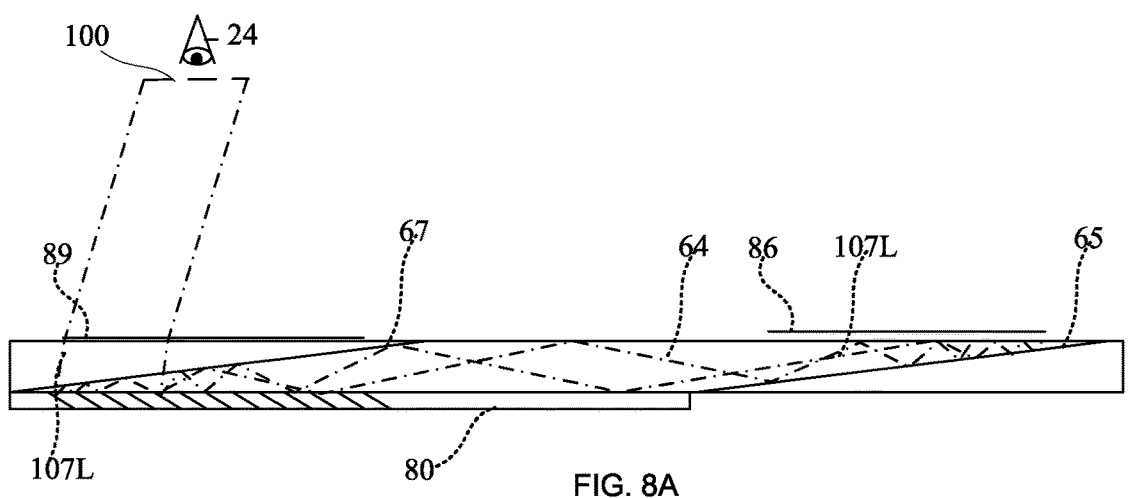
Figure 8B:
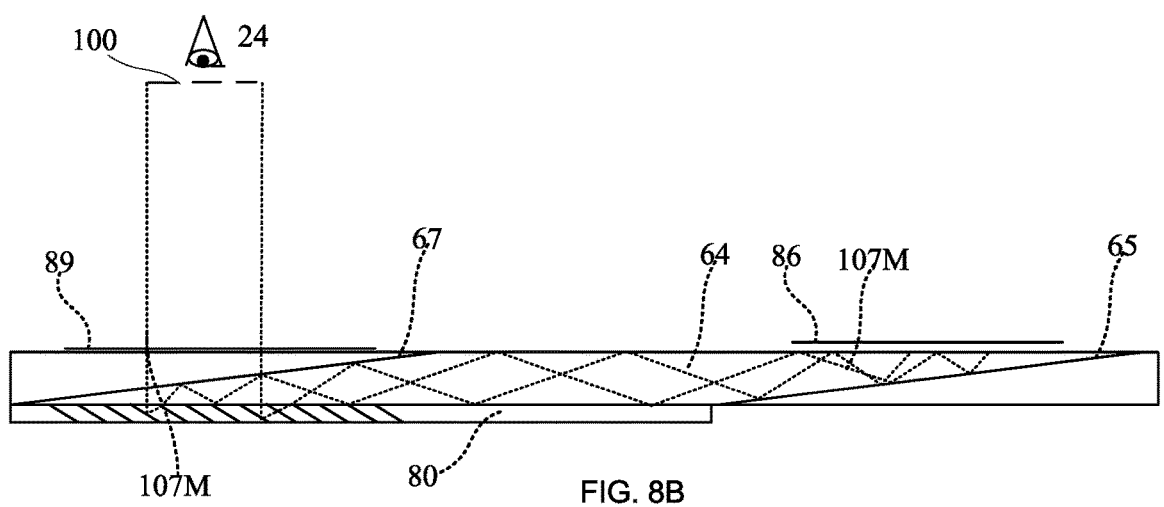
Figure 8C:
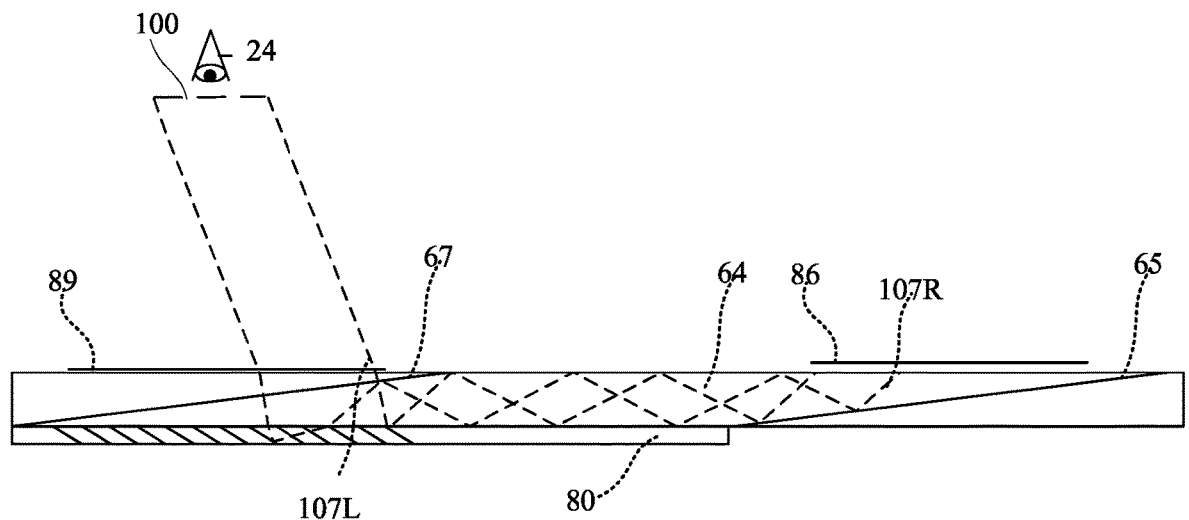
Figure 8D:
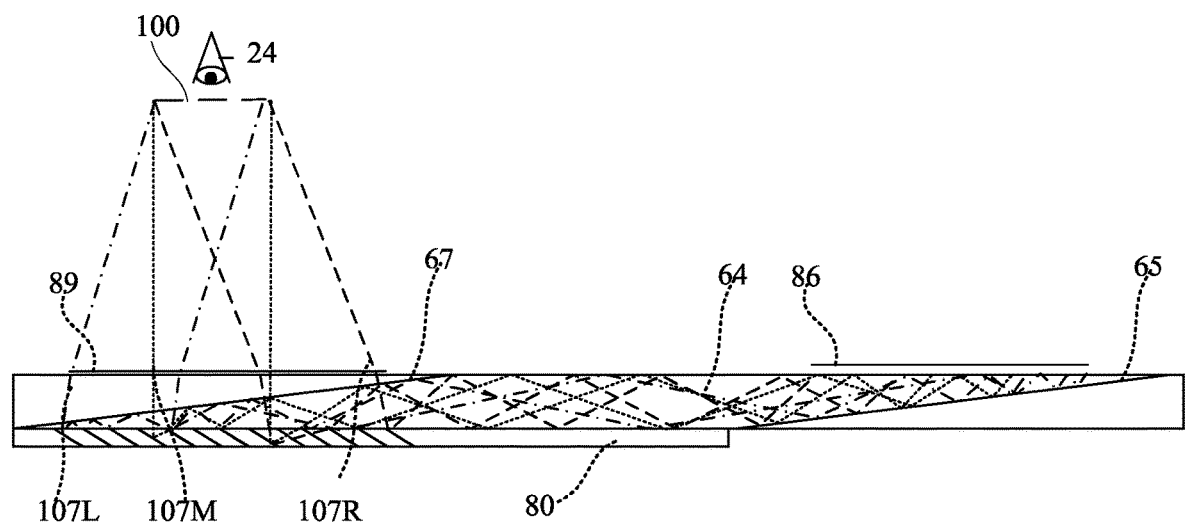

FIGS. 8A-8D illustrate the tracing-back of the three light waves from the EMB toward the input aperture 86 of the substrate 64. As shown, the light wave 107L (dashed-dotted lines, FIG. 8A) impinges on the right part of surface 65, trapped inside the substrate having an off-axis angle $\alpha_{in}^{(3)}$ after three reflection from surface 65, and is coupled-out from the substrate after three reflections from the surface 67, wherein the third reflection which couples the light wave out of the substrate is at the left part of surface 67. The light wave 107M (dotted lines, FIG. 8B) impinges on the central part of surface 65, trapped inside the substrate having an off-axis angle $\alpha_{in}^{(2)}$ after two reflection from surface 65, and is coupled-out from the substrate after two reflections from the surface 67, wherein the second reflection which couples the light wave out of the substrate is at the central part of surface 67. The light wave 107R (dashed lines, FIG. 8C) impinges on the left part of surface 65, trapped inside the substrate having an off-axis angle $\alpha_{in}^{(1)}$ after one reflection from surface 65, and is coupled-out from the substrate after one reflection from the right part of the surface 67. As illustrated in FIG. 8D, the lateral area of the input aperture 86, which covers the incoming light waves over the entire FOV, is similar to that of the output aperture 89, and hence, in this embodiment the target of reducing the input aperture 86 has not been achieved.

It should be noted however, that although the incoming waves cover a considerably large input aperture, they impinge on the input aperture at an orientation opposite to that of a conventional optical system. That is to say, when tracing the light waves backwards from the input aperture 86, instead of diverging away they are converging to become closer to each other. As a result, an intermediate prism can be added to the optical system, which will enable the traced-back light waves to be converged into a substantially smaller pupil than that of the input aperture 86.

Figure 9A:
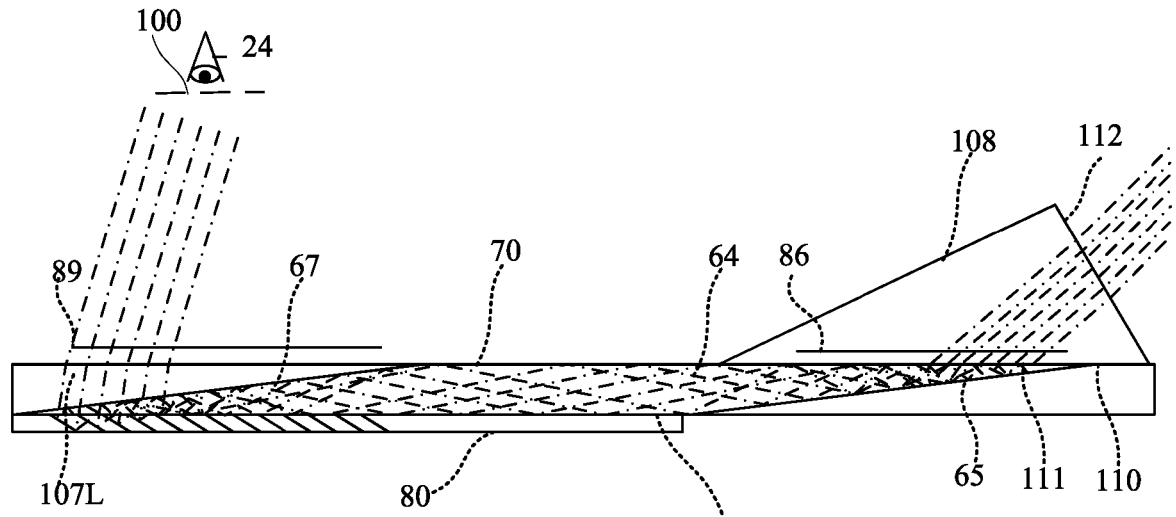
Figure 9B:
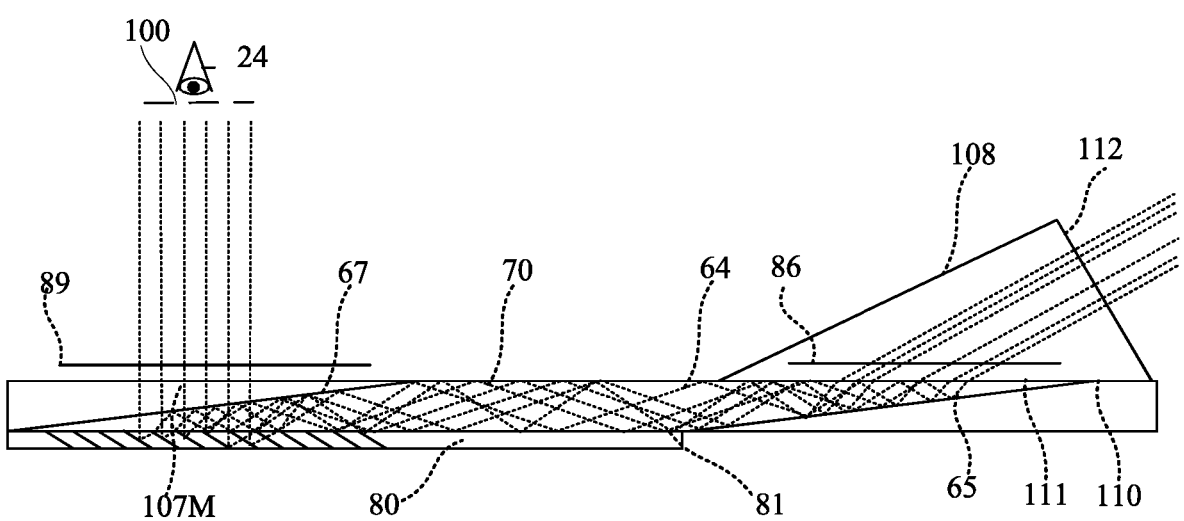
Figure 9C:
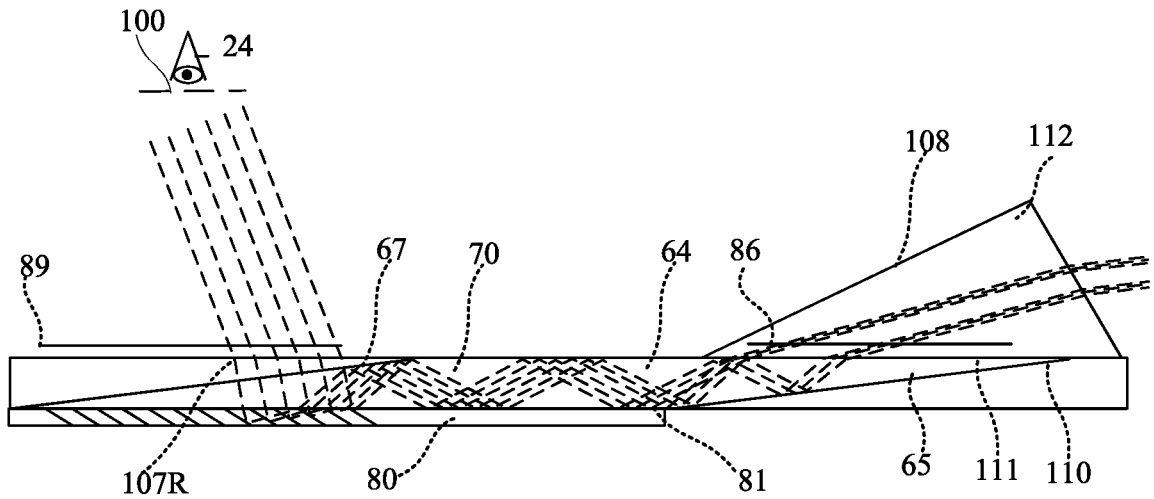
Figure 9D:
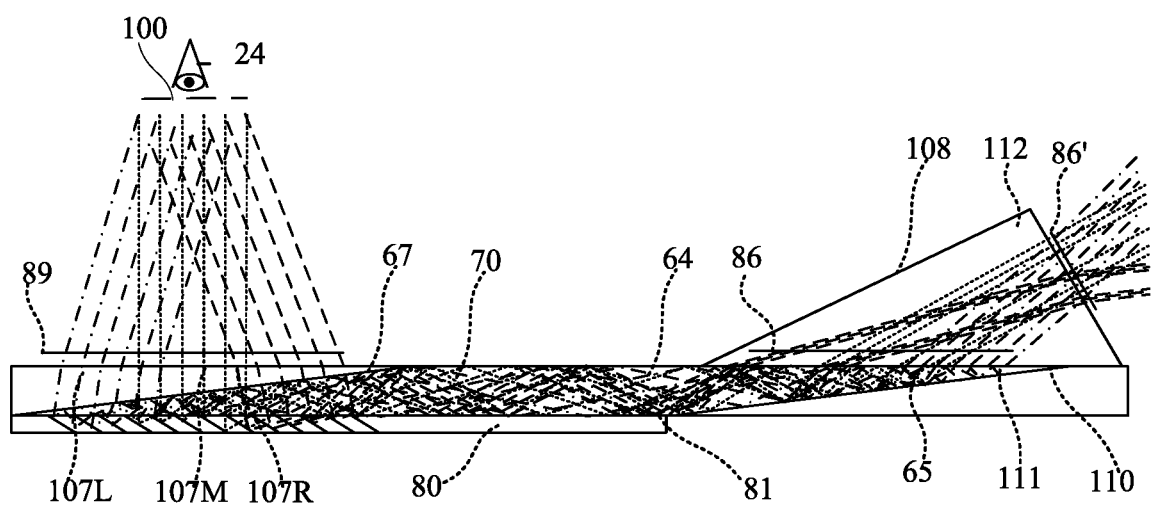

FIGS. 9A-9D illustrate the embodiment shown in FIGS. 8A-8D, wherein an intermediate prism 108 is attached to the substrate 64 at the input aperture 86. The surface 110 of prism 108 can be optically attached to the upper surface 70 of the substrate 64, defining an interface plane 111. To minimize chromatic dispersion, the optical material of the prism 108 should be similar to that of the redirecting prism 80. In addition, the light waves input surface 112 of prism 108 should be oriented such that the incoming waves 107R, 107M and 107L will impinge on surface 112 at the same angles which they are coupled out from the substrate 64 through the upper surface 70 toward the viewer's eye 24. Moreover, surface 112 should be located in a plane where the traced-back light waves are converged to a minimal aperture. As illustrated in FIG. 9D, all the incoming light waves incident on surface 112 inside a new input aperture 86' which is substantially smaller, by far more than a factor of two, than the original input aperture 86, as well as the output aperture 89.

There are two contradicting requirements from the interface plane 111 between the intermediate prism 108 and the substrate 64. On the one hand, the first three orders image $F^{(1)}$, $F^{(2)}$ and $F^{(3)}$ should be reflected from that plane, while the zero-order image) $F^{(0)}$ entering the substrate 64 through the intermediate prism 111, should substantially pass through it with no significant reflections. Similarly, the interface plane 81 between the substrate 64 and the redirecting prism 80 should be transparent to the coupled-out light waves having the input angle of $\alpha_{in}^{(0)}$ after the last reflection from surface 67, and at the same time highly reflective for the coupled light waves having the higher order input angles of $\alpha_{in}^{(1)}$, $\alpha_{in}^{(2)}$ and $\alpha_{in}^{(3)}$. In addition, for see-through systems the transparency of the optical system for substantially normal incident light, through the interface plane 81, should be as high as possible. A preferred way of achieving it is to apply an optical adhesive to these interface planes, having a refractive index which is substantially smaller than that of the substrate, or alternatively, to apply a thin film having the required refractive index on the interface plane 81 using a spin coating procedure. In addition, to minimize the Fresnel reflections of the transmitted light waves from the interface planes 81 and 111, it is preferred to apply a suitable AR coating to these planes. In that case, the overall efficiency of light waves which interact with these planes can be very high. That is to say, the reflectance of plane 111 when coupling the light waves into the substrate is 100% as a result of the total internal reflection from that surface while the transmission of that surface to the incoming light waves is also close to 100% as a result of the AR coating. Similarly, the reflectance of the light waves coupled inside the substrate 64 from surface 81, is 100% as a result of the total internal reflection from that surface, while the transmission of that surface to the light waves coupled-out from the substrate 64 into the redirecting prism 80, as well as for the incoming light waves from the external scene, is also close to 100% as a result of the AR coating.

For most of the relevant display systems, the two requirements should be fulfilled over the entire relevant visible spectrum. Therefore, it is reasonable to assume that the Abbe numbers of the optical adhesive (or alternatively, the thin film which is applied by spin coating), which is adjacent to the interface surfaces, and the optical material of the substrate, should be similar to avoid undesired chromatic effects in the image. To achieve the required total internal reflection phenomena, the refractive indices of the substrate and the adhesive (or the thin film) should be significantly different. As a result, it will be very difficult to fulfill this requirement and usually the Abbe numbers of the adhesive (or the thin film) and the optical material will be substantially different. The chromatic dispersion due to the variation between the Abbe numbers can be compensated, however, by choosing an optical material for the coupling-in and the redirecting of prisms 108 and 80, having an Abbe number which is different than that of the substrates 64. By a proper selection, the difference between the Abbe numbers can induce a chromatic dispersion having the same magnitude and an opposite direction. As a result, the two induced dispersions will be mutually compensated.

Another issue to consider is the maximum achievable FOV of the image which is projected into the viewer's eye. In most of the substrate-guided based HMD technologies, either reflective or diffractive, the light waves are coupled out from the guiding substrate substantially normal to the major surfaces of the substrate. Consequently, due to the Snell refraction from the substrate the external FOV of the image is:

$$F^{(out)} \sim F^{(in)} \cdot v_s \qquad (4)$$

wherein the FOV inside the substrate is $F^{(in)}$ and the refractive index of the substrate is $\square_S$. In addition, the orders of the light waves which are coupled inside the substrate should be strictly separated, namely, $$\alpha_{min}^{(1)} = \alpha_{min}^{(0)} + 2 \cdot \alpha_{sur1} > \alpha_{max}^{(0)}. \qquad (5)$$

In addition, to ensure the transmission of the entire zero-order through the interface planes 81 and 111, and the reflection of the entire first order from these planes, the following constraint $$\alpha_{cr} > \alpha_{max}^{(0)}; \qquad (6)$$
$$\alpha_{cr} < \alpha_{min}^{(1)}$$

must be fulfilled, wherein $\alpha_{cr}$ is the critical angle for the interface planes. Therefore, the internal FOV is limited by the constraint $$F^{(in)} = \alpha_{max}^{(0)} - \alpha_{min}^{(0)} < 2 \cdot \alpha_{sur1}. \qquad (7)$$

wherein usually a margin in the order of one degree should be kept between $\alpha_{max}^{(0)}$ and $\alpha_{min}^{(1)}$ to confirm the separation between the two orders. The limitation of Eq. (4) yields for systems wherein the refraction indices of the substrate, the coupling-in and the coupling-out elements are equal.

The fact that the optical light waves enter the substrate 64 from the intermediate prism 108 at highly oblique angles can be used to improve the above limitation. As illustrated in FIGS. 9A-9D, the intermediate 108 and the redirecting 80 prisms are fabricated from the same optical material having refractive index which have the following optical characteristic $$v_p < v_s \quad (8)$$

wherein $\alpha_s$ and $\alpha_p$ is the refractive index of the prisms 108 and 80. In addition, $A_p$, $A_s$, the Abbe numbers of the prisms and the substrates respectively, are chosen to compensate for the chromatic dispersion induced by the dissimilarity between the Abbe numbers of the substrate and the optical adhesive (or the thin film) as explained above.

As a result of the dissimilarities between the optical material of the substrates 64 and that of the intermediate 108 and the redirecting prisms 80, and the high obliquity that rays 107R, 107M and 107L incident on the interface surfaces 111 and 81, the light waves experience substantial refraction when passing through the interface surfaces. Since prisms 108 and 80 have the same optical characteristics, the refractions at surfaces 111 and 81 for each passing light wave will have the same magnitude and the opposite directions respectively, and therefore, they will be mutually compensated. The angular deviation between two different light rays inside the prisms as a function of the deviation inside the substrates can be calculated according to the approximated equation $$\Delta\alpha_p \sim \frac{v_s}{v_p} \cdot \frac{\cos\alpha_s}{\cos\alpha_p} \cdot \Delta\alpha_s, \quad (9)$$

wherein $\alpha_s$ and $\alpha_p$ are the off-axis angles inside the substrate and the prisms, respectively. Similarly, the angular deviation between the rays in the air is $$\Delta\alpha_{out} \sim v_p \cdot \Delta\alpha_p. \quad (10)$$

Consequently, the ratio between the angular deviation in the air and inside the substrate 64 is $$\Delta\alpha_{out} \sim v_s \cdot \frac{\cos\alpha_s}{\cos\alpha_p} \cdot \Delta\alpha_s, \text{ or} \quad (11)$$

$$F^{(out)} \sim F^{(in)} \cdot v_s \cdot \frac{\cos\alpha_s}{\cos\alpha_p}. \quad (12)$$

That is to say, by modifying the optical material of the prisms 108 and 80, it is possible to increase the FOV of the system in the air by a factor of $$\frac{\cos\alpha_s}{\cos\alpha_p}.$$

The implementation of the embodiment shown in FIGS. 9A-9D is illustrated herein with an optical system having the following nominal parameters:

$$\alpha_{sur1} = \alpha_{sur2} = 7°; F_{air}^{(0)} = \{-20°, 20°\}; F_p^{(0)} = \{48.6°, 74.6\} \quad (13)$$

$$F_s^{(0)} = \{36.6°, 49.7\}; F_s^{(1)} = \{50.6°, 63.7\}; F_s^{(2)} = \{64.6°, 77.7\},$$

$$F_s^{(3)} = \{78.6°, 91.7\}; F_{sur1}^{(0)} = \{43.6°, 56.7\}; F_{sur1}^{(1)} = \{57.6°, 70.7\},$$

wherein the light waves are unpolarized, the optical material of the substrate 64 is Ohara S-LAH88 having a refractive index of $v_d$=1.917 and Abbe number of $A_d$=31.6, the optical material of the prisms 81 and 111 is Schott N-BK7 having a refractive index of $v_d$=1.516 and Abbe number of $A_d$=65.5, the optical adhesive which are adjacent to surfaces 81 and 111 in FIGS. 9A-9D is NOA 148, having refractive index of $v_d$=1.48 and Abbe number of $A_d$=48. As shown, the FOV is 40° in the air, 26° inside the prisms 111 and 81 and 13° inside the substrate 64. That is, the FOV in the air is expanded by a factor of more than three compared to the FOV inside the substrate, even though the refractive index of the substrate is less than 2. The maximal angle in the third order is bigger than 90°, and hence, it has "illegal" propagation direction. As shown in FIGS. 9A-9C, however, the third order is active only for the light waves in the lower region of the FOV. The light waves in the upper region of the FOV are coupled inside the substrate after a single reflection from the coupling-in surface 65, and hence, they are propagating only in the first propagation order, and this contradiction is avoided.

FIG. 10 illustrates the reflection curve of an AR coating which is applied at the interface surfaces 81 and 111. As a result of the chromatic dispersion due to the variation between the Abbe numbers of the substrate 64 and the prisms 81 and 111, the critical angle depends strongly on the wavelength. Therefore, the condition $$\alpha_{min}^{(1)} > 51° \text{ and } \alpha_{max}^{(0)} < 49° \quad (1)$$

should assumingly be fulfilled over the entire relevant visible spectrum to satisfy the condition of Eq. (5). That is to say, the FOV inside the substrate should be reduced to 12°, and consequently, the FOV in the air will be reduced to 36°.

The high dispersion of the light waves which enter the substrate 64 through the intermediate prism 111 causes the spatial separation of each incoming white light wave into components of different wavelengths. For example, the marginal light wave 107R which has an off-axis angle of −20° for the entire visible spectrum is split into the propagation directions of 36.2°, 36.6° and 36.8° for the zero-order light waves having the wavelengths of 450 nm, 550 nm and 650 nm respectively. The exact values of the parameters given in Eq. (13) for three different wavelengths are $$F_{sb}^{(0)} = \{36.2°, 49.1°\}; F_{sg}^{(0)} = \{36.6°, 49.7\}; F_{sr}^{(0)} = \{36.8°, 50.1\}, \quad (15)$$

$$F_{sb}^{(1)} = \{50.2°, 63.1\}; F_{sg}^{(1)} = \{50.6°, 63.7\}; F_{sr}^{(1)} = \{50.8°, 64.1\},$$

$$F_{sb}^{(2)} = \{64.2°, 77.1\}; F_{sg}^{(2)} = \{64.6°, 77.7\}; F_{sr}^{(2)} = \{64.8°, 78.1\},$$

-continued $$F_{sb}^{(3)} = \{78.2°, 91.1\}; F_{sg}^{(3)} = \{78.6°, 91.7\}; F_{sr}^{(3)} = \{78.8°, 92.1\},$$

$$F_{surb}^{(0)} = \{43.2°, 56.1\}; F_{surg}^{(0)} = \{43.6°, 56.7\}; F_{surr}^{(0)} = \{43.8°, 57.1°\},$$

wherein the subscripts sb, sg and sr denote the parameters of the light waves inside the substrate 64, having the wavelengths of 450 nm, 550 nm and 650 nm respectively, and the subscripts surb, surg and surr denote the parameters of the incoming light waves impinging on the coupling-in surface 65, having the same wavelengths, respectively.

FIG. 11 illustrates the propagation directions $\alpha_{min}^{(1)}$ and $\alpha_{max}^{(0)}$, as well as the critical angle $\alpha_{cr}$, as a function of the wavelength for the entire relevant visible spectrum. As shown, for the entire spectrum the requirements given in Eqs. (5)-(6) are fulfilled without submitting to the limitation of Eq. (14), and the FOVs of at least 13° in the substrate and 40° in the air are preserved.

FIGS. 12A-12C illustrate, for the wavelengths 450 nm, 550 nm, and 650 nm respectively, the reflection curves of the AR coating which is applied at the interface surfaces 81 and 111, wherein two vertical lines denote the propagation directions $\alpha_{min}^{(1)}$ and $\alpha_{max}^{(0)}$ on the graph for each relevant wavelength. As shown, for all the wavelengths the reflection for the angle $\alpha_{min}^{(1)}$ is 100% as a result of the total internal reflection from the interface plane, while the transmission of for the angle $\alpha_{max}^{(0)}$ is negligible as required.

Figure 13A:
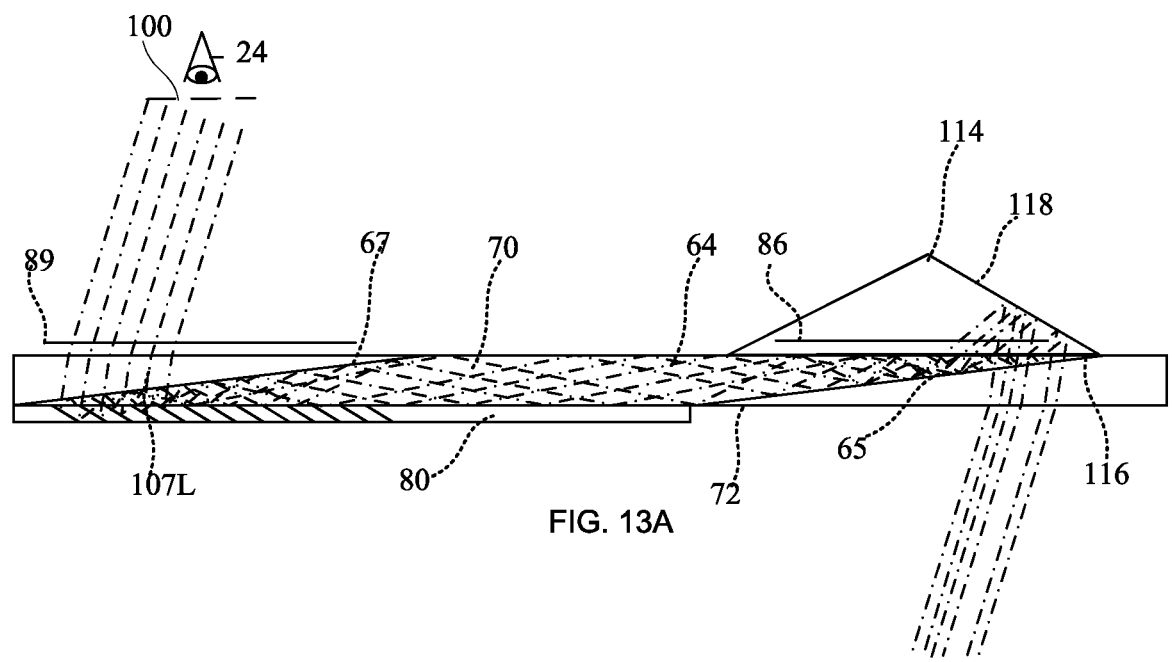
Figure 13B:
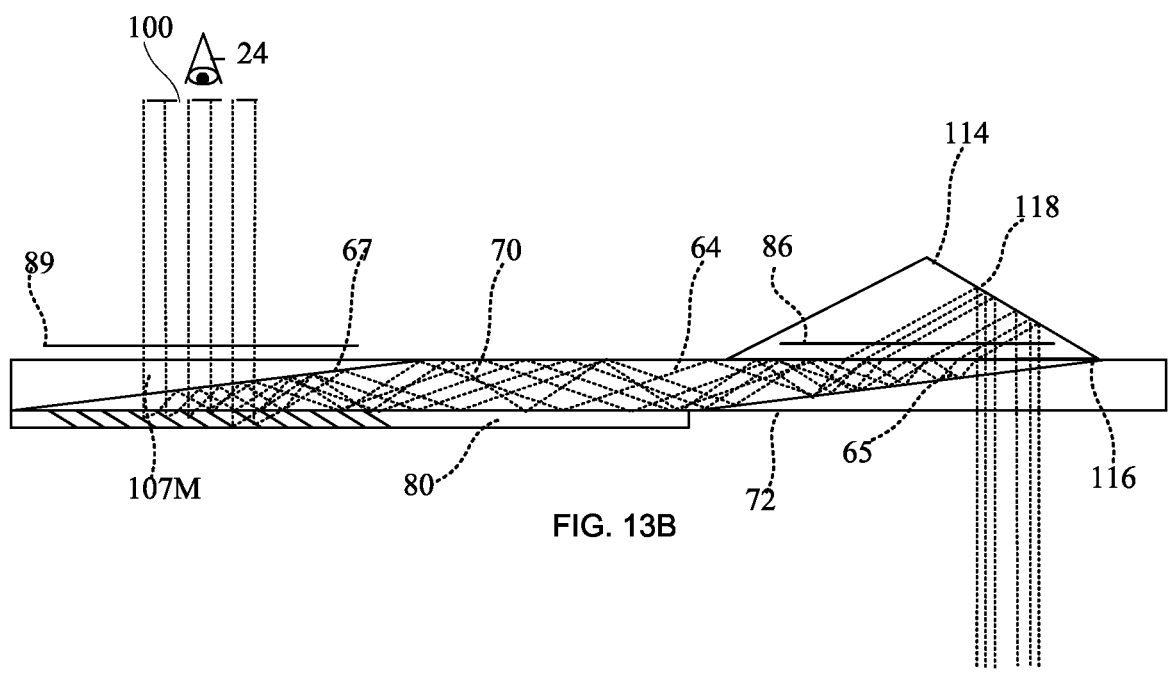
Figure 13C:
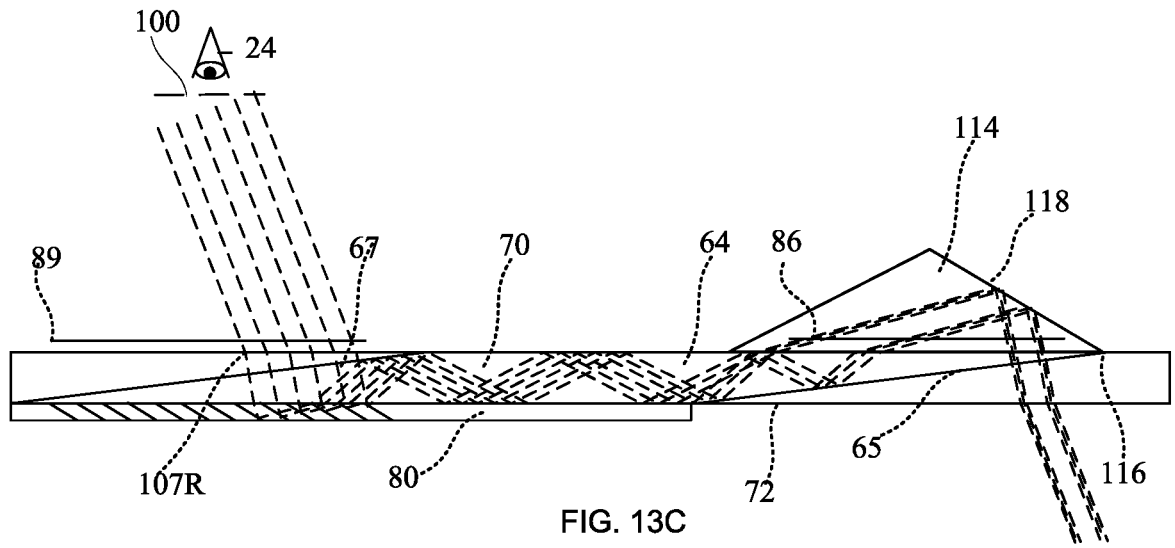
Figure 13D:
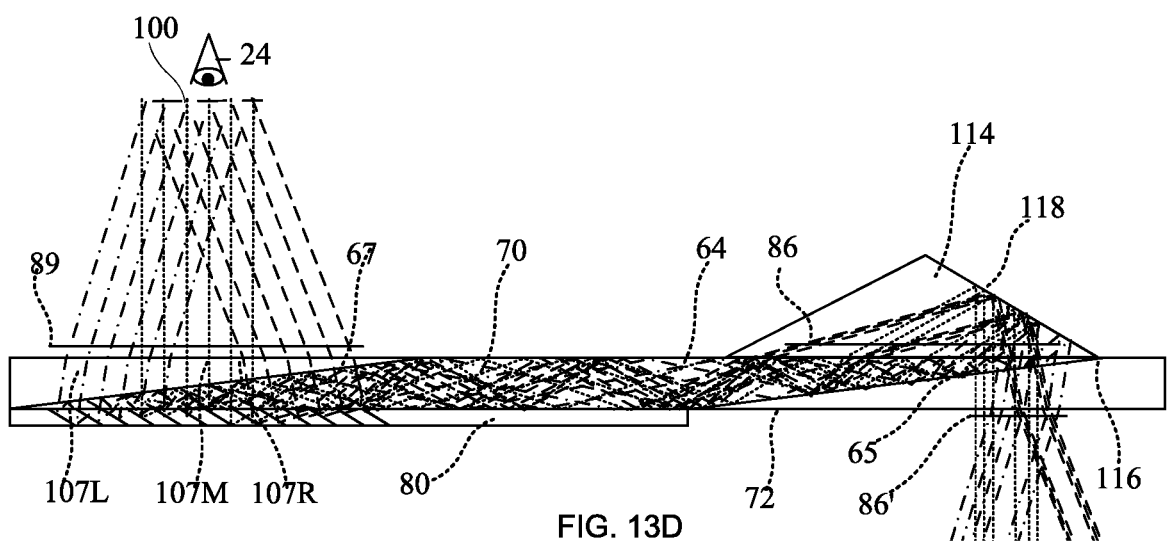

In FIGS. 9A-9D there is illustrated an embodiment of an optical system having a wide FOV of 40° along the propagation direction of the light waves inside the substrate 64, even though only a single coupling-out element 67 is utilized. The incoming directions of the input light waves, however, are at highly oblique angles. In many applications it is required that the incoming light waves will impinge on the substrate substantially normal to the major surfaces 70 and 72 of the substrate. FIGS. 13A-13C illustrate a configuration wherein the left marginal 107L, the central 107M and the right marginal 107R light waves, respectively, impinge on the substrate substantially normal to the lower surface 72. As shown, the light waves enter the substrate and pass through the coupling-in surface 65. Since the incident angles of the input light waves are substantially small and an AR coating is applied at surface 65, the reflectance of the light waves from this surface will be negligible. The light waves exiting the substrate 64, enter the intermediate prism 114 through its lower surface 116, which is attached to the upper surface 70 of the substrate, are reflected from the reflective surface 118, and re-enter the substrate 64 through its upper surface 70 at input angles of $\alpha_{in}^{(0)}$. The light waves now impinge on the coupling-in surface 65 having the incident angles of $\alpha_{in}^{(0)}+\alpha_{Sur1}$, which angles are higher than the critical angle, and are coupled inside the substrate in a similar manner as illustrated above in relation to FIGS. 9A-9D. As illustrated in FIG. 13D, the light waves in the entire FOV incident on surface 72 inside a new input aperture 86' which is substantially smaller, by at least a factor of three, than the original input aperture 86 as well as the output aperture 89. Here the input aperture 86' is not located adjacent to the intermediate prism 114, but rather next to the lower major surface 72 of the substrate. In general, the optical system should be designed such that the input aperture will be positioned in a convenient place for placing the external surface of the collimating module.

In the embodiment illustrated in FIGS. 13A-13D the light waves impinge on the substrate at surface 72 and the light waves exit the substrate into the viewer's eye through the opposite surface 70, namely, the viewer's eye and the display source are positioned at opposite sides of the substrate. This configuration is preferable for top-down configuration, however, there are other arrangements such as an eyeglasses structure, wherein it is required that the viewer's eye and the display source will be located at the same side of the substrate.

Figure 14A:
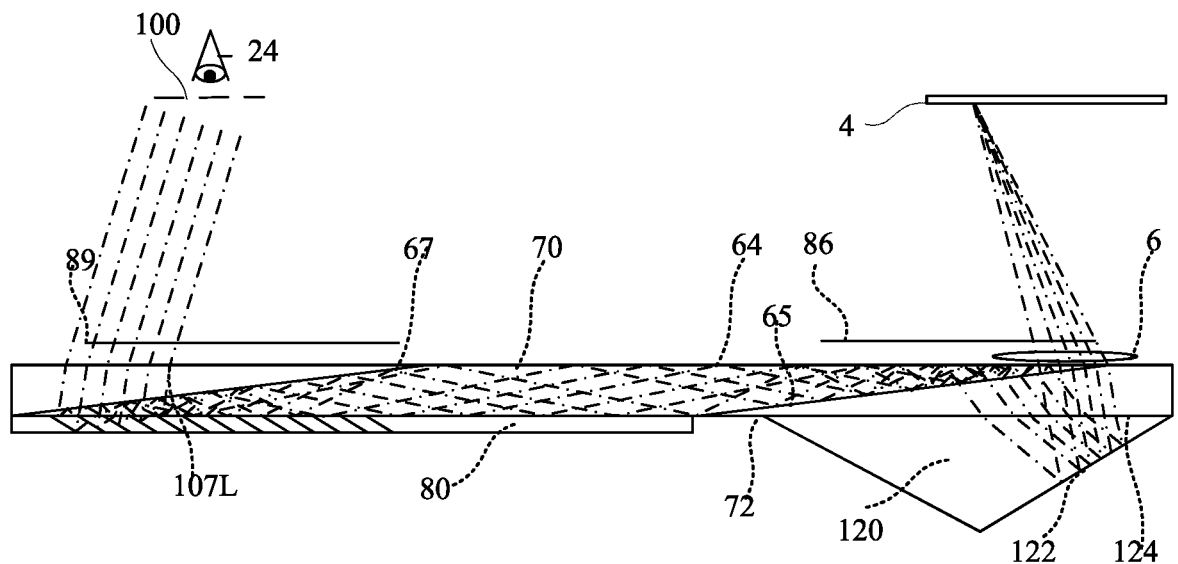
Figure 14B:
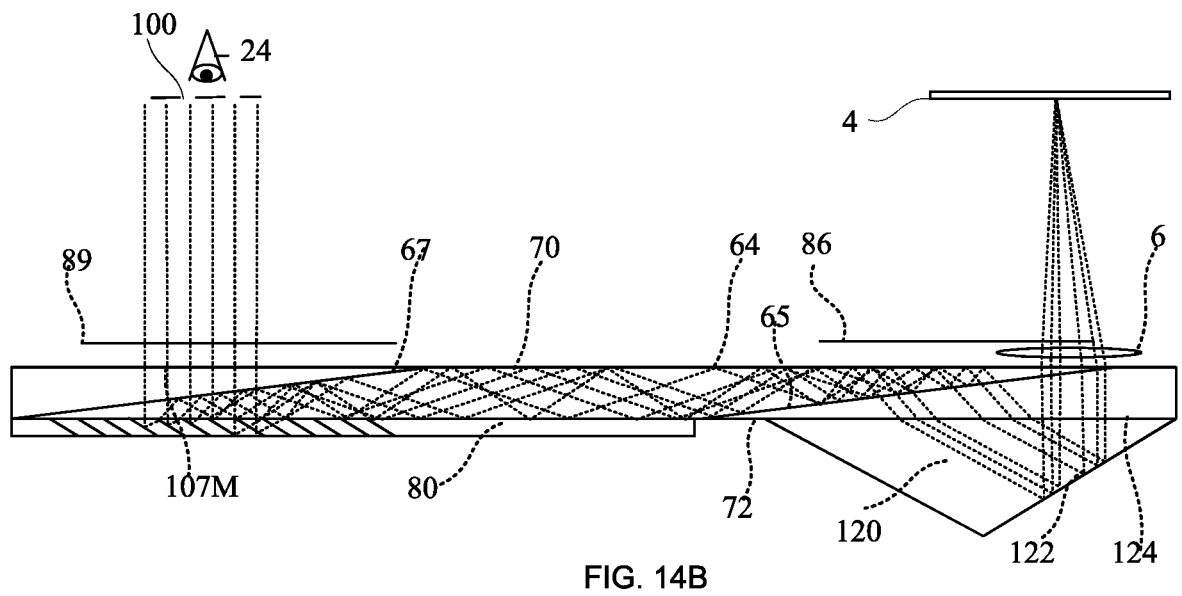
Figure 14C:
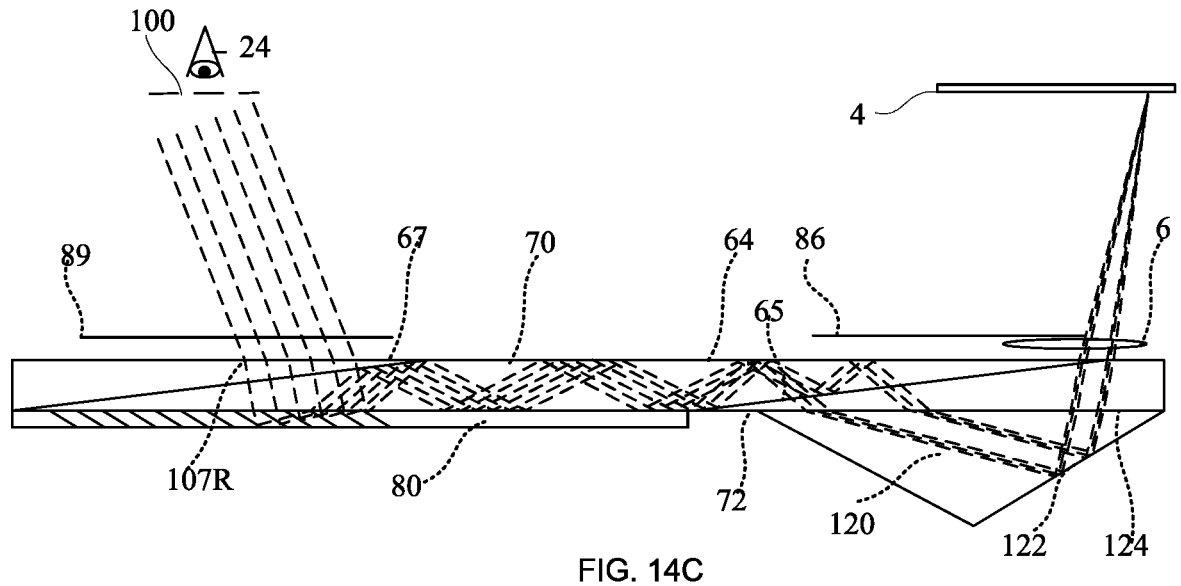
Figure 14D:
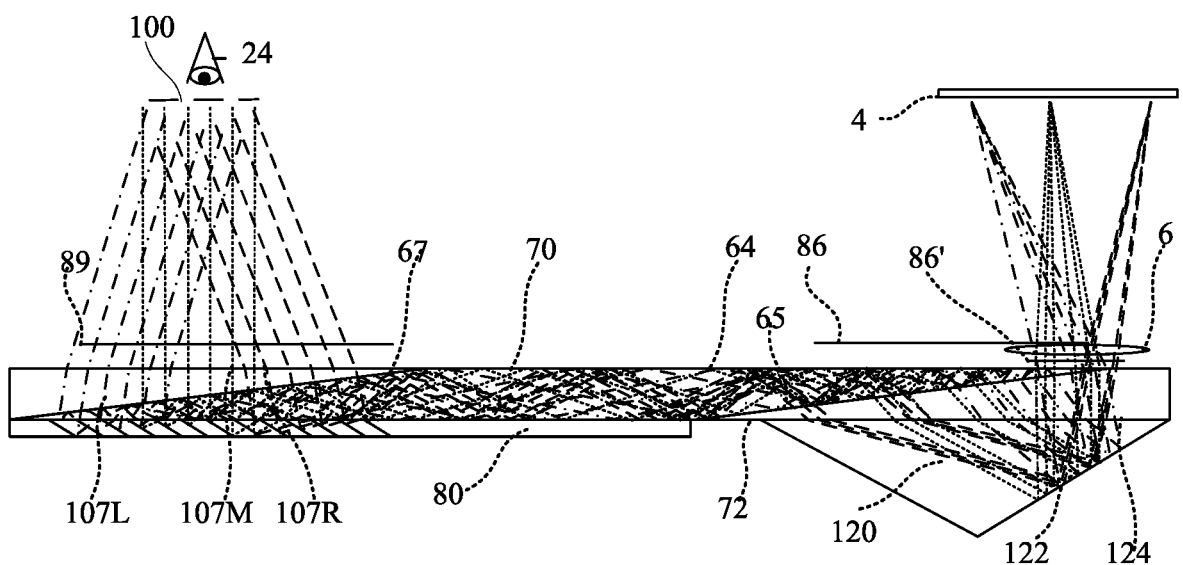

FIGS. 14A-14C illustrate a configuration wherein the left marginal 107L, the central 107M and the right marginal 107R light waves, respectively, impinge on the substrate substantially normal to the upper surface 70, at the same side of the viewer's eye. A lens 6 is added to the figure to illustrate the collimating of the light waves coming from the display source 4. As shown, the light waves enter the substrate and pass through the coupling-in surface 65 with no significant reflections. The light waves exit the substrate 64, enter the intermediate prism 120 through its upper surface 124, which is attached to the lower surface 72 of the substrate, are reflected from the reflective surface 122, and enter again the substrate 64 through its lower surface 72. The light waves impinge again on the coupling-in surface 65 having the incident angles of $\alpha_{in}^{(0)}-\alpha_{Sur1}$, which are lower than the critical angle, pass through the surface 65, and are totally reflected from the upper surface 70 of the substrate. The light waves impinge again on the coupling-in surface 65 now having the incident angles of $\alpha_{in}^{(0)}+\alpha_{Sur1}$, which are higher than the critical angle, and are coupled inside the substrate in a similar manner as illustrated above in relation to FIGS. 13A-13C. As illustrated in FIG. 14D, the light waves in the entire FOV incident on surface 70 inside a new input aperture 86' located next to the external surface of the collimating lens 6, is substantially smaller than the original input aperture 86.

Unlike the other configurations illustrated hereinbefore, in the embodiment described with regard to FIGS. 14A-14D, the light waves impinge on the coupling-in surface 65 three times. The first time, the requirement that the light waves will pass through surface 65 with no significant reflections, can be simply achieved by applying an AR coating at surface 65. For the other two impingements, however, there are two contradicting requirements from surface 65. On the one hand, the light waves being incident on the surface at the third time, having the incident angles of $\alpha_{in}^{(0)}+\alpha_{Sur1}$, should be reflected from that surface. On the other hand, the light waves being incident on the surface at the second time, having the incident angles of $\alpha_{in}^{(0)}-\alpha_{Sur1}$, should substantially pass through it with no significant reflections. A preferred way to achieve this, as described above in relation to the interface planes 81 and 111, is to apply an optical adhesive to the coupling-in surface 65, or thin film by spin coating, having a refractive index, which is substantially smaller than that of the substrate. In addition, to minimize the Fresnel reflections of the light waves which incident at the second time on surface 65, it is required to apply a suitable AR coating to these planes.

FIG. 15 illustrates the reflection curve of an AR coating which is applied at the coupling-in surface 65 for a substrate having the following parameters: the light waves are unpolarized, the optical material of the substrate 64 is Ohara S-LAH98 having a refractive index of $v_d=1.954$ and Abbe number of $A_d=32.32$, the optical adhesive which is adjacent to surface 65 is NOA 1315, having refractive index of $v_d=1.315$ and Abbe number of $A_d=56$. As a result of the chromatic dispersion due to the variation between the Abbe numbers of the substrate 64 and the optical adhesive, the critical angle depends strongly on the wavelength.

FIG. 16 illustrates the propagation directions $\alpha_{max}^{(0)} - \alpha_{Sur1}$ and $\alpha_{min}^{(0)} + \alpha_{Sur1}$, as well as the critical angle $\alpha_{cr}$, as a function of the wavelength for the entire relevant visible spectrum. As shown, for the entire spectrum there is a differentiation between the angular spectra of the second and the third impingements, and the spectra are located below and above the curve of the critical angle respectively, as required.

FIGS. 17A-17C illustrate, for the wavelengths 450 nm, 550 nm, and 650 nm respectively, the reflection curves of the AR coating which is applied at the coupling-in surface 65, wherein two vertical lines denote the propagation directions $\alpha_{max}^{(0)} - \alpha_{Sur1}$ and $\alpha_{min}^{(0)} + \alpha_{Sur1}$ on the graph for each relevant wavelength. As shown for all the wavelengths, the reflection for the third impingement, having an incident angle of $\alpha_{in}^{(0)} + \alpha_{Sur1}$, is 100% as a result of the total internal reflection from the interface plane, while the transmission for the second impingement, having an incident angle of $\alpha_{in}^{(0)} - \alpha_{Sur1}$, is negligible, as required.

While FIGS. 13A-13D and 14A-14D illustrate embodiments wherein the input light waves imping on the substrate substantially normal to the major surfaces, there are configurations wherein it is required that the input light waves will be oriented at oblique angles to the substrate. FIGS. 18A-18D illustrate a modified version of the embodiment shown in FIGS. 13A-13D. The light waves, which illuminate the substrate at a predefined angle, enter the substrate through the surface 128 of a first intermediate prism 126 which is attached to the lower surface 72 of the substrate 64, and pass through the coupling-in surface 65 with no significant reflections. The light waves then exit the substrate 64, enter a second intermediate prism 132 through its lower surface 136, which is attached to the upper surface 70 of the substrate, are reflected from the reflective surface 134, and re-enter the substrate 64 through its upper surface 70. The light waves are reflected by the coupling-in surface 65 and trapped inside the substrate in a similar manner as illustrated above in relation to FIGS. 13A-13D.

FIGS. 19A-19D illustrate a modified version of the embodiment shown in FIGS. 14A-14D. The light waves, which illuminate the substrate 64 at a predefined angle, enter the substrate through the surface 140 of a first intermediate prism 138 which is attached to the upper surface 70 of the substrate, and pass through the coupling-in surface 65 with no significant reflections. The light waves exiting the substrate 64, enter the second intermediate prism 144 through its upper surface 148, which is attached to the lower surface 72 of the substrate, are reflected from the reflective surface 146, and enter again the substrate 64 through its lower surface 72. Then, the light waves impinge again on the coupling-in surface 65 having incident angles of $\alpha_{in}^{(0)} - \alpha_{Sur1}$, which are lower than the critical angle, pass through the surface 65, and are totally reflected from the upper surface 70 of the substrate. The light waves impinge again on the coupling-in surface 65 having now the incident angles of $\alpha_{in}^{(0)} + \alpha_{Sur1}$, which are higher than the critical angle, and they are coupled inside the substrate in a similar manner as illustrated above in relation to FIGS. 14A-14C.

FIGS. 14A-14D and 19A-19D illustrate embodiments which can be utilized for eyeglasses configurations. There are situations, however, particularly for consumer market applications wherein, for aesthetic considerations, it is required that the folding prism, which is attached to the front surface of the substrate 72, will be as small as possible. FIGS. 20A-20D illustrate modified versions of the embodiments shown in FIGS. 14A-14D and 19A-19D, wherein the light waves, which illuminate the substrate 64 at a predefined angle, enter the substrate through the surface 228 of a first intermediate prism 226, which is attached to the upper surface 70, and pass through the coupling-in surface 65 with no significant reflections. The light waves exiting the substrate 64, enter the second intermediate prism 220 through the upper surface 224, which is attached to the lower surface 72 of the substrate, are reflected from the reflective surface 222, and enter again the substrate 64 through its lower surface 72. Here, however, the inclination angle of the reflecting surface 222, compared to the major surface 72, is significantly smaller than the inclination angle of surfaces 122 and 146 in the configurations of FIGS. 14A-14D, and 19A-19D, respectively. As a result, the light waves impinge again on the coupling-in surface 65 having incident angles of $\alpha_{in}^{(0)} - \alpha_{Sur1} - \varepsilon$, wherein $\varepsilon$ is an angle which can be determined according to design considerations, but is typically bigger than 5°. Now, even the maximal incident angle $\alpha_{max}^{(0)} - \alpha_{Sur1} - \varepsilon$ is considerably lower than the critical angel, and hence a simpler AR coating can be applied to surface 65. The light waves continue to pass through the surface 65, enter again the first intermediate prism 226 through its lower surface 230, which is attached to the upper surface 70 of the substrate. The waves are then totally reflected from the external surface 228 and re-enter the substrate 64 through its lower surface 72. The inclination angle of surface 228 is set to compensate for the "missing" angle $\varepsilon$. Consequently, the light waves which are higher than the critical angle now having the incident angles of $\varepsilon_{in}^{(0)} + \alpha_{Sur1}$, impinge again on the coupling-in surface 65 and are coupled inside the substrate in a similar manner as illustrated above in relation to FIGS. 14A-14C and 19A-19D.

In all the embodiments illustrated above, a high FOV of 40°, along the propagation direction inside the substrate, was achieved utilizing a single coupling-out surface 67. For side-view configurations, such as eyeglasses, the diagonal FOV can be 47° or 50°, depends on the aspect ratio of the display source (9:16 or 3:4, respectively). For top-down configurations, such as helmet-mounted-displays, the diagonal FOV can be extended to more than 80° for aspect ratio of 9:16. Assuming, for the sake of maximizing the brightness efficiency, that a single coupling-out surface in the substrate is preferred, there are two contradicting requirements from the angular orientation $\alpha_{Sur1}$ of that surface. On the one hand, as a result of the limitation given in Eq. (7), it is preferred to increase the angle in order to enlarge the total FOV that can be coupled inside the substrate. On the other hand, the extent of the output aperture 89 of the substrate is proportional to $d \cdot \cot(\alpha_{Sur1})$, wherein d is the thickness of the substrate, namely, the output aperture, and therefore the EMB, will be extended by reducing $\alpha_{Sur1}$. It is also possible to increase the output aperture by increasing the thickness of the substrate, but the input aperture will be also increased accordingly. In addition, it is usually required that the substrate will be as thin as possible.

FIG. 21 illustrates a modified version of the embodiment shown in FIGS. 14A-14D. Instead of using a single substrate 64, the shown system 150 comprises two adjacent substrates 64a and 64b. The upper surface 70b of substrate 64b is optically attached to the lower surface 72a of substrate 64a, defining an interface surface 152. The orientation angle $\alpha_{sur-b}$ of the coupling-in and the coupling-out surfaces 65b and 67b, is set by the required FOV according to the limitation of Eq. (7), while the orientation angle $\alpha_{sur-a}$ of the coupling-in and the coupling-out surfaces 65b and 67b, is set to a lower value of $$\alpha_{sur-a} = \alpha_{sur-b} - \delta. \qquad (16)$$

As a result, the entire FOV can be coupled inside the lower substrate 64b. To withstand the requirement of Eq. (7), however, only a partial part of the FOV can be coupled inside the upper substrate 64a. That is to say, the FOVs coupled inside the two substrates are $$F^{(a)} = \{\alpha_{min}^{(0)} + 2 \cdot \delta, \alpha_{max}^{(0)}\}; F^{(b)} = \{\alpha_{min}^{(0)}, \alpha_{max}^{(0)}\}. \qquad (17)$$

The lower part of the FOV $\{\alpha_{min}^{(0)}, \alpha_{min}^{(0)+2\cdot\delta}, \alpha_{max}^{(0)}\}$ is thus coupled only inside the lower substrate 64b, and to in order to avoid a cross-talk with the upper part of the FOV, it is not coupled inside the upper substrate 64a. Since the light waves from the lower part of the FOV illuminate the viewer's eye from the left part of the output aperture, it should be coupled out from the left coupling-out surface 67b, that is, it should be transmitted to the eye only through the lower substrate 64b. Therefore, the total FOV of $\{\alpha_{min}^{(0)}, \alpha_{max}^{(0)}\}$ can be retained for the entire EMB. In addition, the output aperture $AP_{out}$ is expanded by the extent of $$\Delta AP_{out} = d_a \cdot [\cot(\alpha_{Sur-a}) - \cot(\alpha_{Sur-b})]. \qquad (18)$$

Alternatively, for a given output aperture, the thickness of the double grating $d_b+d_a$ can be thinner by the ratio of $$\frac{d_b + d_a}{d} = \frac{d \cdot \cot(\alpha_{Sur-b})}{d_a \cdot \cot(\alpha_{Sur-b}) + d_a \cdot \cot(\alpha_{Sur-b})} \qquad (19)$$

wherein $d_a$ and $d_b$ are the thicknesses of the substrates 64a and 64b respectively, and d is the thickness of a single substrate such as in the embodiment illustrated in FIGS. 14A-14B. Consequently, the embodiment of FIG. 21 has the advantages of a wider FOV, determined by the bigger angle $\alpha_{sur-b}$, as well as a larger output aperture determined by the smaller angle $\alpha_{sur-a}$. Since each one of the two substrates 64a and 64b functions independently, each separate substrate can have different parameters, in addition to the inclination angle. The two substrates can have, inter alia, different thickness, refractive index and Abbe number, according to requirements of the optical system. Moreover, the relative locations of the coupling-in surfaces 65a and 65b, as well as that of the coupling-out surfaces 67a and 67b, can be set freely to minimize the input aperture 86' (see FIG. 25) and at the same time to maximize the output aperture 89 (see FIG. 25) of the system.

Figure 22A:
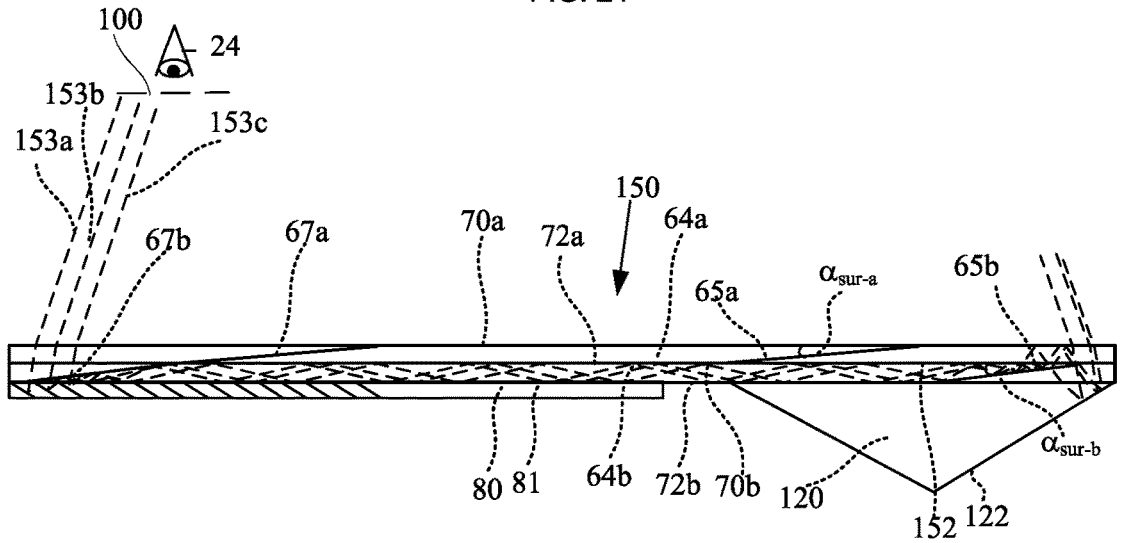
Figure 22B:
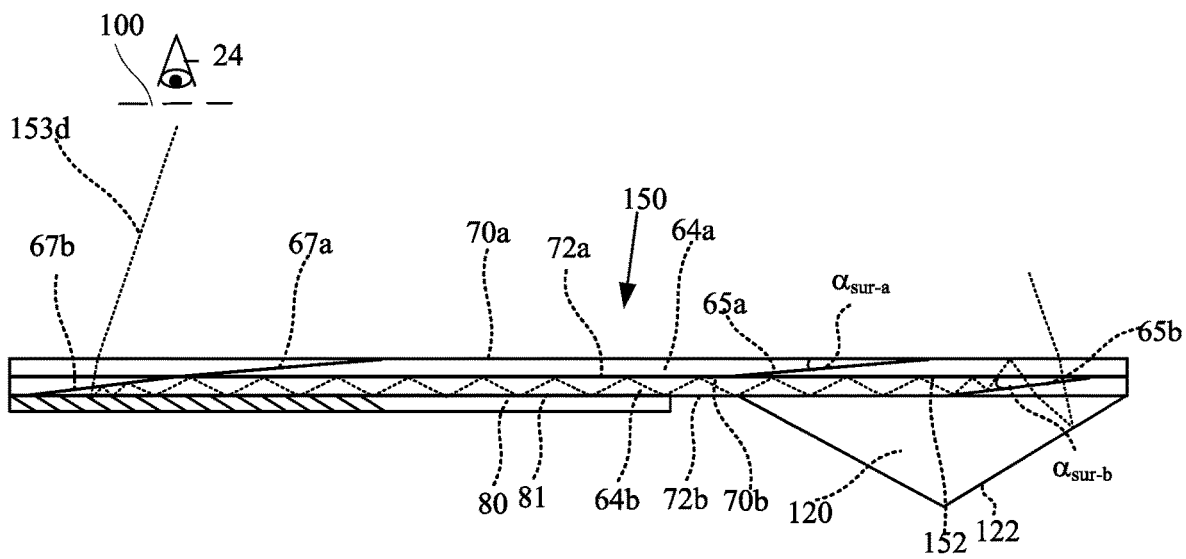
Figure 22C:
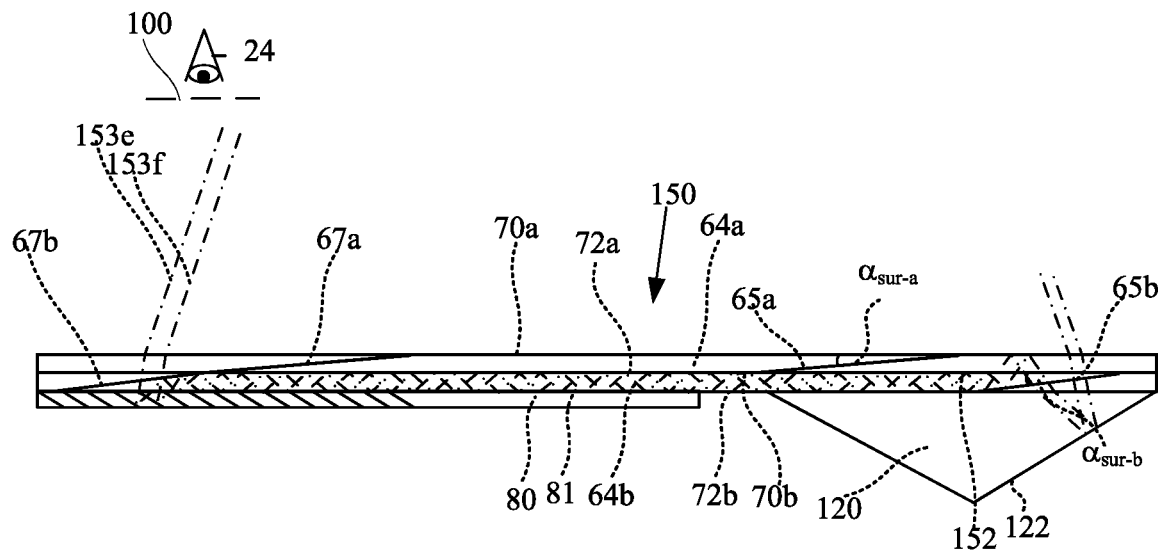
Figure 22D:
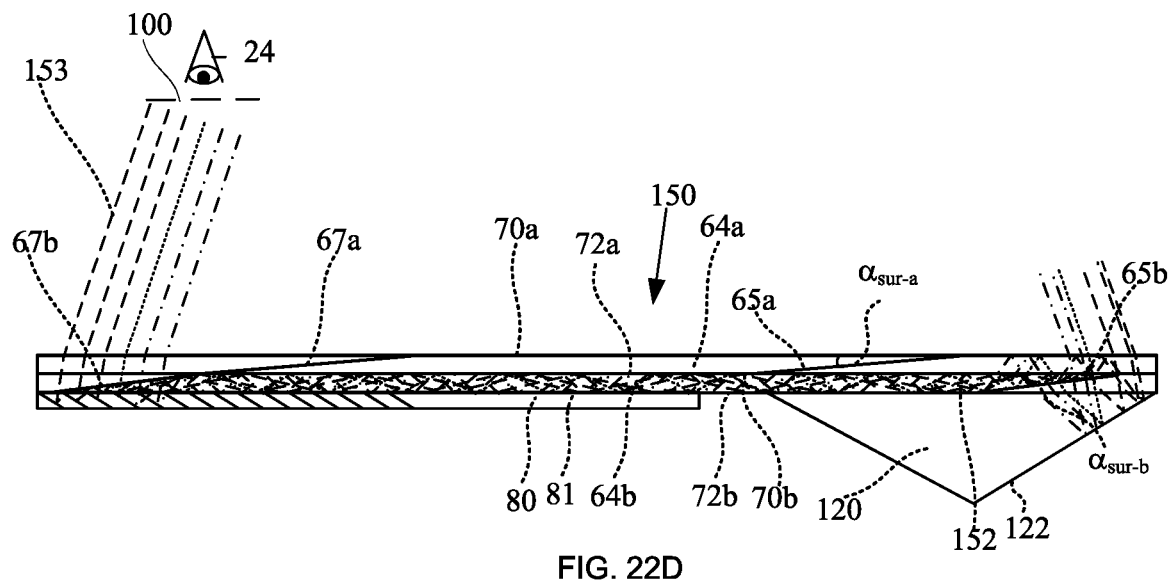

As illustrated in FIGS. 22A, 22B and 22C respectively, three rays from the left marginal light wave 153 (153a, 153b, 153c) are coupled inside the lower substrate 64b after three reflections from surface 65b, one ray 153d (FIG. 22B) is coupled after two reflections, and two other rays, 153e, 153f (FIG. 22C) are coupled after a single reflection from surface 65b. As shown in FIG. 22D, all the rays are coupled out from the substrate 64b by the coupling-out element 67b and are redirected to illuminate the entire EMB 100.

Figure 23A:
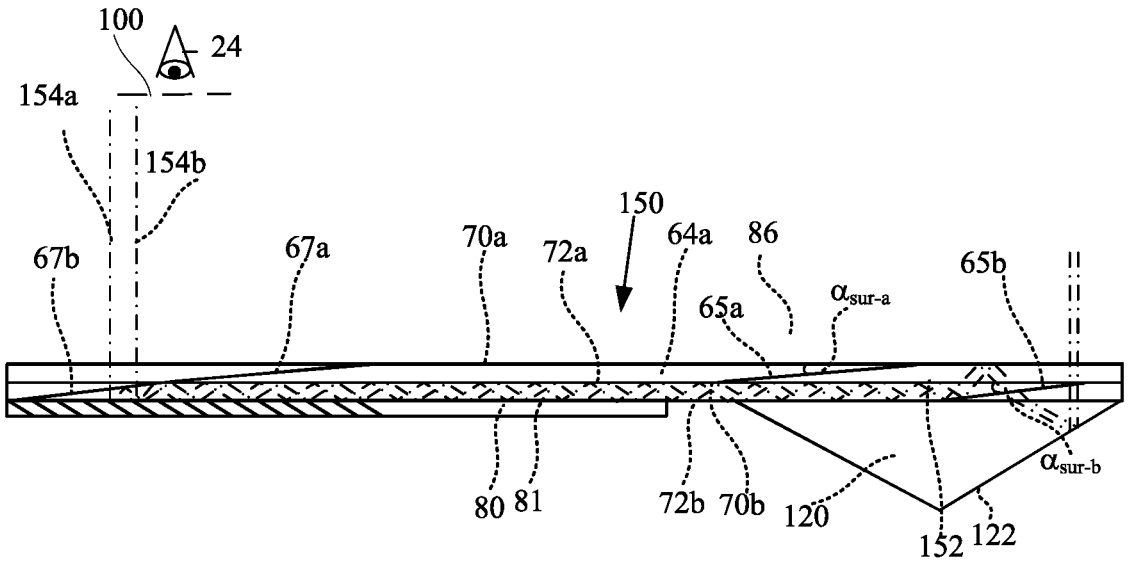
Figure 23B:
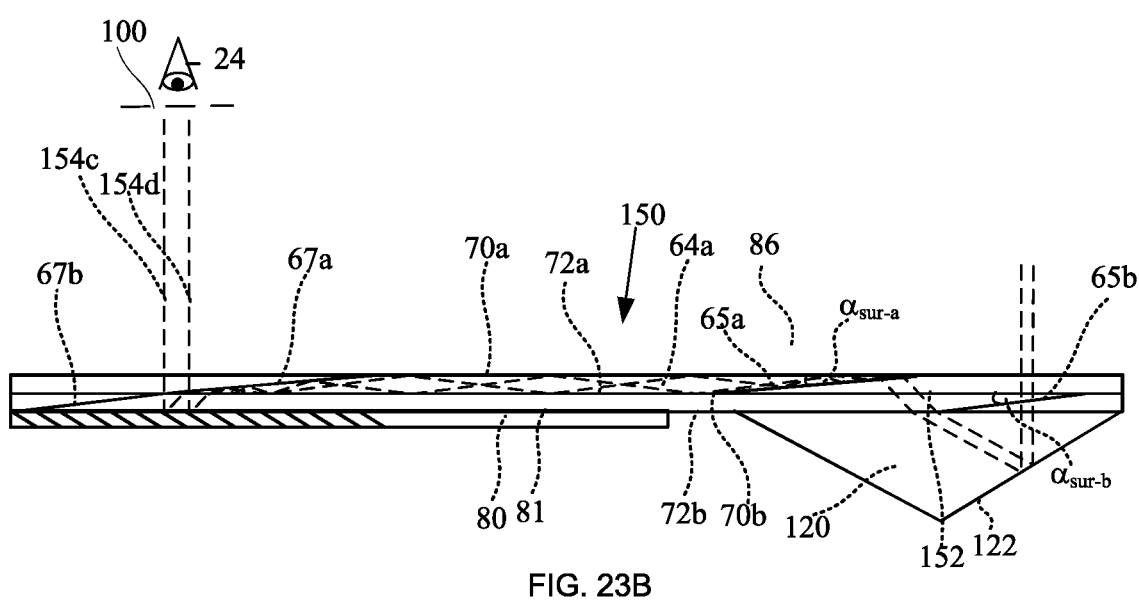
Figure 23C:
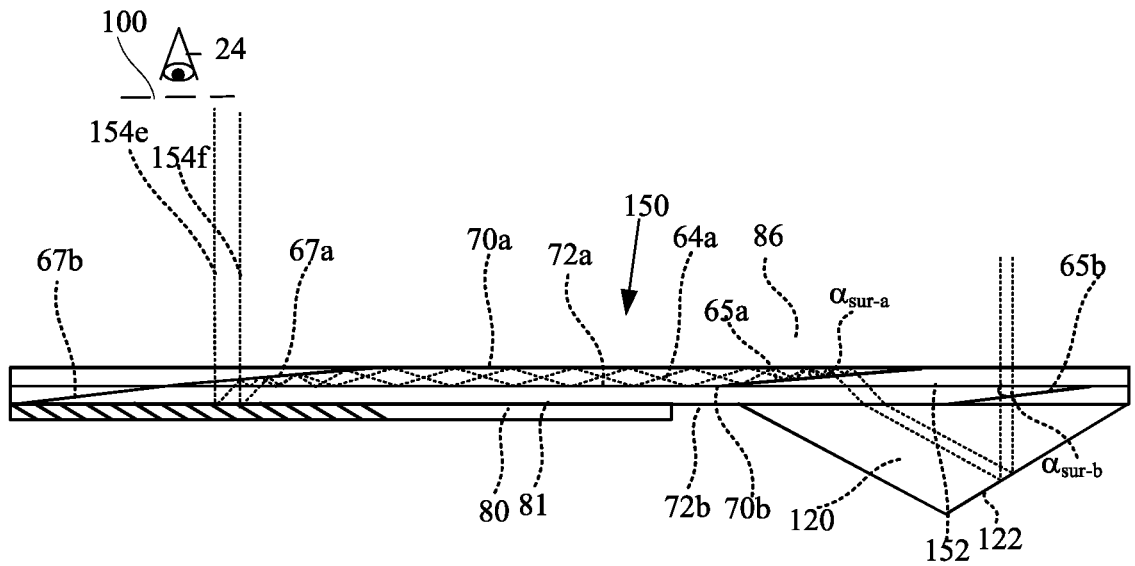
Figure 23D:
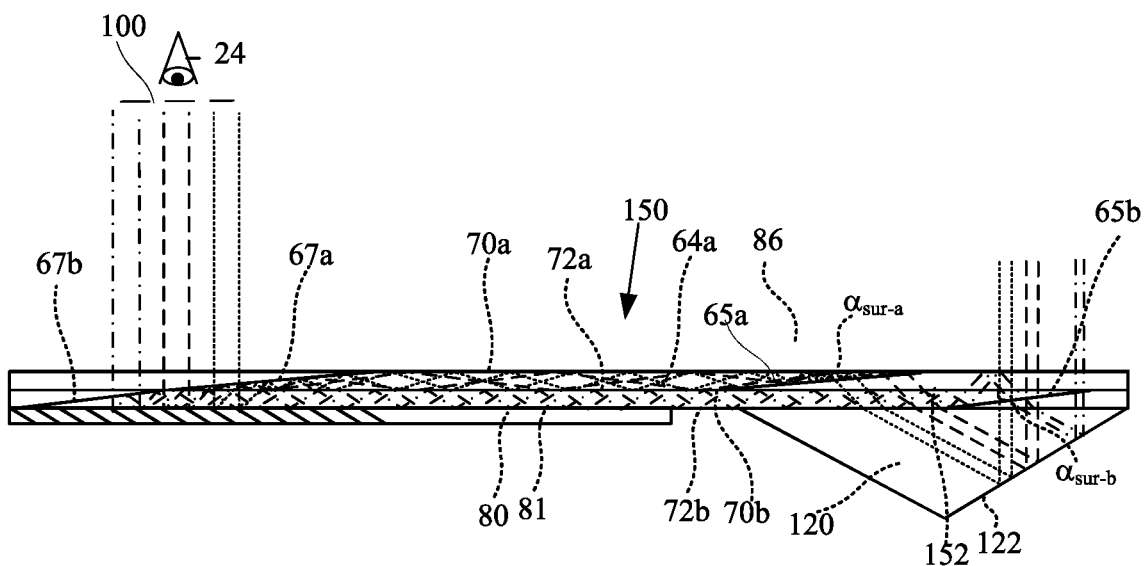

In FIGS. 23A, 23B and 23C respectively, there are illustrated two rays from the central light wave 154 (154a, 154b, 15c) coupled inside the lower substrate 64b after a single reflection from the surface 65b and are coupled out by surface 67b, two rays (154c,154d) are coupled inside the upper substrate 64a after three reflections from surface 65a and are coupled out by surface 67a, and two other rays 154e, 154f (FIG. 23C) are coupled inside the upper substrate 64a after two reflections from surface 65a and are coupled out by the surface 67a. As shown in FIG. 23D, all the rays are redirected by the redirecting prism 80 to illuminate the entire EMB 100.

FIG. 24A illustrates two rays from the right marginal light wave 155 (155a, 155b) coupled inside the upper substrate 64a after two reflections from surface 65a, and three other rays, 155c, 155d, 155e coupled after a single reflection from surface 65a. As shown in FIG. 24C, all the rays are coupled out from the substrate 64a by the coupling-out element 67a and are redirected to illuminate the entire EMB 100. As illustrated in FIG. 25, the light waves in the entire FOV incident on surface 70 inside an input aperture 86', which is substantially smaller than the output aperture 89, illuminate the entire EMB.

Another issue that should be considered is ghost images that can be seen in an image as a result of undesired reflections of stray rays from the external surfaces of the system. As illustrated in FIG. 26A, an input ray 160 is coupled into the substrate 64 after a single reflection from surface 65 and is then coupled out from the substrate after a single reflection from surface 67. The light ray is then partially reflected by surfaces 79i and 79j as output rays 160a and 160b, into the viewer's eye at (in?) the "proper" direction. Part of the ray 160, however, passes-through surface 79j, is totally reflected from the lower surface 162 of prism 80, is then partially reflected from surface 79k, passes-through substrate 64, is totally reflected from the upper surface 70 of substrate 64, passes again through substrate 64, and then is partially reflected from surface 79m as an output ray 160c into the viewer's eye at the "wrong" direction. That is to say, the stray ray 160c will appear as a ghost image in the projected image. FIG. 26A illustrates such a ghost image which is originated from the coupled-in image light waves. Other ghost images, however, can be initiated as a result of light waves from the external scene. As illustrated in FIG. 26B, an external ray 163 passes through a partially reflecting surface 79n, passes through prism 80 and the substrate 64 and reaches the viewer's eye at the original direction as ray 163a. Part of ray 163, however, is partially reflected from surface 79n, is totally reflected from the lower surface 162 of prism 80, is partially reflected from surface 79o, passes-through substrate 64, is totally reflected from the upper surface 70 of substrate 64, passes again through substrate 64, and then is partially reflected from surface 79p as an output ray 163b into the viewer's eye at the "wrong" direction". Hence, the stray ray 163b will also appear as a ghost image in the projected image.

As shown in FIGS. 26A and 26B, the main reason for the ghost images is the undesired reflections from the surface 162. This phenomenon is typical not only for the embodiments illustrated in the present application but also in other substrate-guided configurations. Unlike these other configurations, the total internal reflection from surface 162 is not required for the propagation of the light waves inside the substrate, and hence, it can be totally eliminated. A possible way to eliminate the undesired reflections from surface 162 is to apply an absorptive layer to this surface. This simple method can be used for non-see-through systems, wherein the external surface 162 can be totally opaque. For see-through systems, however, since the light rays from the external scene should pass through surface 162 to reach the viewer's eye 24, it is not permitted that surface 162 will be opaque.

FIG. 27 illustrates a more efficient method to remove the total internal reflection from surface 162, while keeping this surface substantially transparent to light rays from the external scene. As shown, the upper surface 166 of a thin flat transparent plate 167 is optically attached to the lower surface 162 of the redirecting prism 80. An array of parallel absorptive surfaces $168_1$, $168_2$ . . . , oriented normal to surface 166, is embedded inside the plate 167. To validate that all the light rays that impinge on surface 162 will be absorbed by these surfaces, the following relation must be satisfied:

$$T \geq 0.5 \cdot D \cdot \cot(\alpha_{min}^p) \qquad (20)$$

wherein T is the thickness of plate 167, D is the distance between two consecutive surfaces $168_i$ and $168_{i+1}$, and $\alpha_{min}^p$ is the minimal off-axis angle of the light waves impinging on plate 167. As shown, ray 171 is absorbed by surface $168_i$ after a total reflection from the lower surface 169 of plate 167, while ray 172 is absorbed by a direct impingement on surface $168_j$. Since the substrate 64 is thin and the absorptive surfaces are normal to the major surfaces of the substrate, and hence, to the boresight of the viewer, plate 167 is preserved substantially transparent to light rays from the external scene.

Figure 28B:
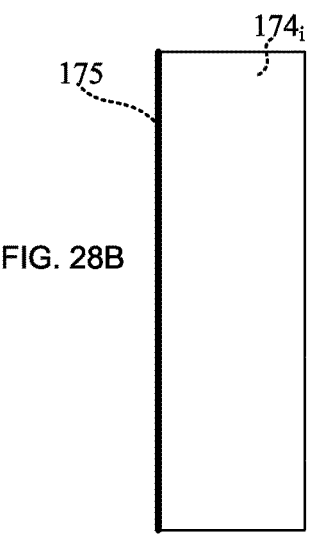
Figure 28A:
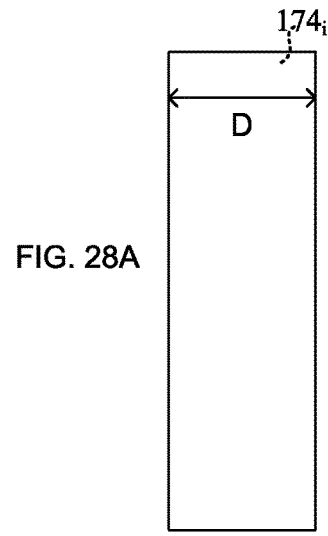
Figure 28C:
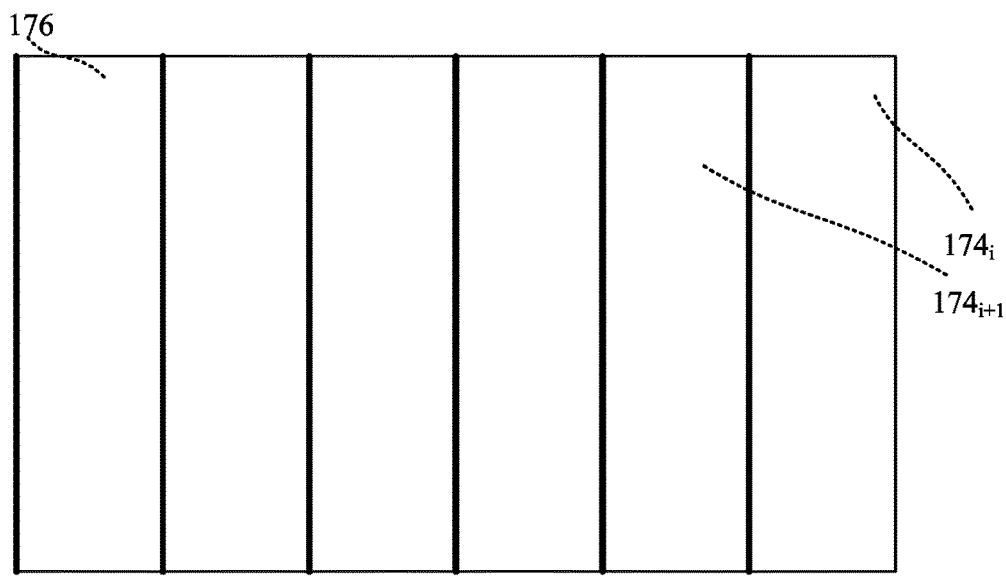
Figure 28D:
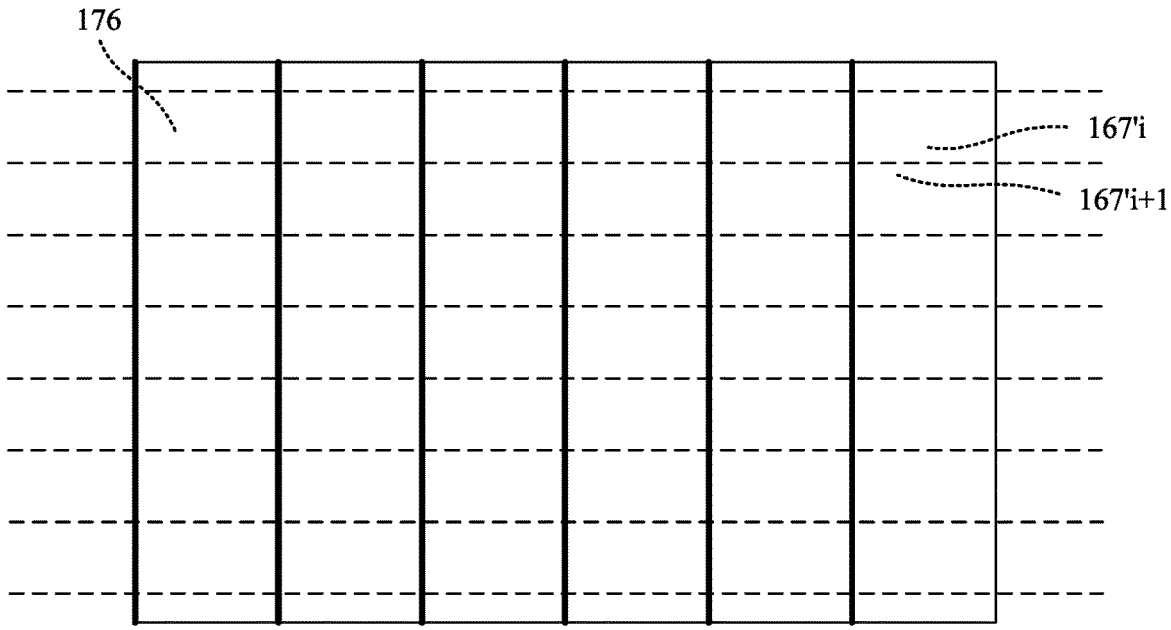
Figure 28E:
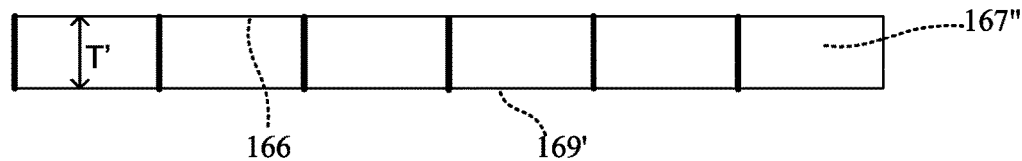
Figure 28F:
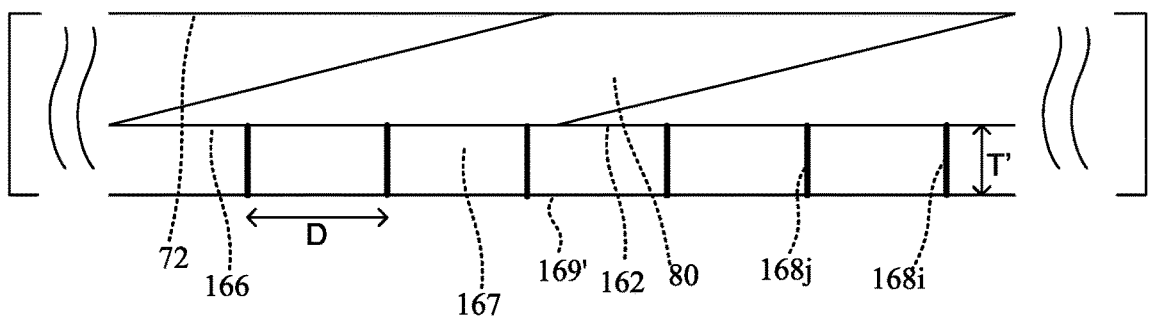

FIGS. 28A to 28F illustrate a method for fabricating the plate 167. A plurality of transparent flat plates $174_i$ having a thickness of T are fabricated (FIG. 27). Since the major surfaces of these plates should be absorptive, they should not necessarily be polished and their parallelism is not crucial. A thin absorptive layer 175 is applied to one of the major surfaces of each plate (FIG. 28B). This absorptive layer can be, inter alia, a black painting, a thin silicon coating, a metal coating or any other absorptive material that can be applied as a thin layer. The plates 176 are cemented together using an appropriate optical adhesive, so as to form a stack (FIG. 28C)). A number of segments $167'_i$ are then sliced off of the stacked form 176 (FIG. 28D) at a direction normal to the major surfaces of plates $174_i$, and are then processed by cutting, grinding and polishing, to create plates $167''_i$, having a thickness of T' (FIG. 28E). One of the major surfaces of the plate is optically cemented to surface 162 (FIG. 28F). In many cases it is required that plate 167 will be very thin, in an order of 0.1 mm. In that case, it might be difficult to process plate 167', having the required thickness of T. Therefore, a plate having a thickness of T'>T will be cemented to prism 80 and the lower surface 169' of the cemented plate 167" will be grounded and polished to achieve the required thickness of T of the final plate 167.

FIGS. 29A and 29B illustrate embodiments similar to those shown in FIGS. 26A-26B, wherein a plate 167 is optically attached to the lower surface 162 of the prism 80. As shown, instead of being totally reflected from surface 162 and continue to propagate in the system, the stray light rays 160c and 163b are absorbed in plate 167, and hence, the ghost images, originated from the projected image as well as from the external scene, are totally eliminated. This method for decaying ghost images resulting from undesired total internal reflection, could also be applied to other optical modules, wherein stray light rays are undesirably reflected from a surface that should be otherwise transparent to normal incident light. The plate 167 can thus be optically attached to such a surface in order to decay the undesired reflections while still maintaining the required transmittance of the surface.

The advantages of reducing the lateral dimension of the input aperture as illustrated above, is even more apparent wherein two-dimensional expansion of the coupled light waves are required. FIG. 30 is a schematic drawing illustrating a way to expand the beam along two axes utilizing a double substrate configuration. For simplicity, the intermediate prisms and the redirecting elements were omitted from the drawing. The input image 256 is coupled through the input aperture 274 into the first substrate 264a, which has a structure similar to one of the embodiments illustrated above, by the first reflecting surface 265a, and then propagates along the axis. The coupling-out element 267a couples the light out of substrate 264a through the output aperture 276 and then the light is coupled into the second main substrate 264b by the coupling-in element 265b through the input aperture, which coincides with the output aperture 276 of the first substrate 264a. The light waves then propagate along the axis and are coupled out by the coupling-out element 267b through the output aperture 278. As shown, the original image 256 is expanded along both axes, where the overall expansion is determined by the ratio between the lateral dimensions of the apertures 274 and 278. As shown, each light wave (represented by a single arrow in the drawing) illuminates only part of the output aperture 278, but all the light waves are coupled out having the required directions into the EMB 100.

In all of the above embodiments, it has been assumed that the display source is unpolarized. There are micro-display light sources, however, such as LCDs or LCOS, wherein the light is linearly polarized, and this can be used to make a more compact collimating system. As illustrated in FIG. 31A, the p-polarized input light waves 107L, 107M and 107R from the display light source 4, are coupled into a light guide 279, usually composed of a light-waves transmitting material, through its surface 280. The light waves pass through the polarizing beamsplitter 282 and are coupled out of the light guide 279 through surface 283. The light waves then pass through a quarter-wavelength retardation plate 285, collimated by a lens 286 at its reflecting surface 289, return to pass again through the retardation plate 285, and re-enter the light guide 279 through surface 283. The now s-polarized light waves reflect off the polarizing beamsplitter 282 and exit the light guide through the lower surface 290. The light waves are now coupled into the substrate 64 through the intermediate prisms 226 and 220, in the same manner as illustrated above in relation to FIGS. 20A-20D. The reflecting surface 289 can be materialized either by a metallic or a dielectric coating.

Utilizing a reflecting collimating lens 286, as illustrated in FIG. 31A, has some prominent advantages, such as achieving good performance by using a small number of optical components, having additional compact collimating modules, etc. It is therefore advantageous to use this embodiment also for unpolarized light sources such as Micro-LEDs and OLEDs. The main drawback in such a case is that only a single polarization component of the display source can be used, and hence, achievable brightness is reduced by more than 50%. An alternative method for utilizing the two orthogonal polarization components of an unpolarized display source, and therefore avoiding the brightness reduction, is illustrated in FIG. 31B. As shown, the s-polarized components of the input light-waves 107L, 107M and 107R from the display light source 4 are coupled into a light-guide 279, through its right surface 280. Following reflection-off of a polarizing beamsplitter 282, the light waves are coupled-out of the substrate through surface 291 of the light-guide 279. The light-waves then pass through a second quarter-wavelength retardation plate 293, collimated by a second lens 296 at its reflecting surface 297, return to pass again through the retardation plate 293, and re-enter the light-guide 279 through surface 291. The now p-polarized light-waves passthrough the polarizing beamsplitter 282, exit the light-guide through the lower surface 290, and are coupled into the substrate 64 through the intermediate prisms 226 and 220 as before. The p-polarized component of the light source is coupled into the substrate as illustrated in FIG. 31A. The two collimating lenses should be identical and be placed very accurately at the surfaces of the light-guide 279 in order to avoid double image.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

In particular it should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

The invention claimed is:

1. An optical device, comprising: a first light-transmitting substrate having at least two parallel major surfaces and two opposite edges; an input aperture; an output aperture positioned next to one of the major surfaces of the first light-transmitting substrate; an eye-motion box having an aperture; a first intermediate element having at least two surfaces positioned outside of the first light-transmitting substrate for coupling incoming light waves, having a field-of-view, into the first light-transmitting substrate through the input aperture; a first flat reflecting surface, having an active area located between the two major surfaces of the first light-transmitting substrate, for reflecting the incoming light waves from the first intermediate element to effect total internal reflection from the major surfaces of the first light-transmitting substrate; a second flat reflecting surface parallel to the first flat reflecting surface, having an active area and being located between the two major surfaces of the first light-transmitting substrate, for coupling light waves out of the first light-transmitting substrate, and a redirecting optical element having at least two surfaces positioned outside of the first light-transmitting substrate for redirecting light waves coupled-out from the first light-transmitting substrate through the output aperture, into the eye-motion-box, wherein the input aperture is substantially smaller than the output aperture, all the incoming light waves pass inside the input aperture, the active area of the first flat reflecting surface is similar to the active area of the second flat reflecting surface, and each of the coupled light waves covers the entire aperture of the eye-motion-box.

2. The optical device according to claim 1, wherein the light waves coupled into the first light-transmitting substrate and out of the first light-transmitting substrate have a brightness, the brightness of the light waves coupled-out from the first light-transmitting substrate by the second flat reflecting surface, is substantially similar to the brightness of the light waves coupled into the first light-transmitting substrate.

3. The optical device according to claim 1, wherein the first and the second flat reflecting surfaces couple the light waves into and from the first light-transmitting substrate, respectively, by total internal reflection.

4. The optical device according to claim 1, wherein light waves coupled inside the first light-transmitting substrate are reflected the same number of reflections from the first and the second flat reflecting surfaces.

5. The optical device according to claim 1, wherein light waves passing through the input aperture and coupled into the first light-transmitting substrate are incident only on part of the first and the second flat reflecting surfaces.

6. The optical device according to claim 5, wherein light waves passing through the input aperture and the aperture of the eye-motion-box are incident only on the part of the first flat reflecting surface closer to one of the edges of the first light-transmitting substrate and are coupled out from the first light-transmitting substrate only by a part of the second flat reflecting surface closer to the other edge of the first light-transmitting substrate.

7. The optical device according to claim 5, wherein light waves passing through the input aperture and the aperture of the eye-motion-box are incident only on the part of the first flat reflecting surface closer to the center of the first light-transmitting substrate and are coupled out from the first light-transmitting substrate only by a part of the second flat reflecting surface which is closer to the center of the first light-transmitting substrate.

8. The optical device according to claim 5, wherein light waves passing through the input aperture and the aperture of the eye-motion-box are incident only on a central part of the first flat reflecting surface and are coupled out from the first light-transmitting substrate only by a central part of the second flat reflecting surface.

9. The optical device according to claim 1, further comprising a second intermediate element, wherein the light waves pass through the first and the second intermediate elements, prior to being coupled into the first light-transmitting substrate by the first flat reflecting surface.

10. The optical device according to claim 1, wherein the coupled-in light waves pass through the first flat reflective surface at least twice prior to being reflected by the surface to be coupled into the first light-transmitting substrate.

11. The optical device according to claim 1, wherein the first intermediate element and the redirecting optical element are optically cemented by a first optical adhesive to the major surfaces of the first light-transmitting substrate having a refractive index, define first and second interface planes, wherein the refractive index of the adhesive is substantially lower than the refractive index of the first light-transmitting substrate, and an anti-reflection coating is applied to the interface planes.

12. The optical device according to claim 11, wherein the interface planes are substantially transparent for light waves having incident angles lower by more than one degree than the critical angle of the interface planes.

13. The optical device according to claim 1, wherein a second optical adhesive is applied to the first and the second flat reflecting surfaces, the refractive index of the adhesive is substantially lower than that of the first light-transmitting substrate, anti-reflection coatings are applied to the first and the second flat reflecting surfaces, and the surfaces are substantially transparent for light waves having incident angles lower by more than one degree than the critical angle of the surfaces.

14. The optical device according to claim 12, wherein the first intermediate element and the redirecting optical element are fabricated from the same optical material having a refractive index and Abbe number, substantially different than those of the first light-transmitting substrate, creating a first chromatic dispersion of the light waves coupled inside the first light-transmitting substrate.

15. The optical device according to claim 14, wherein the Abbe number of the first adhesive is substantially different than that of the first light-transmitting substrate, creating a second chromatic dispersion of the light waves inside the first light-transmitting substrate, and the first and the second chromatic dispersions are substantially mutually compensated.

16. The optical device according to claim 1, further comprising a second light transmitting substrate having at least two major surfaces, two opposite edges, and a third and a fourth flat reflecting surfaces parallel to each other, each of the surfaces having an inclination angle, wherein the first and second light transmitting substrates are optically attached and the inclination angle of the third and the fourth flat reflecting surfaces to the major surfaces of the second light transmitting substrate, is lower than the inclination angle of the first and the second flat reflecting surfaces, to the major surfaces of the first light transmitting substrate.

17. The optical device according to claim 1, further comprising a second light transmitting substrate having at least two major surfaces, two opposite edges and third and fourth flat reflecting surfaces, the input and output apertures having lateral dimensions, wherein light waves coupled out from the first light transmitting substrate are coupled into the second light transmitting substrate and the lateral dimensions of the input aperture are substantially smaller than the lateral dimensions of the output aperture along two different axes.

18. The optical device according to claim 1, further comprising a flat plate optically attached to a surface of the redirecting optical element, wherein an array of flat absorptive surfaces, substantially normal to the surface of the redirecting optical element, are embedded inside the plate, the flat plate is substantially transparent to normal incident light waves, and light waves coupled out from the first light-transmitting substrate and incident on the flat plate are absorbed by the absorptive surfaces.

19. The optical device according to claim 1, wherein the first intermediate element and the redirecting optical element are optically cemented by an optical adhesive to the major surfaces of the first light-transmitting substrate having a refractive index, defining a first and a second interface planes, anti-reflection coatings and a thin film dielectric coating are applied to the interface planes wherein the refractive index of the dielectric coating is substantially lower than the refractive index of the first light-transmitting substrate.

20. The optical device according to claim 1, wherein the first light-transmitting substrate has a refractive index and the surfaces have a critical angle, the first and second reflecting surfaces have a thin film dielectric coating and a refractive index, the refractive index of the dielectric coating is lower than the refractive index of the first light-transmitting substrate, the first and second flat reflecting surfaces having anti-reflection coatings which are transparent to the light waves having incident angles lower than the critical angle of the surfaces.

* * * * *